(12) United States Patent
Ozawa et al.

(10) Patent No.: US 8,373,788 B2
(45) Date of Patent: Feb. 12, 2013

(54) IMAGE PROCESSING APPARATUS, IMAGE DISPLAYING METHOD, AND IMAGE DISPLAYING PROGRAM

(75) Inventors: Hiroyuki Ozawa, Tokyo (JP); Nobuki Furue, Tokyo (JP); Satoshi Akagawa, Tokyo (JP); Ayako Iwase, Kanagawa (JP)

(73) Assignee: Sony Corporation, Tokyo (JP)

( * ) Notice: Subject to any disclaimer, the term of this patent is extended or adjusted under 35 U.S.C. 154(b) by 304 days.

(21) Appl. No.: 12/559,163

(22) Filed: Sep. 14, 2009

(65) Prior Publication Data

US 2010/0110228 A1    May 6, 2010

(30) Foreign Application Priority Data

Oct. 31, 2008    (JP) .................................. 2008-280707

(51) Int. Cl.
*H04N 5/222*    (2006.01)
(52) U.S. Cl. ................ 348/333.05; 348/333.02; 345/156
(58) Field of Classification Search ............. 348/333.02, 348/333.05; 345/156
See application file for complete search history.

(56) References Cited

U.S. PATENT DOCUMENTS

| 2008/0062141 | A1 | 3/2008 | Chandhri |
| 2008/0126933 | A1* | 5/2008 | Gupta et al. ................. 715/712 |
| 2008/0165151 | A1 | 7/2008 | Lemay et al. |

FOREIGN PATENT DOCUMENTS

| EP | 1 607 850 A2 | 12/2005 |
| JP | 10-187743 | 7/1998 |
| JP | 2001-202170 | 7/2001 |
| JP | 2002-73679 | 3/2002 |
| JP | 2005-31830 | 2/2005 |
| JP | 2006-295236 | 10/2006 |
| JP | 2007-37182 | 2/2007 |
| JP | 2007-41717 | 2/2007 |
| JP | 2007-334651 | 12/2007 |
| WO | WO 2007/030396 A2 | 3/2007 |
| WO | WO 2007/030396 A3 | 3/2007 |

OTHER PUBLICATIONS

Loui et al., "Method and System for Browsing Object Collections", Mar. 15, 2007, WIPO (WO 2007/030396).*
U.S. Appl. No. 12/776,856, filed May 10, 2010, Iwase, et al.
Operation System of iPod touch, Mac People, vol. 13, No. 11. Oct. 4, 2007, pp. 18-22.

(Continued)

*Primary Examiner* — Anthony J Daniels
(74) *Attorney, Agent, or Firm* — Oblon, Spivak, McClelland, Maier & Neustadt, L.L.P.

(57) ABSTRACT

An image processing apparatus includes: an image display device; an instruction position detecting unit to accept, via an operating screen having multiple operating areas provided to a display screen of the image display device, instructions from a user and detect and output the position of the instruction operation on the operating face; a storage unit to store and hold image data; and a display control unit to control display of an image according to the image data stored and held in at least the storage unit on the image display device; wherein, if the user performs a tracing operation on the operating face, the display control unit controls the display of the image on the display screen of the image display device so as to change, according to the operated operating area and direction of operation that is distinguished based on the detecting output from the instruction position detecting unit.

17 Claims, 33 Drawing Sheets

OTHER PUBLICATIONS

Office Action issued Sep. 2, 2010 in JP Application No. 2008-280707 (With English Translation).
U.S. Appl. No. 12/580,627, filed Oct. 16, 2009, Ozawa, et al.
U.S. Appl. No. 12/604,795, filed Oct. 23, 2009, Iwase, et al.
U.S. Appl. No. 12/607,475, filed Oct. 28, 2009, Ozawa, et al.
U.S. Appl. No. 12/479,269, filed Jun. 5, 2009, Ozawa, et al.
U.S. Appl. No. 12/469,984, filed Jul. 2, 2009, Iwase, et al.
U.S. Appl. No. 12/499,349, filed Jul. 8, 2009, Ozawa, et al.
U.S. Appl. No. 12/508,909, filed Jul. 24, 2009, Ozawa, et al.
U.S. Appl. No. 12/509,045, filed Jul. 24, 2009, Iwase, et al.

* cited by examiner

FIG. 3

| YEAR/DATE INFORMATION | METADATA (CREATE DATE/TIME, FOLDER NUMBER, ETC.) |
|---|---|
| FOLDER 1 (EVENT NAME) | CREATE DATE/TIME, ETC. |
| FOLDER 1 (EVENT NAME) | CREATE DATE/TIME, ETC. |
| FOLDER 1 (EVENT NAME) | CREATE DATE/TIME, ETC. |
| ⋮ | ⋮ |

FIG. 4

| FOLDER NAME | EVENT NAME | CREATE DATE/TIME | OTHER |
|---|---|---|---|
| FILE 1 | ADDRESS INFORMATION OF RECORDING MEDIUM | CREATE DATE/TIME | |
| FILE 2 | ADDRESS INFORMATION OF RECORDING MEDIUM | CREATE DATE/TIME | |
| FILE 3 | ADDRESS INFORMATION OF RECORDING MEDIUM | CREATE DATE/TIME | |
| ⋮ | ⋮ | ⋮ | |

| FILE NAME | CREATE DATE/TIME | EVENT NAME | THUMBNAIL DATE |
|---|---|---|---|
| IMAGE DATA (MOVING IMAGE/STILL IMAGE) | | | |

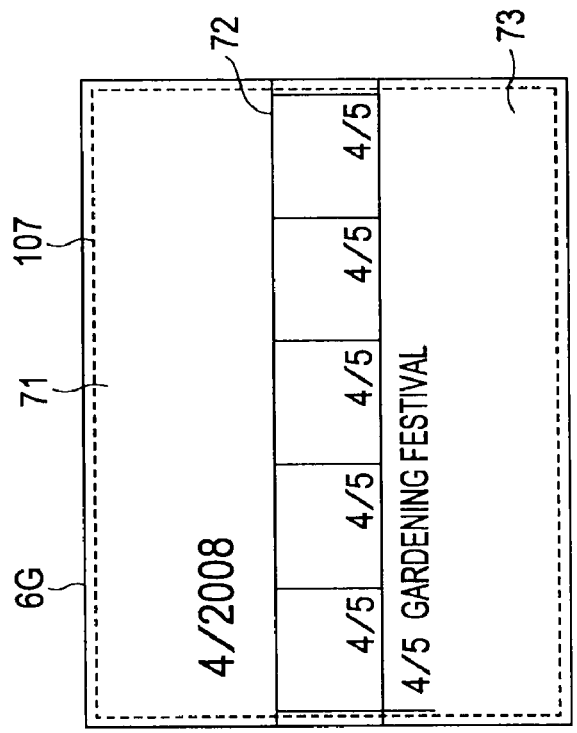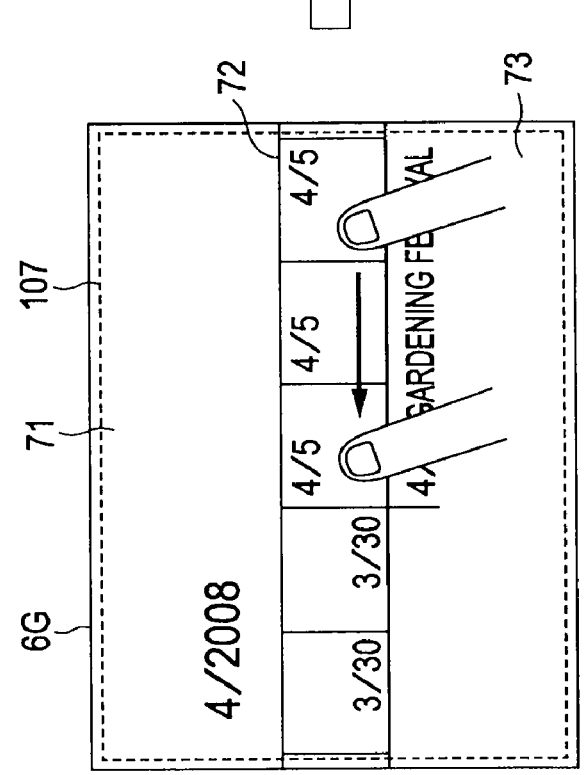

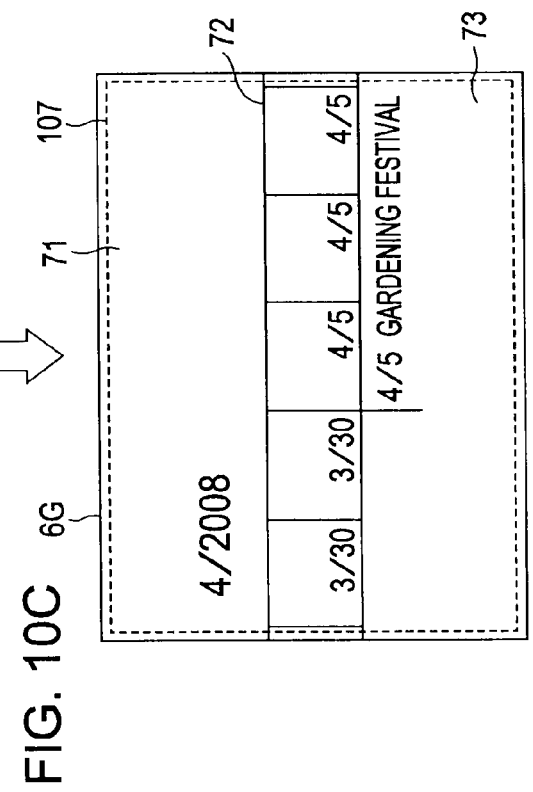
FIG. 10B
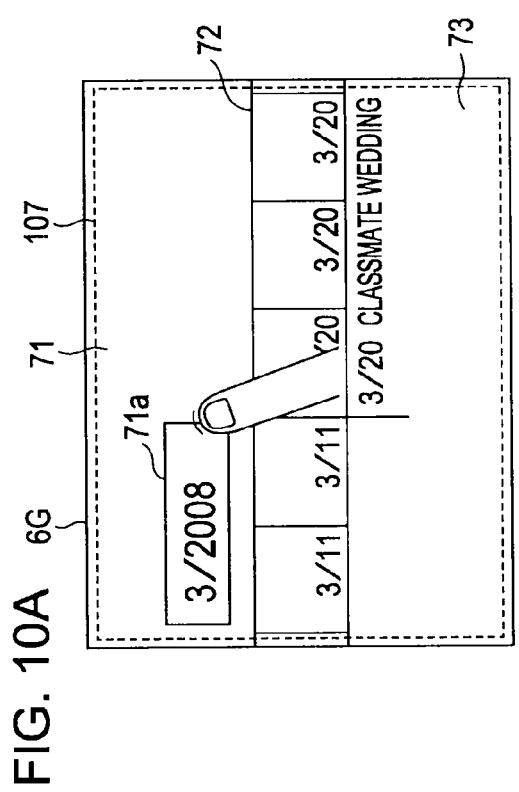
FIG. 10A
FIG. 10C

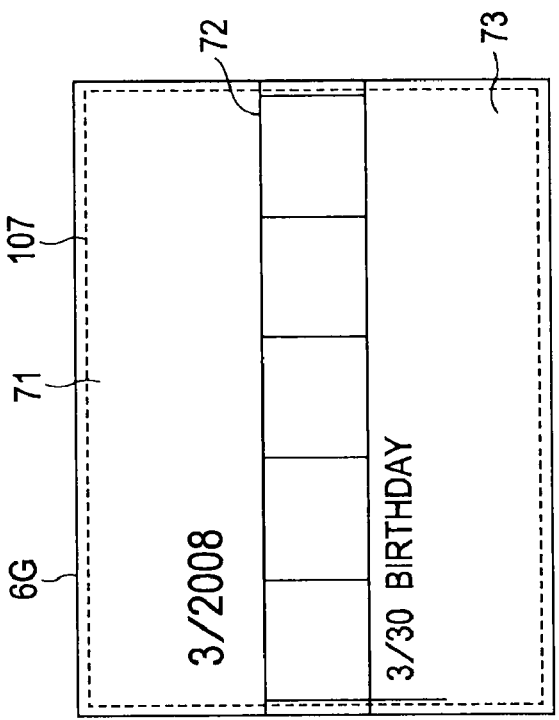
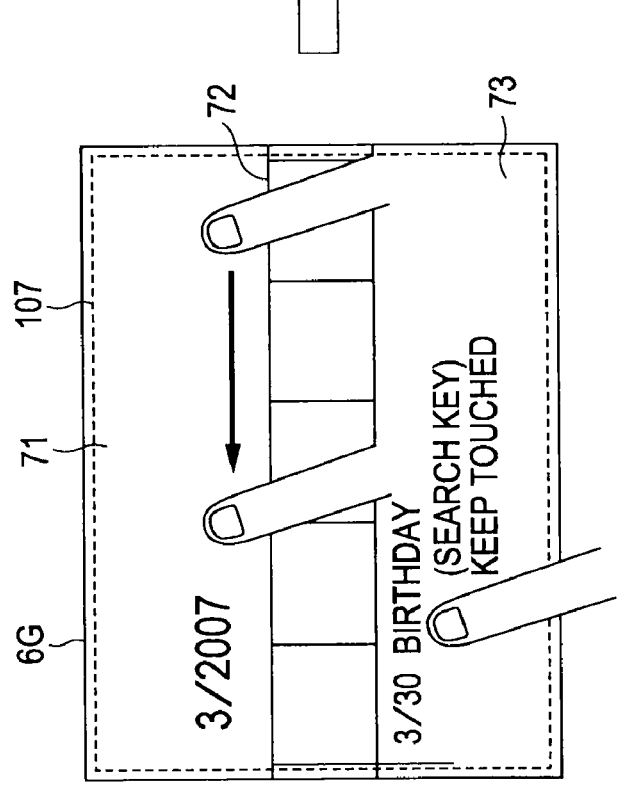

FIG. 28

| ARTIST NAME | METADATA (CREATE DATE/TIME, ALBUM NUMBER, ETC.) | |
|---|---|---|
| ALBUM NAME | METADATA | RELEASE DATE |
| ALBUM NAME | METADATA | RELEASE DATE |
| ⋮ | ⋮ | ⋮ |

FIG. 29

| ALBUM NAME | JACKET IMAGE (IMAGE DATA) | RELEASE DATE |
|---|---|---|
| OTHER METADATA | | |
| SONG FILE | SONG TITLE | ADDRESS ON RECORDING MEDIUM |
| SONG FILE | SONG TITLE | ADDRESS ON RECORDING MEDIUM |
| ⋮ | ⋮ | ⋮ |

| FILE NAME | SONG TITLE | RELEASE DATE | JACKET IMAGE (IMAGE DATA) |
|---|---|---|---|
| SONG DATA | | | |

| GENRE NAME | METADATA |
|---|---|
| ARTIST NAME | METADATA |
| ARTIST NAME | METADATA |
| ⋮ | ⋮ |

FIG. 37

| MEDIA TYPE ex.) DVD-ROM | CREATE DATE | NUMBER REGISTERED | OTHER |
|---|---|---|---|
| 3/1998 | NUMBER REGISTERED, ETC. | | |
| 4/1998 | NUMBER REGISTERED, ETC. | | |
| 5/1998 | NUMBER REGISTERED, ETC. | | |
| ⋮ | ⋮ | | |

FIG. 38

| 3/1998 | CREATE DATE | NUMBER REGISTERED | OTHER |
|---|---|---|---|
| CONTENT FILE 1 | ADDRESS OF RECORDING MEDIUM | CREATE DATE/TIME | |
| CONTENT FILE 2 | ADDRESS OF RECORDING MEDIUM | CREATE DATE/TIME | |
| ⋮ | ⋮ | ⋮ | ⋮ |

| CONTENT FILE NAME | RELEASE DATE | TITLE | JACKET IMAGE |
|---|---|---|---|
| OTHER METADATA ||||
| CONTENT DATA (STILL IMAGE, MOVING IMAGE, SONG, ETC.) ||||

IMAGE PROCESSING APPARATUS, IMAGE DISPLAYING METHOD, AND IMAGE DISPLAYING PROGRAM

BACKGROUND OF THE INVENTION

1. Field of the Invention

The present invention relates to an apparatus that has a display device having a relatively large display screen and can display various types of images, such as a digital still camera or the like for example, and to a method and program used with the device.

2. Description of the Related Art

Digital still cameras which record photographed images on a recording medium as digital data are widely used. Recently, the miniaturization and increased capacity of internal flash memory and removable memory used with digital still cameras have been advanced, and a large amount of image data can be accumulated in the memory.

With a digital still camera, a user may find that a great number of photographed images accumulate over the years as data in internal flash memory or removable memory, and the number is too great for the user to manage in his/her mind.

With such a digital still camera, a large amount of image data photographed and obtained as one bunch (folder), based on predetermined information such as date and time, is managed. For example, a large number of image data photographed on the same photographing day in one folder, such as a collection of image data photographed on Jan. 1, 2008, and so forth, is managed. Also, a folder with a name that the user inputs, such as "Athletic event" and "Birthday party", is created and the image data thus photographed and obtained is bunched.

Thus, a folder identified by date and time, or a folder name that the user inputs and so forth can, can be managed by bunching the image data that is photographed and obtained at a predetermined event. Still, the number of such folders will also accumulate over the years, till where the number thereof is too great for the user to manage in his/her mind.

While there are cases where a user would desire to perform a search for the image data of a particular image, on the other hand, users will want to browse through images in the order in which they were photographed, or browse through all of the images photographed at a certain event.

An multi-functional information processing device such as a personal computer or the like, has a wide variety of tools to handle image data, wherein various types of rearranging of folders can be readily performed, and also the amount of images that can be displayed at one time is great, whereby image searches can be flexibly performed.

However, an image processing apparatus such as a digital still camera has a display device such as a liquid crystal display, but the size of the display screen thereof is smaller than a personal computer, and the processing capability is also inferior. Therefore, with an image display apparatus such as a digital still camera, for example, a menu display or index screen of images is used for each folder, such as that disclosed in Japanese Unexamined Patent Application Publication No. 2007-037182 and Japanese Unexamined Patent Application Publication No. 2006-295236, for the user to browse images.

That is to say, in order to view a series of image data of a particular event that is a target from a large number of folders, first, the particular image folder is searched for while going back and forth over the large number of folders, and images of the image data in the found folder have to be confirmed one at a time.

SUMMARY OF THE INVENTION

However, in the case of the above-described image searching method used with the related art, in order to find the folder wherein the target image data is stored, the user has to go back and forth between many folders and confirm the image data for each folder, and the operation is tedious. This is inconvenient in that it takes time until the folder where the targeted image data is stored is found. Therefore, with a digital still camera or the like, it is desirable to be able to search the targeted image data easily without performing tedious operations such as going back and forth between the folders.

There has been found demand to enable a quick search without performing tedious operations in the case of searching the image data of the targeted image from within the large amount of image data accumulated in the memory.

According to an embodiment of the present invention, an image processing apparatus according to Claim 1 includes an image display device; an instruction position detecting unit configured to accept, by way of an operating screen having a plurality of operating areas provided as to the display screen of the image display device, an instruction operation from a user and detect and output the instruction position of the instruction operation as to the operating face; a storage unit configured to store and hold image data; and a display control unit configured to control so as to display an image according to the image data stored and held in at least the storage unit on the image display device; wherein, in the case that a tracing operation to trace the operating face is performed by the user, the display control unit controls the display of the image to be displayed on the display screen of the image display device so as to be changed, according to the operated operating area and direction of operation that is distinguished based on the detecting output from the instruction position detecting unit.

According to the above configuration, the display control unit has a function to control so as to display an image according to image data stored in the storage unit onto a display screen of the image display device. In the case that a tracing operation of the operating screen of the instruction position detecting unit is performed, the display of the image to be displayed on the display screen of the image display devices is changed by the display control unit, based on the operated operating area and operating direction distinguished based on the detection results from the instruction position detecting unit.

Thus, the display of the image to be displayed on the display screen of the image display device can be changed with a simple operation of performing a tracing operation as to the operating screen of the instruction position detecting unit. In this case, the image display can be changed, based on the operating area of the tracing operation performed and the direction of the tracing operation. Accordingly, the image display can be changed to various states by changing the operating area and operating direction of the tracing operation.

According to the above configuration, image data of a targeted image from within a large amount of image data accumulated in a storage medium can be quickly searched with simple operations, without performing tedious operations.

BRIEF DESCRIPTION OF THE DRAWINGS

FIG. 3 is a diagram to describe a layout example of a year/month virtual folder positioned on an upper order, as shown in FIG. 2;

FIG. 4 is a diagram to describe a layout example of an event virtual folder positioned on a middle order, as shown in FIG. 2;

FIGS. 9A and 9B are diagrams to describe a case of performing change of the thumbnail image subject to display;

FIGS. 10A through 10C are diagrams to describe a case of changing the photographed year/month of the image subject to display, by an operation differing from a tracing operation, on the image search screen;

FIGS. 21A and 21B are diagrams to describe a case of performing image search processing, with an event as a search key;

FIG. 28 is a diagram to describe a layout example of an artist virtual folder;

FIG. 29 is a diagram to describe a layout example of an album virtual folder;

FIG. 37 is a diagram to describe a layout example of a media virtual folder;

FIG. 38 is a diagram to describe a layout example of a release date virtual folder;

DESCRIPTION OF THE PREFERRED EMBODIMENTS

An embodiment of the apparatus, method, and program of the present invention will be described below with reference to the diagrams.

First Embodiment

Configuration Example of Imaging Apparatus

Figure 1:
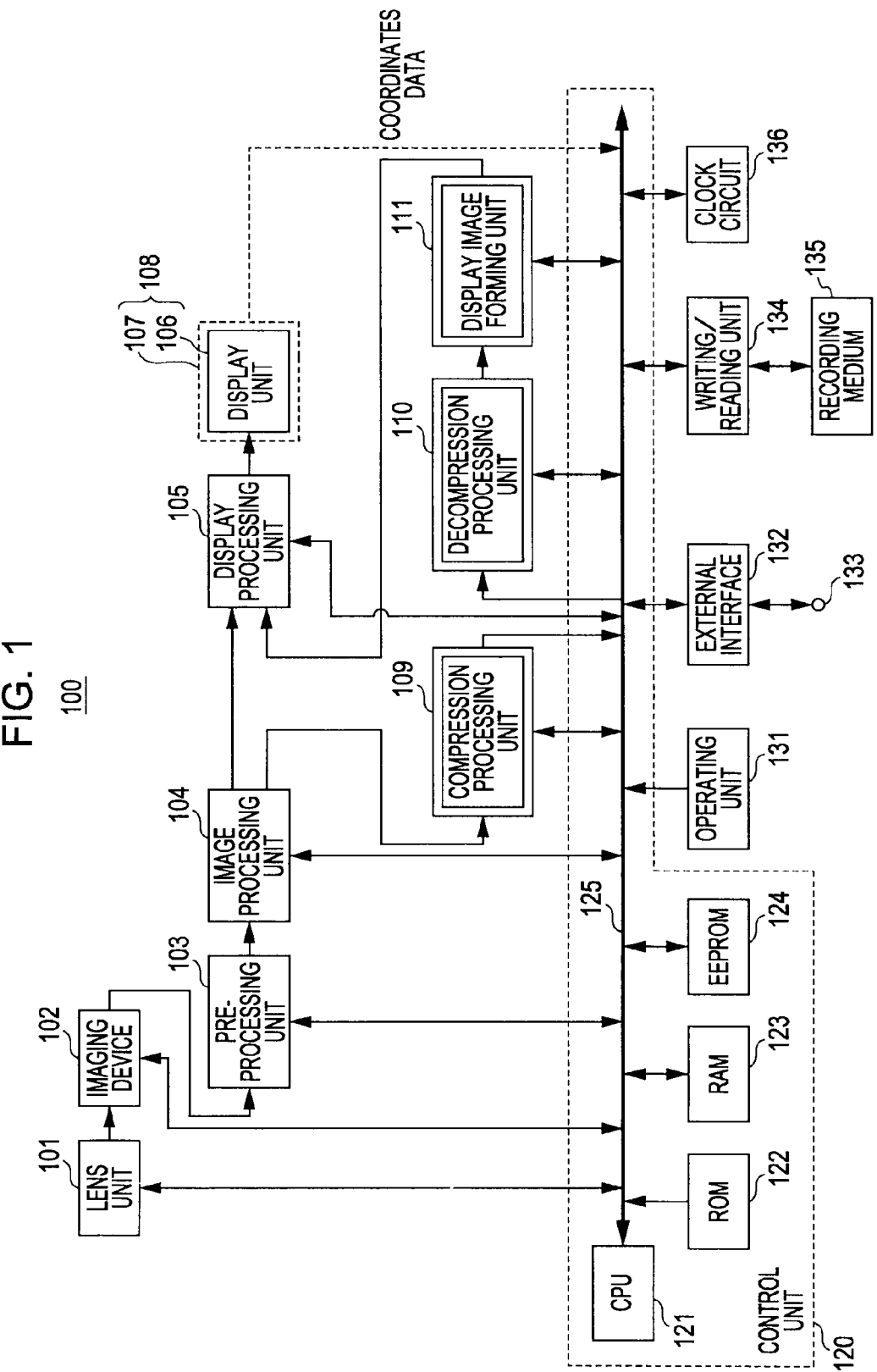
FIG. 1 is a block diagram to describe a configuration example of an imaging apparatus according to a first embodiment.

FIG. 1 is a block diagram to describe a configuration example of an imaging apparatus 100 to which an embodiment of an apparatus, method, and program of the present invention has been applied. The imaging apparatus 100 switches the shooting mode, whereby both still images and moving images can be shot and recorded on a recording medium.

However, with the first embodiment described below, in order to simplify the description, the imaging apparatus 100 will be described as functioning as a digital still camera, and the configuration and operations of the imaging apparatus 100 are exemplified with a case of primarily photographing and reproducing still images.

As shown in FIG. 1, the imaging apparatus 100 has a lens unit 101, imaging device 102, pre-processing unit 103, image processing unit 104, display processing unit 105, display unit 106, touch panel 107, compression processing unit 109, decompression processing unit 110, and display image forming unit 111.

Also, the imaging apparatus 100 has a control unit 120, operating unit 131, external interface 132, input/output terminal 133, writing/reading unit 134, recording medium 135, and clock circuit 136.

The display unit 106 is made up of a so-called thin-type display device such as a LCD (Liquid Crystal Display), organic EL panel (Organic Electroluminescence Panel), or the like. The touch panel 107 is adhered as to the entire face of the display screen of the display unit 106 so as to form an operating face, which will be described later.

The touch panel 107 accepts an instruction operation (touching operation) as to the operating face from a user (person using), detects an instruction position (touching position) of the operating screen, and notifies the control unit 120 of the coordinates data indicating the instruction position.

The control unit 120 is configured to control each unit of the imaging apparatus 100, and recognizes what sort of display is performed as to the display screen of the display unit 106, which will also be described later. The control unit 120 can accept instruction operations (input operations) from the user, based on coordinates data indicating the instruction position on the operating face from the touch panel 107 and the display information on the display screen of the display unit 106 corresponding to the instruction position.

For example, let us say that a user causes a finger or stylus or the like to make contact at the position on the operating face of the touch panel 107. In this case, in the case that a number is displayed on the position on the display screen that corresponds to (matches) the touching position thereof, the user can distinguish that the number displayed thereupon is to be selected and input with the control unit 120.

Thus, with the imaging apparatus 100, a touch screen 108 serving as an input device is formed by the display unit 106 and touch panel 107. Note that the touch panel 107 is realized as a pressure-sensitive type or an electrostatic type, for example. Also, the touch panel 107 detects each of the operations to be performed at the same time at multiple locations on the operating screen, and the coordinates data indicating each of the touching positions thereof can be output. Also, the touch panel 107 detects each of the operations to be performed repeatedly as to the operating screen, and the coordinates data indicating each of the touching positions thereof can be output.

Further, the touch panel 107 can detect the touching positions continuously for each predetermined timing during the finger or stylus being in contact by the user, and can output coordinates data indicating this. Thus, the touch panel 107 can accept various instruction operations (operating input) from the user such as a so-called tapping operation, double-tap operation, dragging operation, flicking operation, pinching operation, and so forth, and can detect this.

Here, the tapping operation is a movement (operation) to instruct a predetermined point on the operating face as a "tap" by the user finger or stylus. The double-tap operating is a movement to instruct "tap, tap" twice at one predetermined point on the operating face.

Also, the dragging operation is a movement to move the user finger or stylus while remaining in contact on the operating face. The flicking operating is a movement to quickly "flick" as is in an optional direction after instructing the one point on the operating face with the user finger or stylus.

The pinching operation is a movement to simultaneously touch two user fingers or the like on the operating face and opening or close the two fingers or the like. In this case, particularly the operating to open the touching two fingers or the like is called a pinch-out operation, and an operation to close the two fingers or the like is called a pinch-in operation.

While there is a difference in the speed of the movement, the dragging operation and flicking operation are operations to move on the operating face after touching on the operating face with the user finger or the like (a tracing operating on the operating face), and are operations that can be recognized by two types of information of moving distance and moving direction.

Therefore, with the present Specification, in the case that by performing one of the operations of the dragging operating and flicking operation, the same processing can be performed, a summary phrase called "tracing operation" will be used for the dragging operation and flicking operation.

The control unit 120 is connected with each unit making up the imaging apparatus 100, and as described above also, controls each unit of the imaging apparatus 100, and has a so-called microcomputer configuration. The control unit 120 is configured so that a CPU (Central Processing Unit) 121, ROM (Read Only Memory) 122, RAM (Random Access memory) 123, and EEPROM (Electrically Erasable and Programmable ROM) 124 are connected through a CPU bus 125.

The CPU 121 reads out and executes a program stored on the later-described ROM 122, forms a control signal to supply to each unit, supplies this to each unit, also accepts data and so forth provided from each unit, and processes this.

The ROM 122 stores and holds beforehand various types of programs executed with the CPU 121 and various types of data and so forth for processing, as described above. The RAM 123 is used primarily as a work area, such as temporarily storing mid-point results in various types of processing.

The EEPROM 124 is non-volatile memory, and stores and holds information that should be held even if the power of the imaging apparatus 100 is turned off. For example, various types of parameters set by the user, final results of various types of processing, or processing programs and data and so forth newly provided for the purpose of adding functions, are held in the EEPROM 124.

As shown in FIG. 1, in addition to various types of circuit units for the purpose of realizing a later-described photographing function and a reproducing function of the images photographed and recorded, an operating unit 131, external interface 132, writing/reading unit 134, and clock circuit 136 are connected as to the control unit 120 thus configured.

The operating unit 131 has operating keys such as various types of adjusting key, function key, shutter key and so forth, accepts operating input from the user, and notifies this to the control unit 120. Thus, the control unit 120 controls each unit according to the operating input from the user that was accepted by way of the operating unit 131, and can execute processing according to the operating input.

The external interface 132 is a digital interface compliant with predetermined standards, such as USB (Universal Serial Bus) and IEEE (Institute of Electrical and Electronics Engineers Inc) 1394, for example. That is to say, the external interface 132 converts and accepts data from external devices connected to the input/output terminal 133 into data of a format that can be processed by the own device, and converts and outputs data transmitted from the own device into data in a predetermined format.

The writing/reading unit 134 writes in data as to the recording medium 135 of the own device and reads out data recorded on the recording medium 135 according to the control of the control unit 120.

With the imaging apparatus 100, the recording medium 135 is configured so as to be attachable/detachable as to the imaging apparatus 100, and for example semiconductor memory is used, and is removable memory in a memory card form that has a storage capacity of several gigabytes or more. Note that besides the removable memory in memory card form, a built-in form of recording medium such as an internal flash memory or small hard disk, for example, may be configured as the recording medium 135. Also, another configuration using a removable form of recording medium such as an optical disk such as a small DVD (Digital Versatile Disc) or CD (Compact Disc) may be used.

The clock circuit 136 has a calendar function, and can provide current year/month/date, current day of week, and current time, and can also realize a function of a time counter that measures predetermined time intervals as appropriate.

With the function of the clock circuit 136, information relating to the photograph day such as the photographing date and time or the photograph day of week, can be appended as to the photographed image data. Also, the function of the clock circuit 136 can be used to realize a self timer photograph function that can automatically close the shutter after a certain amount of time has passed from a predetermined operation, so as to take a photograph.

In the imaging apparatus 100 shown in FIG. 1, although not shown in the diagram, the lens unit 101 includes an imaging lens (field lens), exposure adjusting mechanism, focus adjusting mechanism, shutter adjusting mechanism and so forth, and is a portion that forms a image on a sensor face of a downstream imaging device to take the image of a subject.

The imaging device 102 is made up of an imaging sensor (imaging device) such as a CCD (Charge Coupled Device), CMOS (Complementary Metal Oxide Semiconductor) image sensor, or the like. The imaging device 102 takes in an image that is to be image-formed on its own sensor face by way of the lens unit 101 as an electrical signal (image signal).

With the imaging apparatus 100 of the first embodiment herein, the imaging device 102 has single-sensor color filters of predetermined color patterns so as to form one signal of R (red), G (green), or B (blue) for each pixel.

The image signal taken in by way of the imaging device 102 is supplied to the later-stage pre-processing unit 103. The pre-processing unit 103 includes a CDS (Correlated Double Sampling) and AGC (Automatic Gain Control) circuit and A/D (Analog/Digital) converter and so forth, and is a portion to take in the image signal from the imaging device 102 as digital data.

The image signal (image data) taken in by way of the pre-processing unit 103 is supplied to the image processing unit 104. The image processing unit 104 has a wave-detecting circuit, a white balance circuit, a demosaicing circuit, a resolution converting circuit, and other image correcting circuits and the like, which are all unshown here.

With the image processing unit 104, first, based on the image data from the pre-processing circuit 103, parameters for the purpose of various types of adjusting processing is formed, such as parameters for the purpose of exposure adjusting, parameters for the purpose of focus (focal point) adjusting, and parameters for the purpose of white balance adjusting.

Within the parameters formed with the image processing unit 104, the parameters for the purpose of exposure adjusting, and parameters for the purpose of focus (focal point) adjusting are supplied to the control unit 120. The control unit 120 controls the exposure adjusting mechanism and focus adjusting mechanism of the lens unit 102 based on the parameters from the image processing unit 104, so that adjusting for exposure and focus can be appropriately performed.

With the image processing unit 104, black level setting processing and white balance adjusting processing based on the parameters for the purpose of white balance adjusting formed as described above are performed as to the image data from the pre-processing unit 103. With the adjusting processing herein, the images forming the image data from the pre-processing unit 103 are adjusted to have an appropriate coloring.

After this, with the image processing unit 104, demosaic processing to generate RGB data (3 primary color data) for each pixel (concurrent processing), aperture correcting processing, and gamma (γ) correction processing and so forth are performed as to the image data adjusted so as to have an appropriate coloring.

Further, with the image processing unit 104, Y/C converting processing to form a luminance signal (Y) and color signals (Cb, Cr) from the formed RGB data, chromatic aberration correcting processing, resolution converting processing and so forth are performed to form the luminance signal Y and the color signals Cb and Cr.

The image data (luminance signal Y and color signals Cb, Cr) formed with the image processing unit 104 is supplied to the display processing unit 105, converted to image signals in a format to be supplied to the display 106, and supplied to the display unit 106.

Thus, an image of a subject taken in by way of the lens unit 101 is displayed on the display screen of the display unit 106, and the user can photograph the image of the targeted subject, while confirming the image of the subject displayed on the display screen of the display unit 106.

Simultaneously, the luminance signal Y and color signals Cb, Cr formed with the image processing unit 104 are supplied also to the compression processing unit 109. At the timing that the shutter key of the operating unit 131 is pressed, the compression processing unit 109 data-compresses the image data of the image to be displayed on the display screen of the display unit 106 at the point-in-time thereof, and supplies this to the control unit 120.

Note that with the compression processing unit 103, data compression processing is performed according to a predetermined data compression method. As one example, JPEG (Joint Photographic Experts Group) may be used for the data compression method if the image is a still image, MPEG (Moving picture Experts Group) if a moving image, and so forth. Of course, embodiments of the present invention are not restricted to such an arrangement and various types of data compression methods can be used.

The control unit 120 controls the writing/reading unit 134, and records the data-compressed image data from the compression processing unit 109 on the recording medium 135. Thus, with the imaging apparatus 100, an image of the subject is photographed, and the image data forming an image of the subject can be recorded on the recording medium 135.

With the imaging apparatus 100, although this will be described in detail below, the image data photographed and obtained as described above can be stored on the recording medium 135 and managed by user-formed folders by photographing year/month/date.

Folders can be formed according to purpose, such as for each subject or for each event or the like. With the imaging apparatus 100 of the first embodiment, for example, the folders are formed for each event that photographing is performed, such as an Family reunion, Athletic event, birthday party, and so forth. Of course, moving the photographed image data later to a targeted folder and so forth can be performed.

The image data recorded on the recording medium 135 can be read out by the writing/reading unit 134 that is controlled by the control unit 120. The image data read out from the recording medium 135 is supplied to the decompression processing unit 110 by way of the control unit 120.

The decompression processing unit 110 subjects the image data supplied thereto to decompression processing according to the data compression method used at time of data compression, restores the image data to before the data compression, and supplies this to the display image forming unit 111.

The display image forming unit 111 uses image data from the decompression processing unit 110, may use various types of data to be displayed that are supplied from the control unit 120, forms the image data of the image to be displayed on the display screen of the display unit 106, and supplies this to the display processing unit 105.

Similar to when the image data from the image processing unit 104 is processed, the display processing unit 105 converts the image signal of the format supplied to the display unit 106 from the image data that is from the display image forming unit 111, and supplies this to the display unit 106.

Thus, the image according to the image data recording on the recording medium 135 can be displayed on the display screen of the display unit 106. That is to say, the image data of the targeted image recorded on the recording medium 135 can be reproduced.

Thus, the imaging apparatus 100 of the first embodiment can photograph an image of a subject, and record this on the recording medium 135. Also, the imaging apparatus 100 can read out the image data recorded on the recording medium 135 and subject this to reproducing processing, and can display the image according to the image data on the display screen of the display unit 106.

Image Data Managing Method

With the imaging apparatus 100 of the first embodiment, the photographed and obtained image data is not to be stored and managed simply in folder increments. As described above also, the photographed image data is stored and managed on the recording medium 135 by photographing year/month/date, and by each folder that the user forms.

Figure 2:
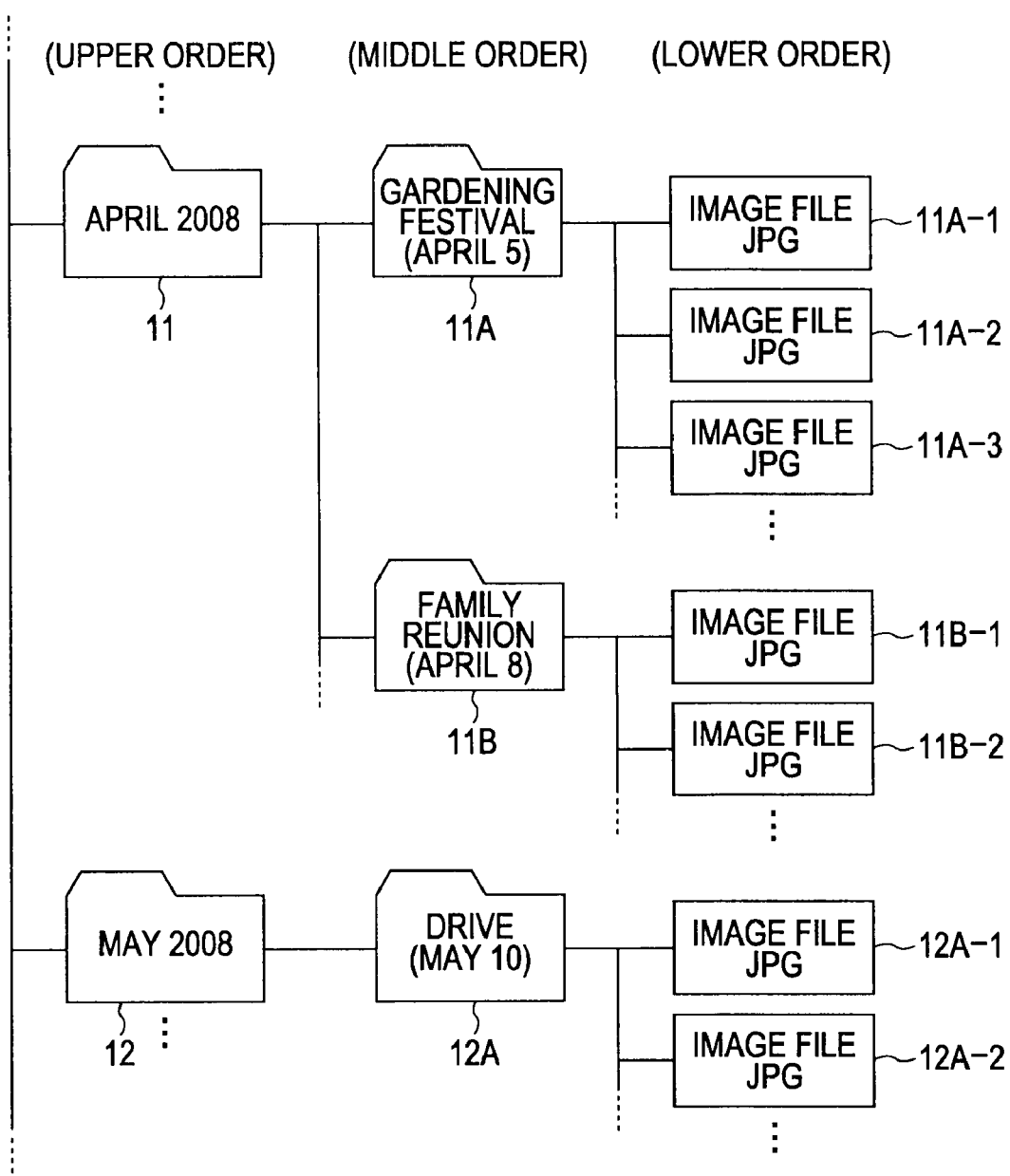
FIG. 2 is a diagram to describe a managing method of image data with the imaging apparatus.

FIG. 2 is a diagram to describe a managing method of image data with the imaging apparatus 100. For example, the year/month virtual folders 11, 12, and so on, which bunch the image data by photographing year/month increments, are provided below a root folder having the role of bundling all image data (not shown in FIG. 2). FIG. 2 shows that a year/month virtual folder 11 of "April 2008" and a year/month virtual folder 12 of "May 2008" exist.

Also, FIG. 2 shows that event virtual folders 11A, 11B, and so on, that bunch together the image data photographed during the time indicated by the year/month exist in the year/month virtual folder 11. Similarly, this shows that event virtual folders 12A, 12B, and so on, that bunch together the image data photographed during the time indicated by the year/month exist in the year/month virtual folder 12.

In the case of the example shown in FIG. 2, the "gardening festival (April 5)" event virtual folder 11A and "Family reunion (April 8)" event virtual folder 11B and so forth exist in the year/month virtual folder 11 for "April 2008". Also, the "Drive (May 10)" event virtual folder 12A exists in the year/month virtual folder 12 for "May 2008". Thus, event virtual folders are registered in the order of photographing year, month, date in the year/month virtual folder.

Image files photographed at the event thereof are stored in the order of photographing date/time in each event virtual folder. In the case of the example shown in FIG. 2, the image files 11A-1, 11A-2, 11A-3, and so on, exist in the "Gardening festival (April 5)" event virtual folder 11A.

Similarly, the image files 11B-1, 11B-2, and so on, exist in the "Family reunion (April 8)" event virtual folder 11B, and the image files 12A-1, 12A-2, and so on, exist in the "Drive (May 10)" event virtual folder 12A.

Thus, with the imaging apparatus 100 of the first embodiment herein, the photographed and obtained image data is managed in three orders, such as the year/month virtual folder (upper order), event virtual folder (middle order), and each image file (lower order).

Thus, managing what sort of event wherein photography is performed exists in each month of each year, and what sort of image data exists for each event is enabled. That is to say, the image files obtained by photographing are arrayed in photographing date/time order and in event order so as to be managed.

Note that FIG. 2 shows the case wherein only one event virtual folder is formed for each date, but should not be restricted to this. It goes without saying that there are cases wherein multiple event virtual folders are formed on the same date.

Also, FIG. 2 shows only two year/month virtual folders of "April 2008" and "May 2008", but year/month virtual folders for each month before "April 2008" and year/month virtual folders for each month after "May 2008" also exist.

Layout Example of Virtual Folders and Image Files
Layout Example of Year/Month Virtual Folder FIG. 3 is a diagram describing a layout example of the year/month virtual folder position on the upper order, as shown in FIG. 2. As shown in FIG. 3, the year/month virtual folder has year/month information serving as identification information. The year/month information herein is information indicating the photographing year/month such as "April 2008" and "May 2008".

Further, the year/month virtual folders have various types of metadata relating to the year/month virtual folders, such as the created date/time of the year/month virtual folders and the number of folders registered. The metadata herein can append information such as keywords that a user inputs by way of the operating unit 131 and so forth, besides the information that can be automatically obtained by the functions of the control unit 120 and clock circuit 136, such as date-and-time of creating, number of folders, and so forth.

In FIG. 3, folder names identifying one or more event virtual folders stored in the year/month virtual folders are stored in the year/month virtual folders, such as folder 1 (event name), folder 2 (event name), folder 3 (event name), and so on.

Also, as shown in FIG. 3, for each folder name, information, such as the created date/time of the event virtual folder that the folder name identifies, can also be correlated and stored. Thus, with the information of the year/month virtual folders, what sort of event virtual folders belong in each year/month virtual folder can be managed.

Layout Example of Event Virtual Folder

FIG. 4 is a diagram describing a layout example of the event virtual folder positioned at the middle order, as shown in FIG. 2. As shown in FIG. 4, the event virtual folder has a folder name serving as identification information. The folder name thereof is information such as "Gardening festival", "Family reunion", and so forth.

Further, the event virtual folder has various types of metadata relating to the event virtual folder, such as more detailed event name and created date/time of the event virtual folder. The user can input information such as the event name by way of the operating unit 131. Also, created date/time is information that can be automatically obtained by the functions of the control unit 120 and clock circuit 136. Of course, various types of metadata other than these can be appended.

In FIG. 4, file names identifying one or more image files that are stored in the event virtual folder are stored, such as file 1, file 2, file 3, and so on. Also, information such as the address on the recording medium and created date/time indicating the recording position of the image file are also correlated to each file name and stored.

Thus, what sort of image file belongs to each event virtual folder, and where on the recording medium is the image file thereof recorded, can be managed with the information of the event virtual folder.

Layout Example of Image File

Figures 5, 6:
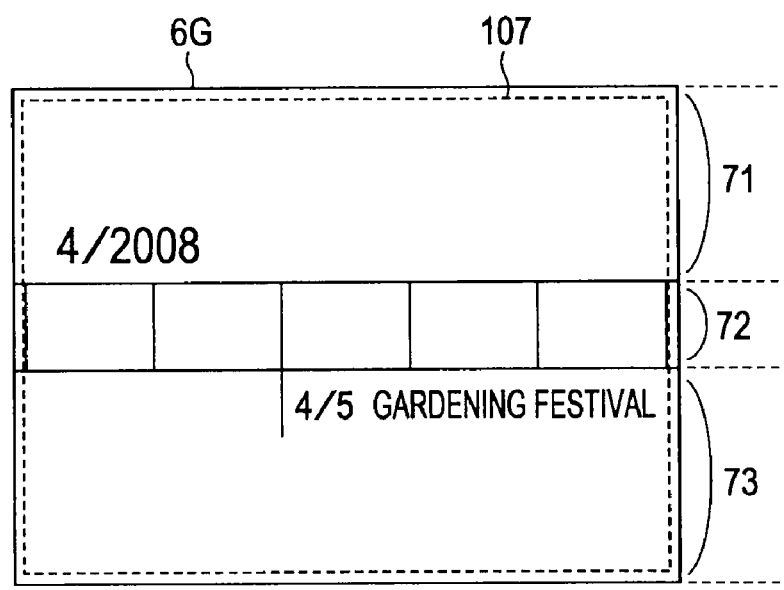
FIG. 5 is a diagram to describe a layout example of an image file positioned on a lower order, as shown in FIG. 2.
FIG. 6 is a diagram to describe a search screen for image data (image search screen) used with the imaging apparatus.

FIG. 5 is a diagram describing a layout example of the image file positioned on the lower order, as shown in FIG. 2. As shown in FIG. 5, the image file has a file name serving as identification information.

Further, the image file has various types of metadata such as the file created date/time, the event name corresponding to the image data stored in the file, and thumbnail image (reduced image) of the image that the image data stored in the file forms, and so forth.

The created date/time within the image file is information that can be automatically obtained by the function of the control unit 120 and the function of the clock circuit 136. Also, the user can input the information such as the event name can by way of the operating unit 131.

The thumbnail image within the image file is generated from the image data obtained by photographing at the time of photographing or at a predetermined timing after photographing with the function of the control unit 120, and stored in the predetermined area. Other various types of metadata can be appended, as well.

Thus, image data (still image data or moving image data) obtained by photographing is data-compressed and stored as main data in the image file to which a file name and various types of metadata are appended as identification information.

The image according to the image data can be displayed on the display screen of the display unit 106 by reproducing processing of the image data of the image file.

Overview of Image Search Processing

With the imaging apparatus 100 of the first embodiment herein, a search of the image data managed as described using FIGS. 2 through 5 can be performed quickly and accurately by using the touch screen 8 without performing tedious operations.

FIG. 6 is a diagram to describe the search screen of the image data (image search screen) used with the imaging apparatus 100 of the first embodiment herein. A touch panel 107 is adhered onto the entire face of the display screen 6G of the display 106 and an operating screen is formed, as shown with the dotted lines along the outer edges of the display screen 6G.

With the image searching screen, as shown in FIG. 6 the control unit 120 divides the operating face of the touch panel 107 formed on the entire face of the display screen 6G of the display 106 into three areas in the vertical direction of the display screen 6G.

That is to say, as shown in FIG. 6, the control unit 120 recognizes the range (position and size) of each area on the operating face with the upper order as the date area 71, the middle order as the image area 72, and the lower order as the event area 73.

Further, the control unit 120 divides the display screen 6G also into three display areas to match each of the date area 71, image area 72, and event area 73 which have been formed by dividing the operating face of the touch panel 107 into three. The control unit 120 also recognizes the range of the divided display areas (position and size) on the display screen 6G.

Thus, in forming the image search screen, the control unit 120 divides the display screen 6G into three display areas in the vertical direction as shown in FIG. 6, and corresponding to each display area, the operating face of the touch panel 107 can be understood to have been divided into three operating areas.

Therefore, with the image searching screen shown in FIG. 6, the operating face of the touch panel 107 and the display screen 6G of the display unit 106 are both divided into the date area 71, image area 72, and event area 73, and each area will be described using the same reference numerals.

In the image searching screen shown in FIG. 6, the upper order date area 71 is an area to display the photographing year/month information. For example, year/month information, which is the identification information of the year/month virtual folder described using FIGS. 2 and 3, is displayed in the date area 71 herein.

Also, the lower order event area 73 is an area to display the event name information and so forth. For example event name information which is the identification information of the event virtual folder described using FIGS. 2 and 4 (folder name information) and the creating month/date information within the created date/time (photographing date/time) of the image file stored in the event virtual folder are displayed on the event area 73.

Also, the image area 72 of the middle order is an area to display thumbnail images. Primarily images from the thumbnail data of the image files belonging to the event virtual folder identified by the event name information display on the event area 73 are displayed on the image area 72.

That is to say, year/month information of the year/month virtual folder is displayed in the date area 71. Event name information and so forth of the event virtual folder belonging to the year/month virtual folder is displayed in the event area 73. Thumbnail images from the thumbnail data of the image file belonging to the event virtual folder are displayed on the image area 72.

Accordingly, the image search screen shown in FIG. 6 is a case wherein image data stored in the event virtual folder "gardening festival" belonging to the year/month virtual folder "April 2008" is displayed. In other words, the image search screen shown in FIG. 6 shows a case wherein image data photographed at the "gardening festival" which is one of the events performed in "April 2008" is displayed.

Note that as shown in FIG. 6, multiple thumbnail images can be displayed in the image area 72. Therefore, as will be described below also, there are also cases that the thumbnail image of an image file of the trailing portion of one event virtual folder and the thumbnail image of an image file of the leading portion of the next event virtual folder are displayed.

With the imaging apparatus 100, upon the user performing the image data search, the control unit 120 controls each related unit, forms the image search screen shown in FIG. 6, and displays the display screen 6G of the display unit 106. In this case, each unit controlled by the control unit 120 in order to display the image search screen is the writing/reading unit 134, decompression processing unit 110, display image forming unit 111, and display processing unit 105.

Thus, with the imaging apparatus 100 of the first embodiment, the operating face of the touch panel 107 is divided into three regions, and each region is given a meaning. By the user operating an optional divided region, the desired image group can be called up.

The image searching processing using the image search screen configured as in FIG. 6 will be described in detail, using the FIGS. 7A through 12B. Note that the image search screen shown in FIG. 6 is formed by dividing the operating face of the touch panel 107 and the display screen of the display unit 106 into three so that each match, hereinafter referred to as "3-division screen" as appropriate.

Change to Year/Month Virtual Folder (Upper Order)

First, a case of changing the year/month virtual folder will be described with the image search screen described using FIG. 6. FIGS. 7A through 7D are diagrams to describe a case of changing the image to be displayed by performing a change to the photographing year/month of the image subject to being displayed, with the image search screen configured as in FIG. 6 (change to year/month virtual folder).

Figure 7B:
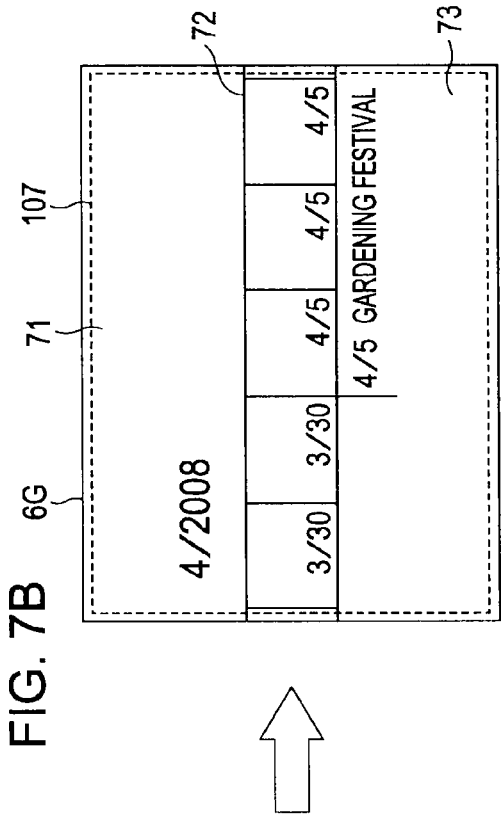
FIGS. 7A through 7D are diagrams to describe a case of changing the image to be displayed, by performing a change to the photographed year/month of the image subject to display (change of year/month virtual folder)
Figure 7D:
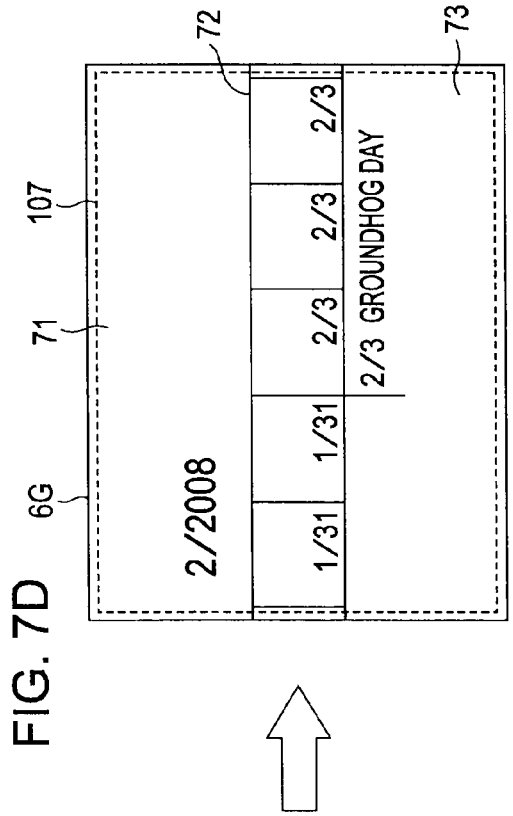
Figure 7A:
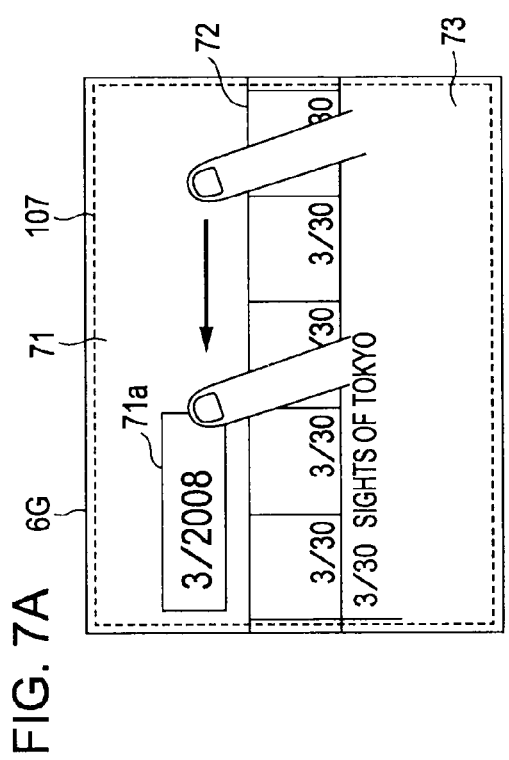

As shown in FIG. 7A, year/month display is given in the year/month area 71 as "March 2008", and the event name information is given in the event area 73 as "3/30 Sights of Tokyo". Multiple (five) thumbnail images (image group) are displayed in the image area 72.

This state shown in FIG. 7A shows that the thumbnail images of the image file stored in the event virtual folder "Sights of Tokyo" belonging to the year/month virtual folder "March 2008" are displayed in the image area 72. Also, the display of "3/30" at the beginning of the event name information indicates that the image data stored in the event virtual folder has been photographed on Mar. 30, 2008.

In this case, as shown in FIG. 7A, let us say that the user touches a finger as to the upper order date area 71 of the operating screen on the touch panel 107, and as indicated by the arrow, performs a tracing operation (dragging operation or flicking operation) in the left direction as to the display screen.

At this time, the display information displayed in the display area corresponding to the operating area which the finger of the user or the like has touched, in the case of FIG. 7A, the year/month information 71a, is displayed highlighted or displayed in inverse, to notify that the year/month information 71a has been touched.

Also, in the case that the contact of the finger of the user or the like touching the date area 71 has ended, the display returns to the original state. An on/off control of this sort of highlighted display or inverse display of the display information can be performed by the control unit 120 controlling the display processing/unit 105, for example.

The touch panel 107 then sequentially detects the touching position (coordinates) of the finger on the operating screen that changes according to the tracing operation, and notifies this to the control unit 120 as coordinates data indicating the position on the operating face.

The control unit 120 recognizes what sort of operation has been performed as to which operating area of the operating face, based on the coordinates data according to the tracing operation. Accordingly, in the case of the example shown in FIG. 7A, the control unit 120 recognizes that a tracing operation from the right to left (tracing operation in the left direction) has been performed in the date area 71.

The control unit 120 determines that the tracing operation in the date area 71 means a change in the photographing year/month (change in the year/month virtual folder), and changes the year/month virtual folder according to the direction of the tracing operation.

When in the state shown in FIG. 7A, in the case that tracing operation is performed towards the left direction as to the date area 71, the control unit 120 determines that this is a change operation of year/month virtual folder in the direction of advancing the time.

In the state shown in FIG. 7A, that is to say in the case that the current year/month virtual folder is "March 2008", the next year/month virtual folder in the direction of advancing the time becomes the year/month virtual folder "April 2008", according to the example shown in FIG. 2.

The control unit 120 identifies the year/month virtual folder to be positioned next in the direction of advancing the time, and year/month information of "April 2008" which is the identification information thereof is obtained by referencing the identified year/month virtual folder.

The control unit 120 then displays the obtained year/month information in the date area 71 on the display screen 6G of the display device 106 by way of the display image forming unit 111 and display processing unit 105, as shown in FIG. 7B.

The first event virtual folder in time-series order belonging to the year/month virtual folder "April 2008" after changing is identified as the event virtual folder after changing, and obtains the event name information "gardening festival" from the event virtual folder after changing.

The event name information here is to correspond to the folder name of the event virtual folder. Note that as described using FIG. 4, in the case that detailed event name information is appended to the event virtual folder, this can also be used.

Also, at the same time as obtaining the event name information, the control unit 120 obtains the creating month/date "4/5" within the created date/time of the image file belonging to the event virtual folder, as information indicating the photographing month/date. Thus, using the created date information of the image file is because not necessarily does the created date information of the event virtual folder itself match the photographing date of the image data.

The control unit 120 then displays the obtained event name information and creating month/date information in the event area 73 on the display screen 6G of the display device 106 by way of the display image forming unit 111 and display processing unit 105 as shown in FIG. 7B.

Next, the control unit 120 reads out the thumbnail data of the image file that is a predetermined number from the lead within the image files registered in time-series order of the event virtual folder "gardening festival" after the identified change.

The control unit 120 then displays the thumbnail data in the image area 72 on the display screen 6G of the display device 106 by way of the display image forming unit 111 and display processing unit 105, as shown in FIG. 7B.

Note that in the example shown in FIG. 7B, the thumbnail data that is a predetermined number from the tail within the image files registered in time-series order is read out to the event virtual folder position immediately prior (one before) in the time-series order of the event virtual folder after changing.

The control unit 120 also displays the thumbnail images according to the thumbnail data read out from the event virtual folder immediately prior in the front portion of the image area 72, by way of the display image forming unit 111 and display processing unit 105.

In the case of the example shown in FIG. 7B, the thumbnail images of the three images belonging to the event virtual folder after the photographing year/month change, and the thumbnail image of the two images belonging to the event virtual folder immediately prior, are displayed in time-series order.

Thus, the example shown in FIGS. 7A through 7D shows the image of the first portion in the time-series order with the event virtual folder after changing and the image of the last portion in the time-series order with the event virtual folder immediately prior, at the same time. By doing so, the managing state of the images managed according to time-series (the state of image rolling) can also be confirmed.

Thus, by performing operations to change in the direction to advance the photographing year/month, with the photographing year/month serving as the current display target as a reference, the image stored in the event virtual folder positioned first in the next year/month folder can be displayed in the image area 72.

Figure 7C:
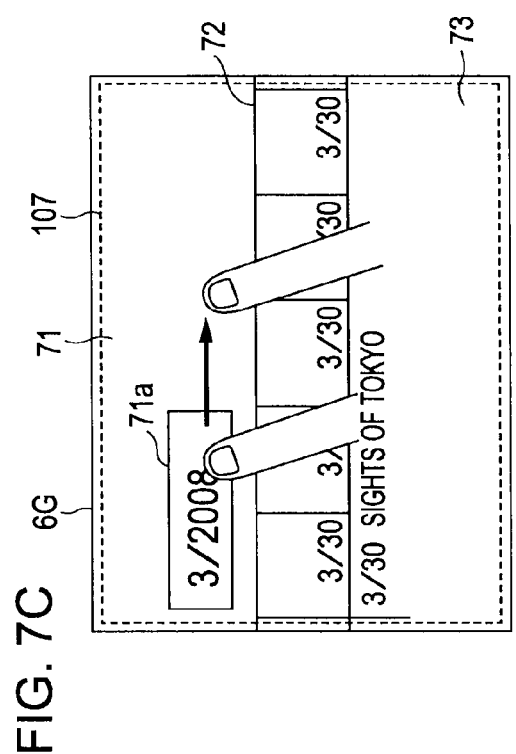

Also, conversely, when the state is as shown in FIG. 7C (the display content is the same as the state shown in FIG. 7A), as indicated by the arrow in FIG. 7C, let us say that a tracing operation in the right direction has been performed on the display screen. In this case, the control unit 120 determines that the change operation of the year/month virtual folder towards the direction of going back in time.

With the embodiment herein, although not shown in FIG. 2, a year/month virtual folder for each month before April 2008 and a year/month virtual folder for each month after May 2008 also exist in the recording medium 135 of the imaging apparatus 100, as described above also.

Also, when in the state of FIG. 7C, the year/month virtual folder next in the direction of going back in time (the year/month virtual folder immediately prior to the year/month virtual folder "March 2008"), becomes the year/month virtual folder "February 2008".

The control unit 120 identifies the year/month virtual folder positioned next in the direction of going back in time, and references the identified year/month virtual folder and obtains the year/month information "2008.2" which is the identification information thereof.

The control unit 120 then displays the obtained year/month information in the date area 71 on the display screen 6G of the display device 106 by way of the display image forming unit 111 and display processing unit 105, as shown in FIG. 7D.

Next, the control unit 120 identifies the first event virtual folder in the time-series order belonging to the year/month virtual folder "February 2008" after changing, as the event virtual folder after changing, and obtains the event name information "Groundhog Day" from the event virtual folder after changing.

Also, at the same time as obtaining the event name information, the control unit 120 obtains the creating month/date "2/3" within the created date/time of the image file belonging to the event virtual folder, as information showing the photographing month/date.

The control unit 120 displays the obtained event name information and creating month/date information in the event area 73 on the display screen 6G of the display device 106 by way of the display image forming unit 111 and display processing unit 105, as shown in FIG. 7D.

Next, the control unit 120 reads out the thumbnail data of the image file that is a predetermined number from the lead within the image files registered in time-series order in the event virtual folder "Groundhog Day" after the identified change.

The control unit 120 then displays the thumbnail data in the image area 72 on the display screen 6G of the display device 106 by way of the display image forming unit 111 and display processing unit 105, as shown in FIG. 7D.

Note that in the example shown in FIG. 7D also, the thumbnail data that is a predetermined number from the tail within the image files registered in time-series order in the event virtual folder "January 2008" positioned immediately prior (one before) in the time-series order in the event virtual folder after changing is read out.

The control unit 120 also displays the thumbnail image according to the thumbnail data read out from the event virtual folder immediately prior, on the front portion of the image area 72 by way of the display image forming unit 111 and display processing unit 105.

That is to say, in the case of this example, as shown in FIG. 7D, the control unit 120 displays the last two images of the year/month virtual folder "January 2008" and the first three images of the year/month virtual folder "February 2008" in the display area on the display screen 6G that corresponds to the image area 72.

In this case also, by displaying the image of the first portion in time-series order with the year/month virtual folder after changing and the image of the last portion in time-series order within the year/month virtual folder immediately prior at the same time, the managing state of the images managed according to time-series (the state of image rolling) can also be confirmed.

Thus, by performing an operation to change in the direction of returning the photographing year/month, with the photographing year/month that is a current display target as a reference, the images stored in the event virtual folder first positioned in the prior year/month folder can be displayed in the image area 72.

Also, in the case shown in FIG. 7C also, similar to the case described using FIG. 7A, the information displayed in the corresponding display area, in the case of FIG. 7C, the highlighted displays and reverse displays of the year/month information 71a are controlled, according to the touching position of the finger or the like of the user.

Thus, with the imaging apparatus 100 of the first embodiment herein, the year/month virtual folders, event virtual folders, and image files are managed in time-series order. As described using FIGS. 7A through 7D, by performing the tracing operation as to the date area 71 of the operating face of the touch panel 107, the year/month virtual folder that is a display target can be changed in the direction to forward or to return.

Note that in the case of the example described using FIGS. 7A through 7D, the images of the event virtual folder positioned at the lead of the time-series order of the year/month virtual folder after changing are displayed, but embodiments of the present invention are not restricted to this arrangement. For example, displaying can be performed from the lead image in the time-series order of the event virtual folder positioned at the tail of the time-series order of the year/month virtual folder after changing.

Also, in the case of changing the year/month virtual folder in the direction of advancing the time, as described above the images of the event virtual folder positioned at the lead in the time-series order of the year/month virtual folder after changing are displayed.

Conversely, in the case of changing the year/month virtual folder in the direction of going back in time, displaying can be performed from the lead image in the time-series order of the event virtual folder positioned at the tail of the time-series order of the year/month virtual folder after changing.

Also, in the case of the example described above using FIGS. 7A through 7D, the thumbnail images at the tail of the event virtual folder of the tail of the year/month virtual folder before changing are also displayed at the same time. That is to say, along with the thumbnail images of the event virtual folder after changing, the thumbnail images of the event virtual folder immediately prior thereto is also displayed.

In the case of the example shown in FIGS. 7A through 7D, five thumbnail images have been able to be displayed in the image area 72. Therefore, three thumbnail images are displayed from the lead of the event virtual folder after changing, and two thumbnail images are displayed from the tail of the event virtual folder immediately prior thereto.

However, this is but one example, and the number of images (thumbnail images) to be displayed can be made to be an appropriate number. Accordingly, it goes without saying that all of the thumbnail images of the event virtual folder after changing can be displayed.

Also, in the case of the example described using FIGS. 7A through 7D, the images displayed in the image area 72 has been described as using thumbnail data that is stored beforehand in a corresponding image file. However, embodiments of the present invention are not restricted to this arrangement.

In the case that thumbnail data does not exist, thumbnail data can be formed at time of displaying processing with the imaging apparatus 100, and this can also be used. That is to say, the image data of the image file is subjected to decompression processing with the decompression processing unit 110, and after the image data before data compression is restored, thumbnail data is formed by subjecting this to thinning processing at the display image forming unit 111 and so forth, and using this for the display.

However, by preparing the thumbnail data in each image file beforehand, as described above, performing decompression processing of the image data and forming processing of the thumbnail data at the time of displaying the thumbnail image in the image area 72 can be omitted. From this point, preparing the thumbnail data beforehand for each image file is desirable.

Change to Event Virtual Folder (Middle Order)

Figure 8B:
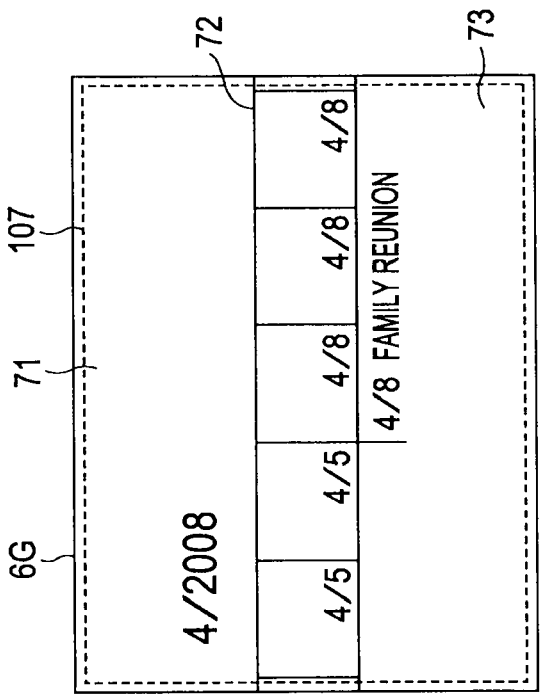
FIGS. 8A and 8B are diagrams to describe a case of changing the image to be displayed, by performing a change to the event subject to display (change of event virtual folder)
Figure 8A:
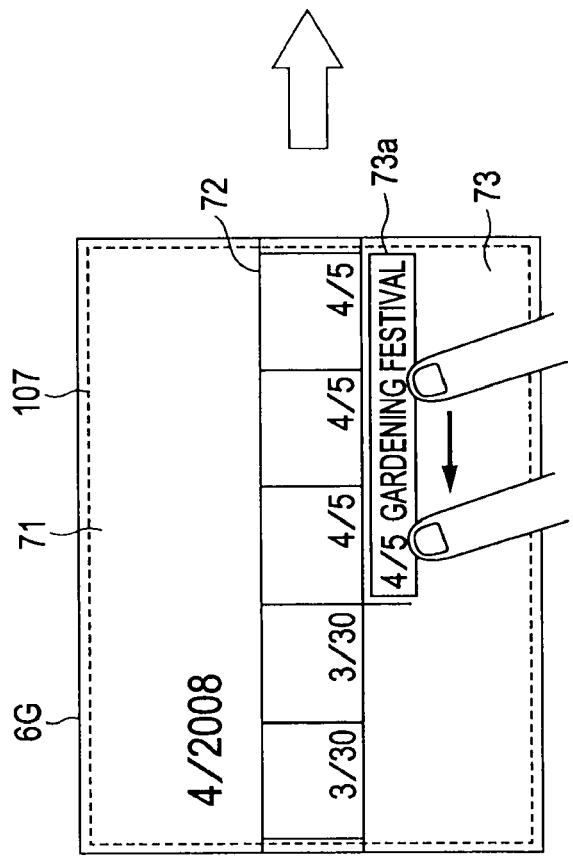

Next, a case of changing the event virtual folder with the image search screen described using FIG. 6 will be described. FIGS. 8A and 8B are diagrams to describe a case of changing the image to display by performing a change in the event subject to display (changing the event virtual folder) with the image search screen configured as in FIG. 6.

As shown in FIG. 8A, a year/month display of "April 2008" is in the year/month area 71, and event name information of "4/5 gardening festival" is displayed in the event area 73. Also, multiple thumbnail images are displayed in the image area 72.

The state shown in FIG. 8A shows that the thumbnail images corresponding to the image files stored in the event virtual folder "gardening festival" belonging to the year/month virtual folder "April 2008" are displayed in the image area 72.

Also, the image data stored in the event virtual folder, such as "4/5" before the event name information, shows that the photograph is taken on Apr. 5, 2008.

In this case, as shown in FIG. 8A, let us say that the user touches a finger as to the event area 73 in the lower order of the operating face of the touch panel 107, and as indicated by the arrow, performs a tracing operation (dragging operation or flicking operation) in the left direction as to the display screen.

At this time, the display information displayed in the display area corresponding to the operating area that the finger or the like of the user has touched, in the case of FIG. 8A, the event name information 73a is displayed highlighted or displayed in inverse, to notify that the event name information 73a has been touched.

Also, in the case that the contact of the finger of the user or the like touching the event area 73 has ended, the display returns to the original state. An on/off control of this sort of highlighted display or inverse display of the display information can be performed by the control unit 120 controlling the display processing unit 105, for example.

The touch panel 107 then sequentially detects the touching position (coordinates) of the finger on the operating screen that changes according to the tracing operation, and notifies this to the control unit 120 as coordinates data indicating the position on the operating face.

The control unit 120 recognizes what sort of operation has been performed as to which operating area of the operating face, based on the coordinates data according to the tracing operation. Accordingly, in the case of the example shown in FIG. 8A, the control unit 120 recognizes that a tracing operation from the right to left (tracing operation in the left direction) has been performed in the event area 73.

The control unit 120 determines that the tracing operation in the event area 73 means a change in the event (change in the event virtual folder), and changes the event virtual folder according to the direction of the tracing operation.

When in the state shown in FIG. 8A, in the case that tracing operation is performed towards the left direction as to the event area 73, the control unit 120 determines that this is a change operation of event virtual folder in the direction of advancing the time.

In the state shown in FIG. 8A, that is to say in the case that the current event virtual folder is "Gardening festival", the next event virtual folder in the direction of advancing the time becomes the event virtual folder "Family reunion", according to the example shown in FIG. 2.

The control unit 120 identifies what will be the event virtual folder to be positioned next in the direction of advancing the time of the event virtual folder that is currently a display target, referencing within the current year/month virtual folder.

Here, in the case that the next event virtual folder does not exist within the current year/month virtual folder, the control unit 120 references the next year/month virtual folder in the time direction, and identifies what will be the event virtual folder positioned first in the time-series direction.

Thus, a case that the next event virtual folder does not exist within the current year/month virtual folder is a case that the event virtual folder before changing is in the last position in the time-series order within the current year/month virtual folder.

In the case that a change in the year/month virtual folder occurs by changing the event virtual folder, the control unit 120 obtains year/month information from the year/month virtual folder. After this, the control unit 120 displays the obtained year/month information in the display area corresponding to the date area 71 on the display screen 6G of the display device 106 by way of the display image forming unit 111 and display processing unit 105.

In the case that the year/month virtual folder does not have to be changed even if the event virtual folder is changed, the display of the display area corresponding to the date area 71 on the display screen 6G of the display device 106 remains as is.

Then as shown in FIG. 8B, the control unit 120 obtains event name information ("Family reunion" in the case of this example) from the identified event virtual folder. Also, the control unit 120 obtains the creating month/date "4/8" within the created date/time of the image file belonging to the event virtual folder as information indicating the photographing month/date at the same time as obtaining the event name information.

The control unit 120 displays the information obtained from the identified event virtual folder in the display area corresponding to the event area 73 on the display screen 6G of the display device 106 by way of the display image forming unit 111 and display processing unit 105, as shown in FIG. 8B.

Next, the control unit 120 reads out the thumbnail data of the image file that is a predetermined number from the lead within the image file registered in time-series order of the event virtual folder "Family reunion" after the identified change.

The control unit 120 then displays the thumbnail data in the image area 72 on the display screen 6G of the display device 106 by way of the display image forming unit 111 and display processing unit 105, as shown in FIG. 8B.

Note that with the example shown in FIG. 8B, the thumbnail data that is a predetermined number from the tail within the image files registered in time-series order in the event virtual folder positioned immediately prior (one before) in the time-series order of the event virtual folder after changing is read out.

The control unit 120 then displays also the thumbnail image according to the thumbnail data read out from the event virtual folder immediately prior to the front portion of the image area 72 by way of the display image forming unit 111 and display processing unit 105.

In the case of the example shown in FIG. 8B, the thumbnail images of three images belonging to the event virtual folder after changing the event and the thumbnail images of two images belonging to the event virtual folder immediately prior are displayed in time-series order.

Thus, the example shown in FIGS. 8A and 8B shows the image of the first portion in the time-series order with the event virtual folder after changing and the image of the last portion in the time-series order with the event virtual folder immediately prior, at the same time. By doing so, the managing state of the images managed according to time-series (the state of image rolling) can also be confirmed.

Thus, the image stored in the event folder positioned next in the time-series direction can be displayed in the image area 72, with the control unit 120 using the event virtual folder serving as a current display target as a reference, according to the tracing operation in the left direction as to the event area 73.

Also, when in the state shown in FIG. 8B, in the case that the user touches a finger as to the event area 72 and performs a tracing operation toward the right direction, the control unit 120 performs processing to return to the display shown in FIG. 8A.

That is to say, in the case that a tracing operation toward the right direction is performed as to the event area 73, the control unit 120 identifies the event virtual folder in the direction that the time returns, and as described above, displays the thumbnail image of the image file belonging to the identified event virtual folder.

Thus, even in the case that a tracing operation is performed in the direction of either left or right as to the event area 73, the control unit 120 detects the operation, and can change the thumbnail image to be displayed by changing the event virtual folder according to the operation direction thereof.

Change of Thumbnail Image (Lower Order)

Next, a case of changing the thumbnail image to be displayed with the image search screen described using FIG. 6 will be described. FIGS. 9A and 9B are diagrams to describe a case of performing a change to the thumbnail image to be displayed, with the image search screen shown in FIG. 6.

As shown in FIG. 9A, a year/month display of "April 2008" is made in the year/month area 71, and event name information "4/5 Gardening festival" is displayed in the event area 73. Also, multiple thumbnail images are displayed in the image area 72.

The state shown in FIG. 9A shows that the image data stored in the event virtual folder "Gardening festival" belonging to the year/month virtual folder "April 2008" is displayed in the image area 72. Also, the image data stored in the event virtual folder, such as "4/5" before the event name information, shows that the photograph is taken on Apr. 5, 2008.

In this case, as shown in FIG. 9A, let us say that the user touches a finger as to the image area 72 in the middle order of the operating face of the touch panel 107, and as indicated by the arrow, performs a tracing operation (dragging operation or flicking operation) in the left direction as to the display screen.

The touch panel 107 then sequentially detects the touching position (coordinates) of the finger on the operating face that changes according to the tracing operation, and notifies this to the control unit 120 as coordinates data indicating the position on the operating face.

The control unit 120 recognizes what position on the operating face the instruction operation (touching operation) has been performed (with this example, which area has been traced in which direction by how much), based on the coordinates data according to the tracing operation.

Accordingly, in the case of the example shown in FIG. 9A, the control unit 120 recognizes that a tracing operation from the right to left on the operating face (on the display screen 6G) has been performed in the image area 72.

The control unit 120 determines that the tracing operation in the image area 72 means a change in the thumbnail image, and changes the thumbnail image to be displayed, according to the direction of the tracing operation.

When in the state shown in FIG. 9A, in the case that tracing operation is performed towards the left direction as to the image area 72, the control unit 120 determines that this is a change operation of thumbnail image in the direction of advancing the time.

In this case, the control unit 120 shifts the display of the thumbnail images by a predetermined number (for example two images worth) towards the left. That is to say, the thumbnail data is read out from the five image files aligned in the time-axis direction, with the image file of the thumbnail image positioned currently in the middle as a reference.

The control unit 120 supplies the read out thumbnail data to the display image forming unit 111, and displays the thumbnail image to the display area corresponding to the image area 72 of the display screen of the display unit 106, by way of the display image forming unit 111 and image processing unit 105.

Thus, at the time of FIG. 9A, the thumbnail image positioned directly in the middle of the image area 72 is positioned on the left edge of the image area 72 as shown in FIG. 9B, and thumbnail images of five image files are displayed in the direction of the time axis advancing with the thumbnail image as a reference.

When in the state shown in FIG. 9A, in the case that tracing operation is performed in the right direction as to the image area 72, the control unit 120 determines that the change operation of a thumbnail image in the direction going back in time.

In this case, the control unit 120 shifts the display of the thumbnail images to the right by a predetermined number worth (for example two images worth). That is to say, using the image folder of the thumbnail image currently positioned directly in the middle as a reference, the thumbnail data is read out from the five image files aligned in the opposite direction from the time axis direction (the direction going back in time).

The control unit 120 then supplies the read out thumbnail data to the display image forming unit 111, and displays the thumbnail image in the display area corresponding to the image area 72 of the display screen of the display unit 106 by way of the display image forming unit 111 and display processing unit 105.

Thus, at the time of FIG. 9A, the thumbnail image positioned directly in the center of the image area 72 is positioned on the right edge of the image area 72, and the thumbnail images of image files worth five images in the direction of going back in time axis are displayed as the thumbnail image as a reference.

Note that in the case of displaying up to the thumbnail image of the image at the tail of the event virtual folder to be displayed by performing the tracing operation toward the left direction repeatedly as to the image area 72, the thumbnail image of the image file in the next event virtual folder also becomes a display target.

Similarly, in the case of displaying up to the thumbnail image of the image at the lead of the event virtual folder to be displayed by performing the tracing operation toward the right direction repeatedly as to the image area 72, the thumbnail image of the image file in the next event virtual folder also becomes a display target.

In such a case, the display of the event name information to be displayed in the display area corresponding to the event area 73 is also changed. In the case herein, information to be used, such as event name and creating month/date (photographing month/date), is obtained from the event virtual folder after changing, and this is displayed in the area (event area 73) of the display unit 106 by way of the display information forming unit 111 and display processing unit 105.

Also, there are cases wherein the year/month virtual folder changes along with changes to the event virtual folder. That is to say, in the case of ending the display by way of the thumbnail images of the image file at the tail of the event virtual folder at the tail of the predetermined year/month virtual folder, the thumbnail image of the lead image file of the event virtual folder positioned at the lead of the year/month virtual folder positioned next is also displayed.

Conversely, in the case of returning to the thumbnail image of the lead image file of the event virtual folder at the lead of the predetermined year/month virtual folder and ending the display, the thumbnail image of the tail image file of the event virtual folder positioned at the tail of the year/month virtual folder positioned before this is also displayed.

In such a case, the display of the year/month information displayed on the display area corresponding to the date area 71 is also changed. In this case, the year/month information is obtained from the year/month virtual folder after changing, and displayed in the area (date area 71) of the display unit 106 by way of the display information forming unit 111 and display processing unit 105.

Thus, by performing the tracing operation as to the image area 72, scrolling display of the thumbnail images can be performed. Along with the scrolling display of the thumbnail images, displaying the date area 71 and event area 73 can also be automatically changed.

Other Example of Change to Year/Month Virtual Folder

As described using FIGS. 7A through 7D, with the image search screen used with the imaging apparatus 100 of the first embodiment, the photographing year/month belonging to the image targeted for display can be changed by performing a tracing operation as to the date area 71 on the upper order of the operating face.

However, not only this, but with the imaging apparatus 100 changes to the photographing year/month (change to the year/month virtual folder) belonging to the image targeted for display in a different state can also be performed.

As shown in FIG. 10A, the year/month information of "March 2008" is displayed in the year/month area 71, and the event name information of "3/20 Classmate wedding" is displayed in the event area 73. Multiple thumbnail images are also displayed in the image area 72.

The state shown in FIG. 10A shows that the thumbnail images of the image file stored in the event virtual folder "Classmate wedding" belonging to the year/month virtual folder "March 2008" is displayed in the image area 72.

Also, the image data stored in the event virtual folder such as "3/20" before the event name information, shows that the photograph is taken on Mar. 20, 2008.

In this case, as shown in FIG. 10A, the user performs a tapping operation of touching the finger as one "tap" as to the date area 71 on the upper order of the operating face of the touch panel 107.

The touch panel 107 then detects the touching position on the operating face according to the tapping operation and notifies the control unit 120 of this as the coordinates data indicating the position on the operating face. The control unit 120 recognizes what sort of operation is performed as to what operating area on the operating screen, based on the coordinates data from the touch panel 107.

In this case, the control unit 120 recognizes that a tapping operation is performed as to the date area 71. The control unit 120 determines that the tapping operation as to the date area 71 means a menu display of the year/month information corresponding to the year/month virtual folder, and as shown in FIG. 10B, performs a menu display of year/month information (display of year/month list) corresponding to the year/month virtual folder.

In this case, the control unit 120 obtains the year/month information of multiple year/month virtual folders in time-series order from the year/month virtual folder "March 2008" that is currently targeted for display, and displays this on the display screen of the display unit 106 by way of the display image forming unit 111 and display processing unit 105.

Also, in the screen wherein a menu of the year/month information shown in FIG. 10B is displayed, scrolling display of the year/month information can be performed on the operating face on the touch panel 107 of the portion without year/month display, by performing a tracing operation in the vertical direction.

In this case, the control unit 120 references the predetermined number of year/month virtual folders in the traced direction and obtains year/month information, and as this also is shown, performs scrolling display of a year/month information menu display by controlling the display image forming unit 111 and display processing unit 105.

As shown in FIG. 10B, with the year/month information menu display screen, upon touching a finger or the like on the operating face of the touch panel 107 on the display area of the target year/month display, the touch panel 107 notifies the coordinates data indicating the touching position thereof to the control unit 120.

As described above also, the control unit 120 recognizes what sort of information is displayed at what position of the display screen 6G, whereby what year/month information is selected can be recognized according to the touching position (tapping operation position) of the operating face of the touch panel 107.

In the case of the example shown in FIG. 10B, the user touches the finger to the operating screen of the touch panel 107 on the display of the year/month information "2008.4", and the control unit 120 can distinguish that the year/month information "2008.4" has been selected.

In this case, the control unit 120 displays the thumbnail images of a predetermined number (for example three) images from the first image of the first event virtual folder of the year/month virtual folder corresponding to the selected year/month information on the right side of the image area 72. At the same time, the control unit 120 displays the thumbnail images of a predetermined number (for example two) images from the last of the event virtual folder positioned immediately prior to the first event virtual folder on the left side of the image area 72. Thus, a tracing operation is not performed as to the date area 71, but as shown in FIG. 10A by performing a tapping operation as to the date area 71, the year/month information menu display is performed as shown in FIG. 10B.

After this, by selecting the targeted year/month display from the year/month information menu display, as shown in FIG. 10C, the image search screen from the lead even virtual folder of the year/month virtual folder corresponding to the selected year/month information can be displayed.

In the case of the example described using FIGS. 10A through 10C, for example in the case of specifying a year/month virtual folder at a distant position and so forth, compared to the case of performing tracing operations as to the date area 71, the image of the targeted year/month virtual folder can be displayed with fewer operations.

Other Example of Event Virtual Folder Change

As described using FIGS. 8A and 8B, with the image search screen used with the imaging apparatus 100 of the first embodiment, the event that the image targeted for display belongs to can be changed by performing a tracing operation as to the event area 73 on the upper order of the operating face.

Figure 11A:
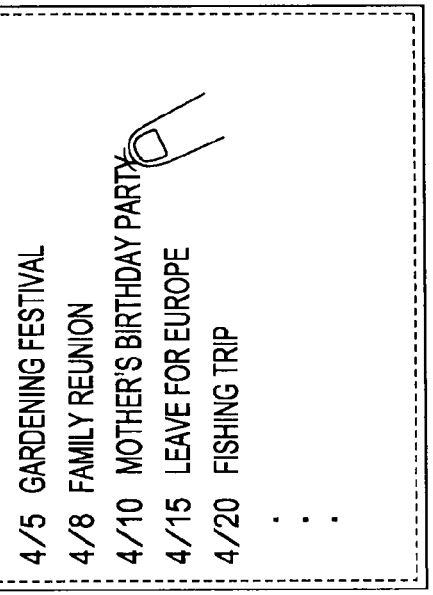
FIGS. 11A through 11C are diagrams to describe a case of changing the event to which the image subject to display belongs, by an operation differing from a tracing operation, on the image search screen.
Figure 11B:
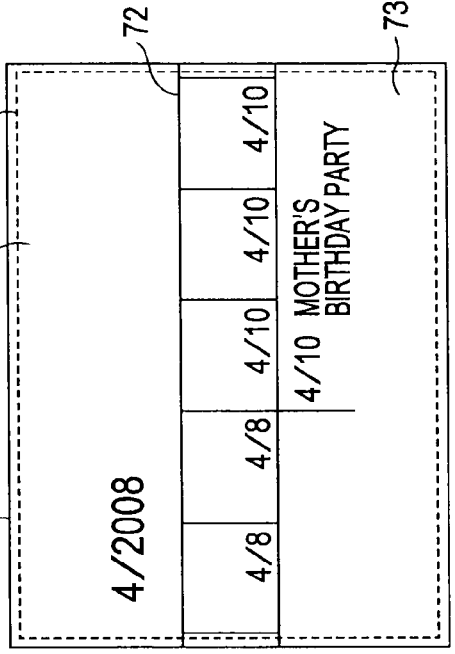
Figure 11C:
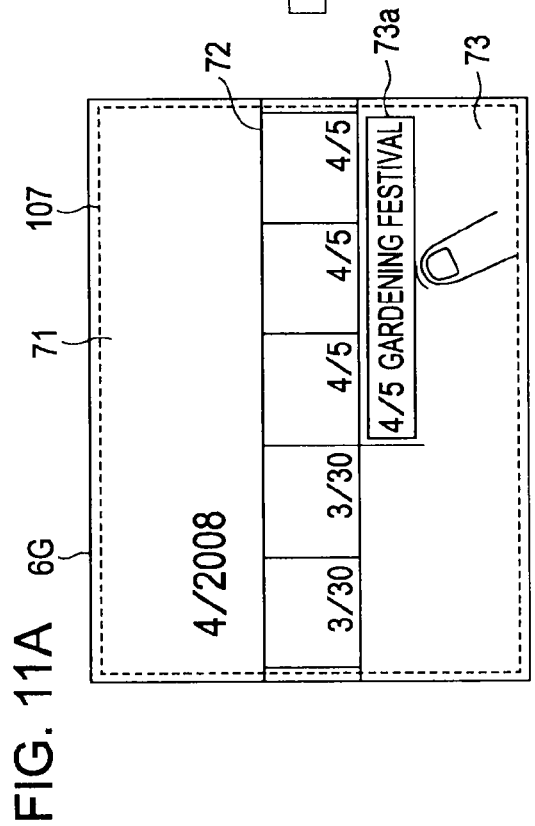

However, not only this, but changing the event that the image targeted for display belongs to (change to event virtual folder) in a different state can also be performed with the imaging apparatus 100. FIGS. 11A through 11C are diagrams describing a case of changing the event that the image targeted for display belongs to, by an operation different from the tracing operation.

As shown in FIG. 11A, the year/month display of "April 2008" is made in the year/month area 71, and the event name information of "4/5 Gardening festival" is displayed in the event area 73. Multiple images are displayed in the image area 72.

The state shown in FIG. 11A indicates that the image data stored in the event virtual folder "Gardening festival" that belongs to the year/month virtual folder "April 2008" is displayed in the image area 72. Also, the image data stored in the event virtual folder, such as "4/5" before the event name information, shows that the photograph is taken on Apr. 5, 2008.

In this case, as shown in FIG. 11A, the user performs a tapping operation of touching the finger as one "tap" as to the event area 73 on the lower order of the operating face of the touch panel 107.

The touch panel 107 then detects the touching position on the operating face according to the tapping operation and notifies the control unit 120 of this as the coordinates data indicating the position on the operating face. The control unit 120 recognizes what sort of operation is performed as to what operating area on the operating screen, based on the coordinates data from the touch panel 107.

In this case, the control unit 120 recognizes that a tapping operation is performed as to the event area 73. The control unit 120 determines that the tapping operation as to the event area 73 means a menu display of the events corresponding to the event virtual folder, and as shown in FIG. 11B, performs a menu display of event information (display of event list) corresponding to the event virtual folder.

In this case, the control unit 120 obtains the event name information and year/month information of multiple event virtual folders in time-series order from the event virtual folder "Gardening festival" that is currently targeted for display, and displays this on the display screen of the display unit 106 by way of the display image forming unit 111 and display processing unit 105.

Also, on a screen displaying a menu of event name information shown in FIG. 11B, scrolling display of the event name information can be performed on the operating face on the touch panel 107 of the portion that does not have an event name display, by performing tracing operation in the vertical direction.

In this case, the control unit 120 references the predetermined number of event virtual folders in the traced direction and obtains the event name information and year/month information, and so that this is also displayed, controls the display image forming unit 111 and display processing unit 105 to perform scrolling of the event name information.

As shown in FIG. 11B, with the event name information menu display screen, upon touching a finger or the like to the operating face of the touch panel 107 on the display area of the targeted event name display, the touch panel 107 notifies the control unit 120 of the coordinates data indicating the touching position thereof.

As described above also, the control unit 120 recognizes what sort of information is displayed on what position of the display screen 6G, so can recognize which event name information has been selected according to the touching position (tapping operation position) on the operating face of the touch panel 107.

In the case of the example shown in FIG. 11B, the user touches a finger to the operating face of the touch panel 107 on the display of the event name information "Mother's birthday party", and the control unit 120 can distinguish that the event name information "Mother's birthday party" has been selected.

In this case, the control unit 120 displays thumbnail information of a predetermined number (for example three) of images from the first image of the event virtual folder corresponding to the selected event name information on the right side of the image area 72. At the same time, the control unit 120 displays the thumbnail images of a predetermined number (for example two) of images from the last of the event virtual folder positioned immediately prior to the event virtual folder on the left side of the image area 72.

Thus, a tracing operation is not performed as to the event area 73, but as shown in FIG. 11A by performing a tapping operation as to the event area 73, the event information menu display is performed as shown in FIG. 11B.

After this, by selecting the targeted event name information from the event name information menu display, as shown in FIG. 11C, the image search screen from the event virtual folder corresponding to the selected event name information can be displayed.

In the case of the example described using FIGS. 11A through 11C, for example in the case of specifying an event virtual folder at a distant position and so forth, compared to the case of performing tracing operations as to the event area 73, the image of the targeted event virtual folder can be displayed with fewer operations.

Image Selection and Enlarged Display

An intended image is found by changing the year/month virtual folder as described using FIGS. 7A through 7D and 10A through 10C, changing the event virtual folder as described using FIGS. 8A, 8B, and 11A through 11C, and scroll-displaying the thumbnail images as described using FIGS. 9A and 9B.

In the case that the thumbnail image of the targeted image is displayed in the image area 72, by performing a tapping operation to touch a finger or the like to the thumbnail image thereof, the image corresponding to the thumbnail image can be displayed fully over the display screen 6G.

Figure 12B:
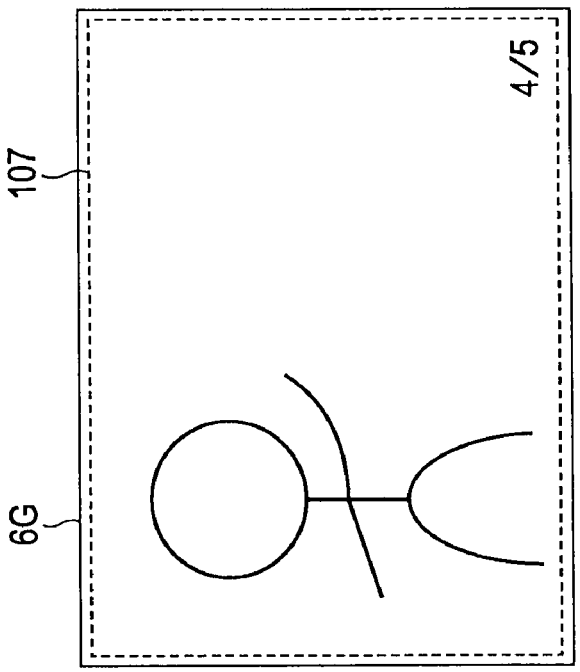
FIGS. 12A and 12B are diagrams to describe a case of performing image selection and enlarged display.
Figure 12A:
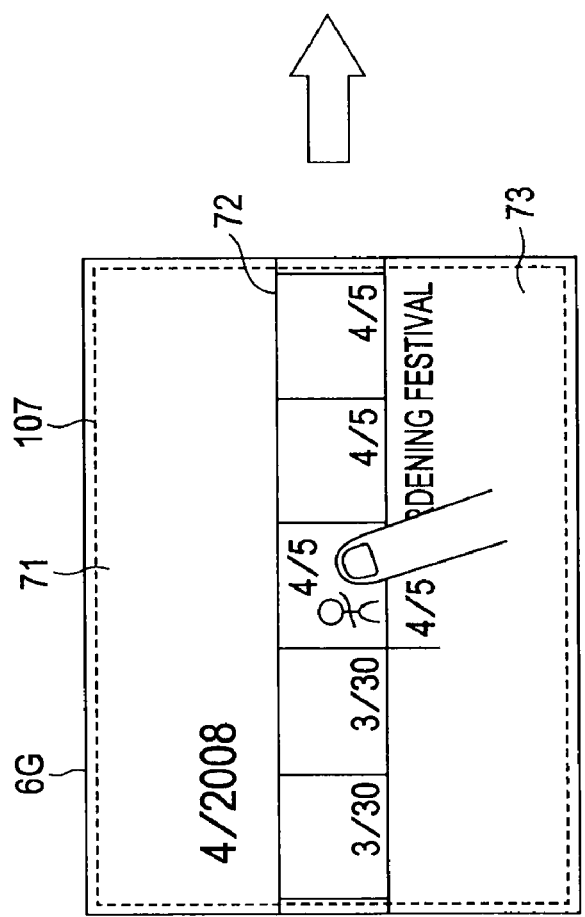

FIGS. 12A and 12B are diagrams to describe a case of performing image selection and enlarged display. As shown in FIG. 12A, let us say that by performing the operations described using FIGS. 7A through 11C, the thumbnail image of the targeted image is displayed in the image area 72.

The state shown in FIG. 12A herein indicates that the image data stored in the event virtual folder "Gardening festival" belonging to the year/month virtual folder "April 2008" is displayed in the image area 72. Also, the image data stored in the event virtual folder, such as "4/5" before the event name information, shows that the photograph is taken on Apr. 5, 2008.

In this case, as shown in FIG. 12A, the user touches a finger or the like as to the operating face of the touch panel 107 at the display position of the targeted thumbnail image from within the thumbnail images displayed in the image area 72 of the middle order of the operating face of the touch panel 107.

The touch panel 107 then detects the touching position on the operating face according to the tapping operation and notifies the control unit 120 of this as the coordinates data indicating the position on the operating face. The control unit 120 recognizes what sort of operation is performed as to what operating area on the operating screen, based on the coordinates data from the touch panel 107.

In this case, the control unit 120 recognizes that a tapping operation is performed as to the image area 72. Also, as also described above, the control unit 120 recognizes what sort of information is displayed at what position of the display screen 6G, so according to the touched position (tapping operation position) on the operating face of the touch panel 107, which thumbnail image has been selected can be recognized.

In the case of the example shown in FIG. 12A, the user is touching a finger to the operating face of the touch panel 107 at the position where the thumbnail image displayed directly in the center of the image area 72 is displayed. The control unit 120 can distinguish that the thumbnail image displayed directly in the center of the image area 72 has been selected.

In this case, the control unit 120 reads out the image data from the image file corresponding to the selected thumbnail image, and supplies this to the decompression processing unit 110. With the decompression processing unit 110, the image data supplied thereto is subjected to decompression processing, the original image data before data compression is restored, and this is supplied to the display image forming unit 111.

The display image forming unit 111 converts the image data supplied thereto into an analog image signal, and supplies this to the display processing unit 105. The display processing unit 105 forms an image signal for display that is supplied to the display unit 106 from the image signal supplied thereto, and supplies this to the display unit 106.

Thus, as shown in FIG. 12B, the image corresponding to the thumbnail image selected in FIG. 12A is displayed fully over the display screen 6G of the display unit 106.

Movement at Time of Image Searching Processing

Figure 13:
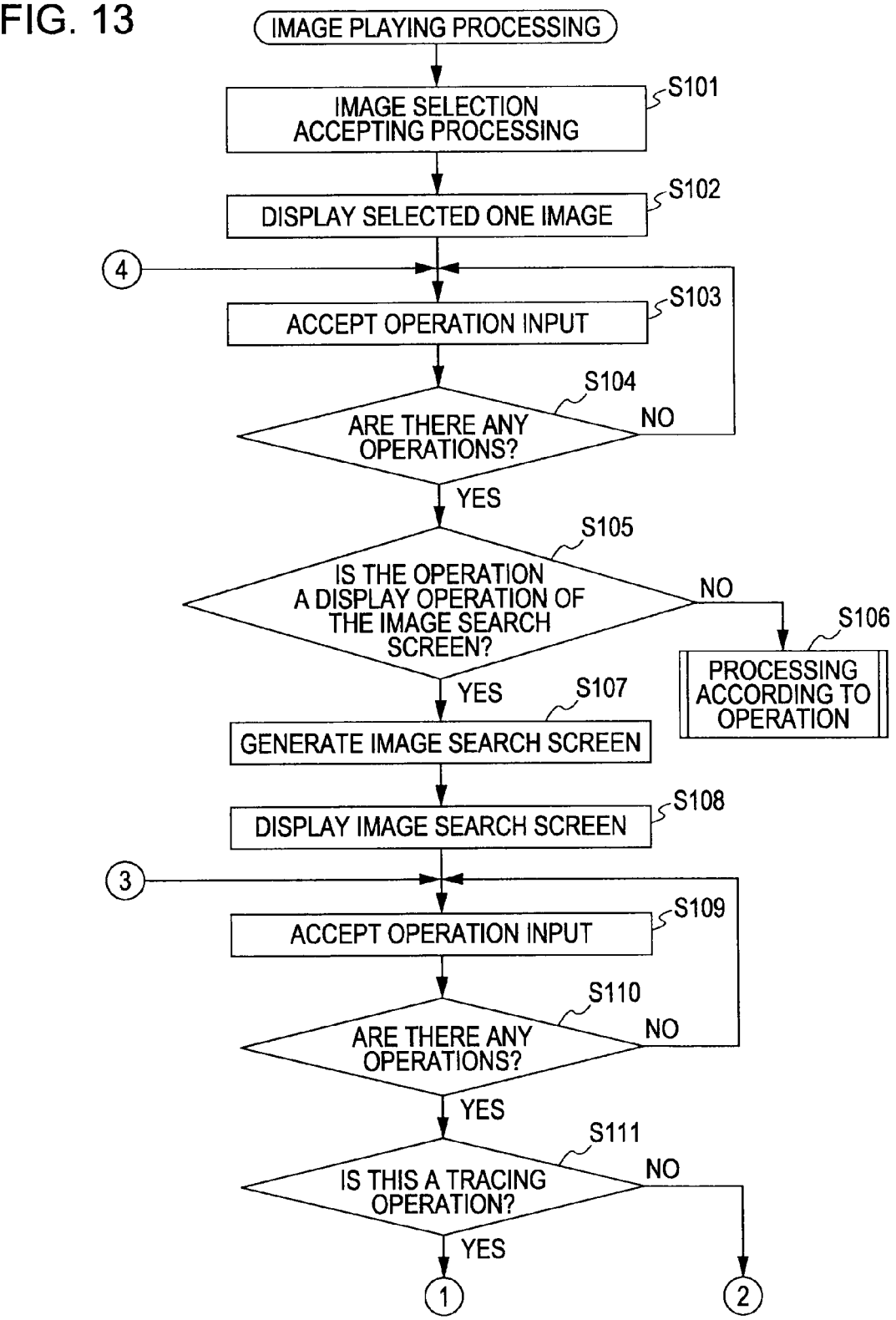
FIG. 13 is a flowchart to describe image searching processing performed with the imaging apparatus.
Figure 14:
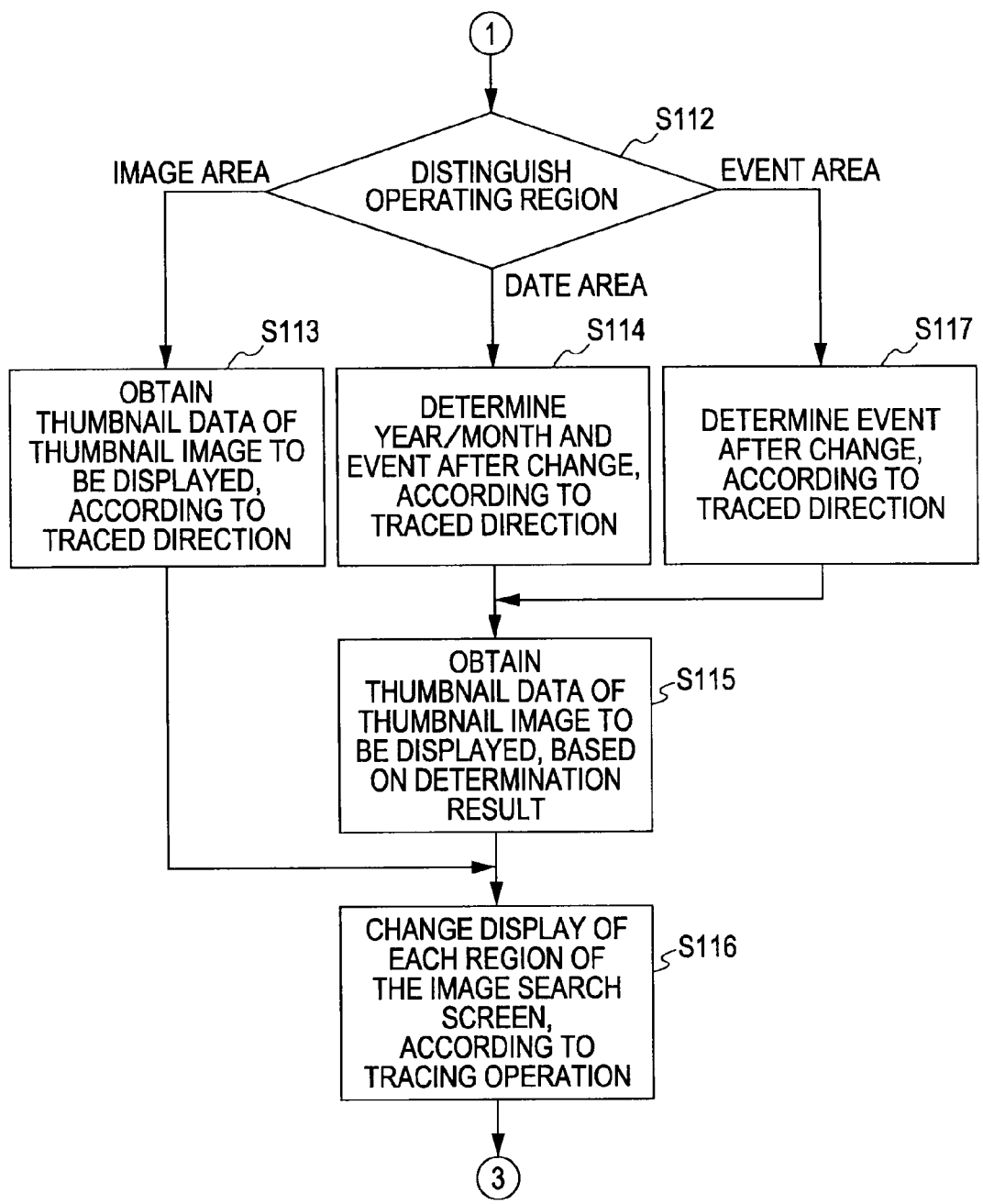
FIG. 14 is a flowchart that follows FIG. 13.
Figure 15:
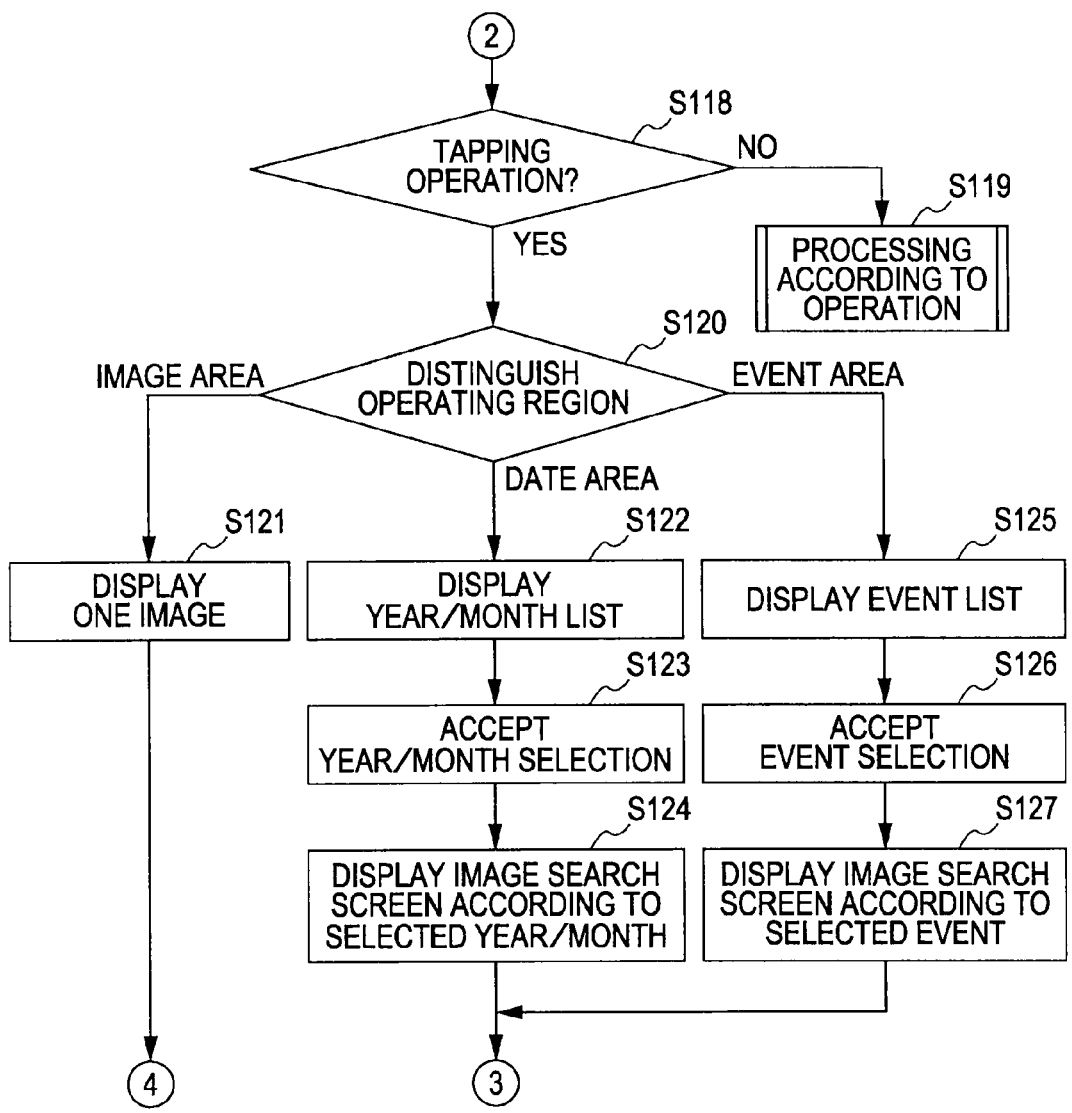
FIG. 15 is a flowchart that follows FIG. 13.

Next, the image searching processing described using FIGS. 7A through 12B will be described in detail with the imaging apparatus 100 of the first embodiment herein. FIGS. 13 through 15 are flowcharts to describe the image searching processing performed with the imaging apparatus 100.

The processing shown in FIGS. 13 through 15 is processing executed primarily by the control unit 120 in the case that a menu item referred to as "image reproducing processing (recorded image reproducing processing)" is selected from within the menu displayed on the display screen of the display unit 106.

Note that in the case that predetermined operations are performed such as the menu key provided to the operating unit 131 of the imaging apparatus 100 is pressed and operated, the control unit 120 controls the display image forming unit 111 and display processing unit 105 and displays the menu on the display screen of the display unit 106.

Upon the image reproducing processing being selected, the control unit 120 executes the processing shown in FIGS. 13 through 15, and performs processing to accept selection input of the first image that should be displayed (step S101).

Specifically, in step S101 the control unit 120 first displays the menu list of year/month virtual folders and accepts selection input, and displays a menu list of the event virtual folders belonging to the selected year/month virtual folder and accepts selection input. The control unit 120 performs menu display of the thumbnail images as a menu list of the image files belonging to the selected event virtual folder, and accepts selection input of the images displayed on one screen.

After this, the control unit 120 displays the image selected in step S101 on the display screen of the display unit 106 (step S102).

Specifically, in step S102 the control unit 120 recognizes which image file each of the menu-displayed thumbnail images have been read out from. The control unit 120 identifies the image file having the selected thumbnail image, controls the writing/reading unit 134, and reads out the image data from the identified image file.

The control unit 120 processes the read out image data with the decompression processing unit 110, display image forming unit 111, and display processing unit 105, supplies this to the display unit 106, and displays the image selected by the user over the entire face of the display screen 6G of the display unit 106.

Thus, the processing to read out the image data of the image selected by the user and display the image fully over the display screen 6G of the display unit 106 is the processing in step S102.

After this, the control unit 120 accepts operating input from the user (step S103) by way of the touch panel 107 and operating unit 131, and determines whether or not operating input has been accepted from the user (step S104). In the determining processing in step S104, when determination is made that operating input has not been accepted from the user, the control unit 120 repeats the processing from the step S103.

When determination is made that operating input has been accepted from the user in the determining processing in step S104, the control unit 120 determines whether or not this is operating input to display the image search screen (three-part divided screen) in the configuration described using FIG. 6 (step S105).

With the imaging apparatus 100 of the first embodiment herein, the operating input to display the image search screen is a tapping operation for example that is performed in the case that one screen is displayed of an image in the processing in step S102.

With the determining processing in step S105, when determination is made that the accepted operating input is not the display operation of the image search screen, the control unit 120 executes processing according to the operating input from the accepted user (step S106).

In step S106, various types of processing is performed, such as change page processing of the display image such as changing the image to be displayed to the next image in the time-series order or changing to the image immediately prior, or enlarging/reducing processing of the display image, or ending the image reproducing processing.

In the determining processing in step S105, when determination is made that the accepted operating input is the display operation of the image search screen, the control unit 120 generates the image search screen (step S107) using the image file of the image currently being displayed as a reference.

In step S107 the control unit 120 obtains the event name information and month/date information from the event virtual folder that the image file currently being displayed belongs to, while obtaining year/month information from the year/month virtual folder to which the event virtual folder belongs.

Further, the control unit 120 obtains thumbnail data from the first predetermined number of image files of the event virtual folder, while obtaining thumbnail data from the last predetermined number of image files in the event virtual folder positioned immediately prior to the event virtual folder.

The control unit 120 supplies this obtained information to the display image forming unit 111, and as described using FIG. 6, forms an image search screen that displays the information corresponding to each of the date area 71, image area 72, and event area 73. Thus, obtaining the information for display, and forming the image search screen, is the processing in step S107.

The control unit 120 controls the display image forming unit 111 and display processing unit 105, and displays the image search screen in the configuration described using FIG. 6 which is formed with the display image forming unit 111 on the display screen 6G of the display unit 106 (step S108).

Thus, the image search screen (three-part divided screen) wherein the display area is divided corresponding to the date area 71, image area 72, and event area 73 of the operating face of the touch panel 107 is displayed on the display screen 6G of the display unit 106, as shown in FIG. 6 and so forth.

After this, the control unit 120 accepts operating input (step S109) as to the image search screen having the configuration shown in FIG. 6, by way of the touch panel 107. That is to say, upon touching operation being performed by the user as to the operating face of the touch panel 107, the coordinates data on the operating face according to the touching operation is supplied from the touch panel 107, whereby the control unit 120 accepts this.

The control unit 120 then determines whether or not the operating input has been accepted in step S109 (step S110). In the determining processing in step S110, when determination is made that the operating input has not been accepted, the control unit 120 repeats the processing from the step S109.

In the determining processing in step S110, when determination is made that the operating input has been accepted, the control unit 120 determines whether or not a tracing operation has been performed, based on the coordinates data supplied from the touch panel 107 (step S111).

In the determining processing in step S111, when determination is made that a tracing operation has been performed, the control unit 120 advances to the processing in FIG. 14. The control unit 120 then determines which operating area is the operating area on the operating screen of the touch panel 107 operated by the user, based on coordinates data according to the tracing operation from the touch panel 107 (step S112).

In the determining processing in step S112, when determination is made that the operating area having a tracing operation performed is the image area 72, the control unit 120 obtains thumbnail data of the thumbnail image to be displayed according to the traced direction (step S113).

That is to say, the image files are managed in time-series order, as described using FIG. 2. The control unit 120 recognizes which image file the thumbnail image targeted for display belongs to, whereby according to the direction of the tracing operation, the control unit 120 can identify the thumbnail image of which image file to display.

Therefore, the control unit 120 reads out and obtains the thumbnail data forming the thumbnail image to be newly displayed from the identified image file, in addition to the thumbnail data used for display already, and organizes the thumbnail data of the thumbnail images displayed in the image area 72.

The control unit 120 controls the display image forming unit 111 and display processing unit 105, and changes the display of the display areas corresponding to each operating area (date area 71, image area 72, event area 73) of the image search screen (step S116). After this, the processing from step S109 shown in FIG. 13 is performed.

Thus, the processing in step S113 and step S116 is processing to realize the scrolling display of the thumbnail image described using FIGS. 9A and 9B. In this case, as also described above, along with the scrolling of the thumbnail images, there may be cases wherein both the year/month virtual folder and the event virtual folder are changed, or that the event virtual folder is changed.

Thus, in the case that both the year/month virtual folder and the event virtual folder are changed, or that the event virtual folder is changed, the display information of the date area 71 and event area 73 are also changed in step S116 according to the changes.

Also, in the determining processing in step S112, when determination is made that the region that tracing operation is performed is the date area 71, the control unit 120 identifies the year/month information (year/month virtual folder) and the event (event virtual folder) after the change, according to the traced direction (step S114).

The control unit 120 then reads out the thumbnail data of the thumbnail images to be displayed in the image area 72 from each of multiple image files in the event virtual folder determined based on the confirming results in step S114 (step S115).

The control unit 120 then controls the display image forming unit 111 and display processing unit 105 and changes the display of the display area corresponding to each operating area (date area 71, image area 72, and event area 73) of the image search screen (step S116). After this, the processing from the step S109 shown in FIG. 13 will be performed.

The processing in step S114, step S115, and step S116 herein is changing processing for the year/month virtual folder described using FIGS. 7A through 7D. According to the change in the year/month virtual folder, as described above, along with changing the thumbnail image to be displayed in the image area 72, the display changes for the event name information and month/date information to be displayed in the event area 73 are also performed in step S116.

Also, in the determining processing in step S112, when determination is made that the region that tracing operation is performed is the event area 73, the control unit 120 identifies the event (event virtual folder) after changing according to the traced direction (step S117).

The control unit 120 then reads out the thumbnail data of the thumbnail image to be displayed in the image area 72 from each of the multiple image files of the event virtual folder determined based on the confirming results in step S117 (step S115).

The control unit 120 controls the display image forming unit 111 and display processing unit 105, and changes the display of the display area corresponding to each operating area (date area 71, image area 72, event area 73) of the image search screen (step S116). After this, the processing from step S109 shown in FIG. 13 is performed.

The processing in step S117, step S115, and step S116 is changing processing of the event virtual folders described using FIGS. 8A and 8B. Along with the change to the event virtual folder, as described above, changing the thumbnail images to be displayed in the image area 72 as well as changes to the display of event name information and month/date information to be displayed in the event area 73 are also performed in step S116.

Also, in the case that a change to the year/month virtual folder occurs along with the changes to the event virtual folder, along with this change, the display change of the month/date information in the date area 71 is also performed in step S116.

Thus, with the processing step S112 through step S117, with only a simple operation referred to as "tracing operation", using the image search screen described using FIG. 6, the thumbnail images displayed in the image area 72 can be changed.

The image files are managed by year/month virtual folder and by event virtual folder in time-series order, as described using FIG. 2. Therefore, as described above, changing the thumbnail images in year/month increments and changing the thumbnail images in event increments can be done also, whereby searching the targeted thumbnail image can be easily and quickly performed.

Also, in the determining processing step S111 shown in FIG. 13, when determination is made that the performed operating input is not a tracing operation, the processing is advanced to FIG. 15. The control unit 120 determines whether or not the operating into is a tapping operation, based on the coordinates data supplied from the touch panel 107 (step S118).

In the determining processing in step S118, when determination is made that the performed (accepted) operating input is not a tapping operation, the control unit 120 performs processing according to the accepted operating input (step S119).

For example, in the case that an operation other than a tapping operation is performed, such as a double-tapping operation or a pinching operation, the processing assigned to the operating input thereof, for example the processing to end the image reproducing processing and so forth is performed in step S119.

In the determining processing in step S118, when determination is made that the performed operating input is a tapping operation, the control unit 120 determines which operating area is the operating area that the tapping operation is performed (step S120).

In the determining processing in step S120, when determination is made that the operating area that the tapping operation is performed is the image area 72, the control unit 120 performs display of one image of the image corresponding to the thumbnail image displayed in the position that that has been tapped-operated (step S121).

As described above also, the control unit 120 recognizes which image file the displayed thumbnail image corresponds to. Therefore, in step S121 the control unit 120 identifies the image file having a thumbnail image displayed at the position of tapping operation, controls the writing/reading unit 134 from the image file, and reads out the image date.

The control unit 120 supplies the read out image data to the display unit 106 via the decompression processing unit 110, display image forming unit 111, and display processing unit 105, and displays the image according to the image data fully over the display screen 6G of the display unit 106.

Thus, the processing in the step S121 is processing to select the targeted image (select the thumbnail image) and fully display over the display screen 6G the selected image herein. After the processing in step S121, the control unit 120 repeats the processing from step S103.

Also, in the determining processing in step S120, when determination is made that the operating area that tapping operation is performed is the date area 71, the control unit 120 performs a menu display (step S122) of the year/month information (year/month list display), as described using FIG. 10B.

In this case, the control unit 120 controls the writing/reading unit 134, and obtains year/month information from the year/month virtual folder that is targeted for display within the year/month virtual folders formed in the recording medium 135.

The control unit 120 then supplies information to be used, such as the obtained year/month information, to the display image forming unit 111 and forms the display image, supplies this to the display unit 106 by way of the display processing unit 105, and performs a menu display of the year/month information in the configuration shown in FIG. 10B.

After this, the control unit 120 accepts selection input from the user of year/month information (step S123). The control unit then forms a three-part divided screen (image search screen) regarding the display of the thumbnail images of the image files stored in the first event virtual folder of the year/month virtual folder corresponding to the selected year/month information, and displays this on the display screen 6G (step S124).

That is to say, in step S124, the control unit 120 reads out the thumbnail data from each of the predetermined number of image files from the lead of the first event virtual folder of the year/month virtual folder corresponding to the selected year/month information. Also, the control unit 120 reads out thumbnail data from each of the predetermined number of image files at the tail of the event virtual folder immediately prior of the first event virtual folder.

Further, the control unit 120 obtains year/month information from the year/month virtual folder corresponding to the selected year/month information, while obtaining event name information and month/date information from the first event virtual folder of the year/month virtual folder.

After organizing the information for display, the control unit 120 controls the display image forming unit 111 and display processing unit 105, to form an image search screen (three-part divided screen) according to the selected month/date, and displays this on the display screen 6G of the display unit 106.

The processing in step S122 through step S124 herein is the processing to select the year/month targeted from the menu list of the year/month information described with reference to FIGS. 10A through 10C, from the image search screen according to the year/month selected, and display.

Also, with the determining processing in step S120, when determination is made that the operating area that the tapping operation is performed is the event area 73, the control unit 120 performs a menu display of the event name information (event list display), as described using FIG. 11B (step S125).

In this case, the control unit 120 controls the writing/reading unit 134 and obtains event name information and month/date information from the event virtual folder targeted for display within the event virtual folders formed in the recording medium 135.

The control unit 120 supplies information used, such as the obtained event name information and month/date information, to the display image forming unit 111 and forms a display image, supplies this to the display unit 106 by way of the display processing unit 105, and performs a menu display of the event name information configured as shown in FIG. 11B.

After this, the control unit 120 accepts selection input from the user of event name information (step S126). The control unit 120 forms a three-part divided screen (image search screen) that handles display of the thumbnail images in the image file of the event virtual folder corresponding to the selected event name information, and displays this on the display screen 6G (step S127).

That is to say, in step S127, the control unit 120 reads out the thumbnail data from each of a predetermined number of image files from the lead of the event virtual folder corresponding to the selected event name information. Also, the control unit 120 reads out the thumbnail data from each of the predetermined number of image files at the tail of the event virtual folder immediately prior to the first event virtual folder.

After organizing the information for display, the control unit 120 controls the display image forming unit 111 and display processing unit 105, forms the image search screen (three-part divided screen) according to the selected event, and displays this on the display screen 6G of the display unit 106.

Thus, the processing to form the three-part divided screen (image search screen) according to the selected event and display this on the display screen 6G of the display unit 106 is the processing performed in step S127. After this, the control unit 120 performs the processing from step S109 as shown in FIG. 13.

The processing in step S125 through step S127 is the processing to select the targeted event from the menu list of event name information, form the three-part divided screen (image search screen) according to the selected event and display, as described using FIGS. 11A through 11C.

Thus, with the processing in step S120 trough step S127, as described using FIGS. 11A through 12B, an item targeted from the menu display is selected, and display can be performed according to the selected item thereof.

That is to say, as described using FIGS. 10A through 10C, the year/month information targeted from the menu display of the year/month information is selected and the thumbnail image of the image according to the year/month thereof can be displayed.

Similarly, as described using FIGS. 11A through 11C, the event name information targeted from the menu display of the event name information is selected and the thumbnail image of the image according to the event name information thereof can be displayed.

Also, selecting a thumbnail image targeted from the menu display of the thumbnail image, and displaying one screen of the image according to the selected thumbnail image thereof can be performed.

First Modification of First Embodiment

In the above-described imaging apparatus 100 of the first embodiment, with the image search screen, the operating face of the touch panel 107 is divided into three operating areas (date area 71, image area 72, event area 73) in the vertical direction, as described using FIGS. 6 through 12B, and the display screen 6G is configured to have three display areas corresponding to each operating area.

Thereby, the user can be given clarification of each operating area being from where to where, and according to the purpose of the operation, operations can be performed as to the appropriate operating area.

However, with the imaging apparatus 100, rather than searching an image using the thumbnail images, there may be cases wherein one image is displayed on the entire face of the display screen and the image search is performed in the state that event the detailed portions of the display image can be confirmed.

Thus, with the first modification of the first embodiment to be described below, even in the case of displaying one image on the entire face of the display screen 6G, performing an image search is enabled by changing the year/month virtual folder and event virtual folder, and so forth.

Note that in the case of the first modification herein also, the imaging apparatus 100 has the configuration shown in FIG. 1, and the image data is recorded in a recording medium in the state described using FIGS. 2 through 5.

FIGS. 16A through 18C are diagrams for describing in detail the image searching processing performed remaining in the state that one image is displayed on the entire face of the display screen 6G.

Change to Display Image Based on Photographing Date

Figure 16A:
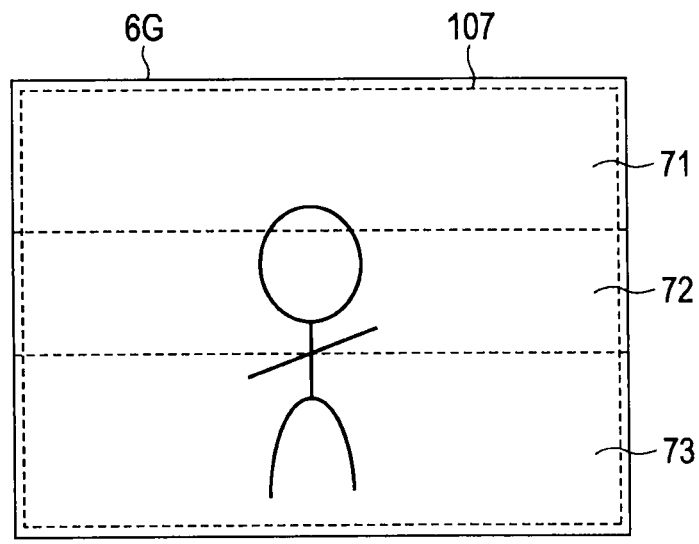
FIGS. 16A through 16C are diagrams to describe a case of changing the image to be displayed, based on the photographed day.
Figure 16B:
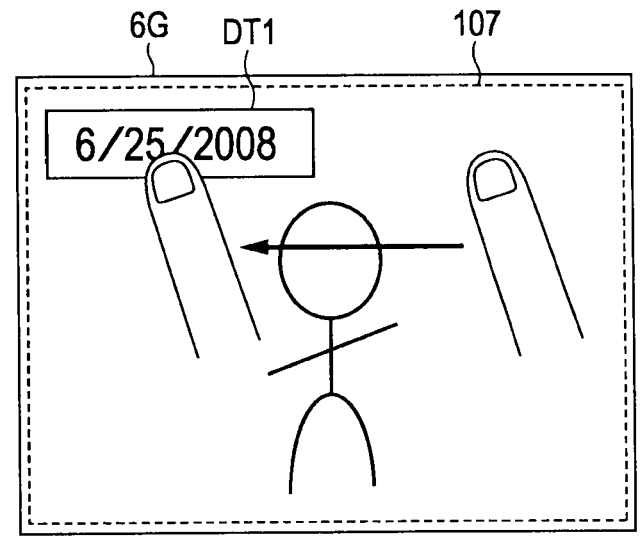
Figure 16C:
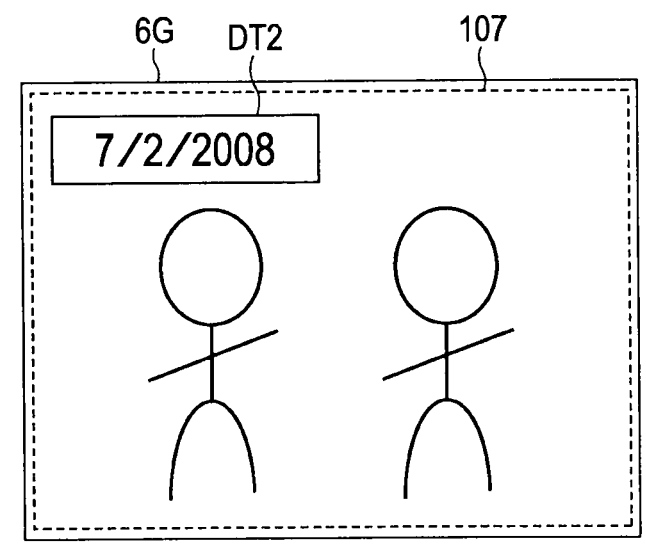

First, the case of changing the image to display according to the photographing date will be described. FIGS. 16A through 16C are diagrams to describe the case of changing the image to display, based on the photographing date. As described above also, a touch panel 107 is adhered to the entire face of the display screen 6G of the display unit 106 and an operating screen is formed, as shown with the dotted lines along the outer edges of the display screen 6G in FIGS. 16A through 16C.

Also, the operating face of the touch panel 107 is divided into three operating areas of the date area 71, image area 72, and event area 73, as shown with the dotted lines that divide the display screen 6G into three parts in the vertical direction in FIG. 16A. Note that from where to where on the operating face of the touch panel 107 is which area is managed by the control unit 120.

As shown in FIG. 16A, let us say that one image that is to be selected by the user is in the state of being displayed on the entire face of the display screen 6G of the display unit 106. While in this state, as shown in FIG. 16B, upon causing the finger or the like of the user to touch the date area 71 on the upper order of the operating face of the touch panel 107, the control unit 120 recognizes the touching operation based on the coordinates data from the touch panel 107. The control unit 120 then displays the created date of the image currently being displayed (photographing year/month/date) as shown by the display DT1 in the date area 71.

Upon the user performing a tracing operation by moving a finger or the like touching the date area 71 to move in the left direction while remaining in a touching state as indicated by the arrow in FIG. 16B, the coordinates data according to the tracing operation is supplied from the touch panel 107 to the control unit 120.

The control unit 120 determines that the tracing operation is performed toward the left direction as to the date area 71, based on the coordinates data from the touch panel 107. In this case, the control unit 120 determines that the tracing operation is an operation to change the created date of the image to be displayed (photographing year/month/date) in the direction of advancing the time.

The control unit 120 then controls the writing/reading unit 134, references the image files recorded in the created date/time order of the recording medium 135, and identifies an image file of a different created date positioned next after the "Jun. 25, 2008" which is the created date of the currently displayed image.

For example, a user has been performing photography on "Jun. 25, 2008" and "Jul. 2, 2008". In this case, the image file of a different created date positioned next after "Jun. 25, 2008" is the image file of the image photographed on "Jul. 2, 2008".

The control unit 120 reads out the image data and created date from the identified image file, and supplies the read out image data to the decompression processing unit 110. The decompression processing unit 110 restores the image data before data compression by decompressing the supplied image data that is data-compressed, and supplies this to the display image forming unit 111. Also, the read out creating data of the image data is supplied to the display image forming unit 111 by way of the control unit 120.

With the display image forming unit 111, a display image to be newly displayed is formed, using the supplied image data that is newly obtained and subjected to decompression processing and the created date of the image data, and this is supplied to the display unit 106 by way of the display processing unit 105.

Thus, as shown in FIG. 16C, a new image and the created date DT2 of the new image (photographing year/month/day) are displayed on the display screen 6G of the display unit 106. That is to say, the image first photographed on "Jul. 2, 2008" which is the different created date of the next position after the "Jun. 25, 2008" is displayed along with the display DT2 of the photographing date thereof.

Note that when in the state shown in FIG. 16C, in the case of performing tracing operation toward the right (tracing operation toward the opposite direction from the case in FIG. 16A) as to the date area 71, the display shown in FIG. 16B is returned to.

That is to say, the different created date that is positioned one before the "Jul. 2, 2008" which is the created date of the current display image is "Jun. 25, 2008", so the image photographed first on "Jun. 25, 2008" is displayed together with the information indicating the photographing date thereof.

Note that in the case that a tracing operation is performed as to the date area 71, the image first photographed that is positioned one before or one after (next) a different created date from the created date of the current display image is to be displayed according to the direction of the tracing operation, but embodiments of the present invention are not restricted to this arrangement.

An image in an optional position photographed on the created date can also be displayed, such as the image photographed last on the different created date positioned one before or one after the created date of the current display image, according to the direction of the tracing operation.

Note that here, the created date (photographing date) of the image is made to be changed, but as described using FIGS. 7A through 7D, the photographing year/month (year/month virtual folder) can also be made to be changed.

Change of Display Image Based on Event

Figure 17A:
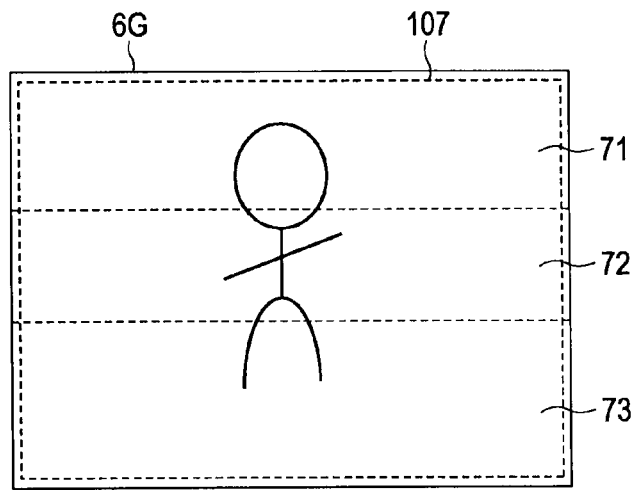
FIGS. 17A through 17C are diagrams to describe a case of changing the image to be displayed, based on the event.
Figure 17B:
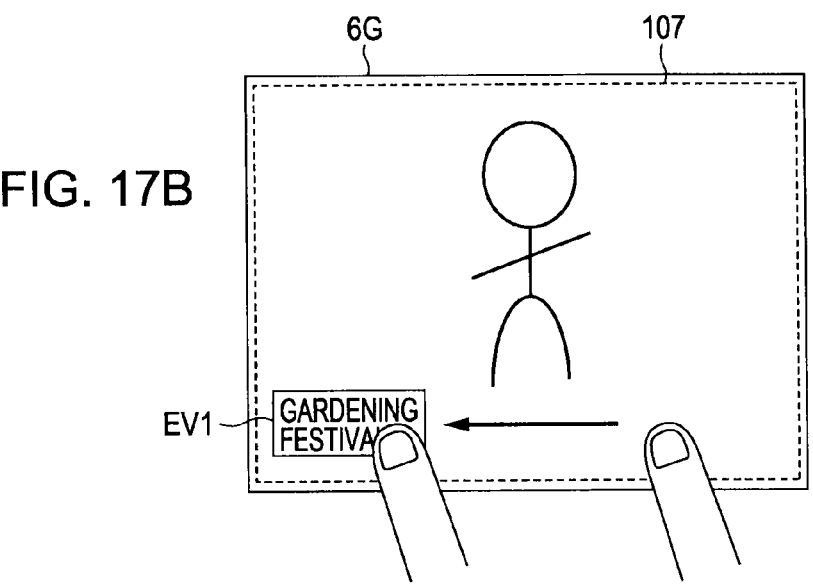
Figure 17C:
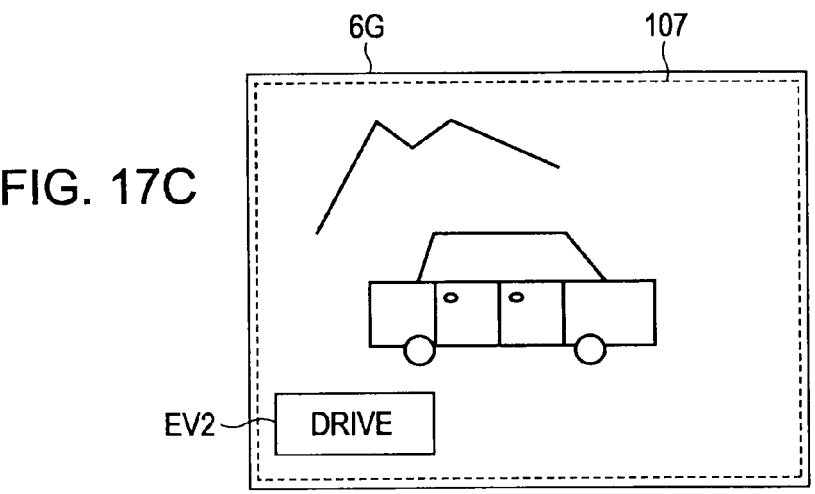

Next, a case of changing the image to be displayed according to the event will be described. FIGS. 17A through 17C are diagrams to describe a case of changing the image to be displayed based on the event. As shown in FIGS. 17A through 17C, a touch panel 107 is adhered to the display screen 6G, and the point wherein the operating face of the touch panel 107 is divided into three operating areas of the date area 71, image area 72, and event area 73 is the same as the case described using FIGS. 16A through 16C.

As shown in FIG. 17A, let us say that one image that is to be selected by the user is displayed on the entire face of the display screen 6G of the display unit 106. When in this state, as shown in FIG. 17B, upon causing the finger or the like of the user to touch the event area 73 on the lower order of the operating face of the touch panel 107, the control unit 120 recognizes the touching operation based on the coordinates data from the touch panel 107. The control unit 120 then displays the event name information of the image currently being displayed in the event area 73 as shown by the display EV1.

Upon the user performing a tracing operation by moving a finger or the like touching the event area 73 to move in the left direction while remaining in a touching state as indicated by the arrow in FIG. 17B, the coordinates data according to the tracing operation is supplied from the touch panel 107 to the control unit 120.

The control unit 120 determines that the tracing operation is performed as to the event area 73, based on the coordinates data from the touch panel 107. In this case, the control unit 120 determines that the tracing operation is an operation to change the event of the image to be displayed (event virtual folder) in the direction of advancing the time.

The control unit 120 then controls the writing/reading unit 134, references the event virtual folder created in the recording medium 135, and identifies an event virtual folder positioned next after the event virtual folder to which the currently displayed image belongs.

For example, let us say that an event virtual folder "Gardening festival" of a created date of Apr. 5, 2008 and an event virtual folder "Drive" of a created date of May 10, 2008 exist. In this case, the event virtual folder positioned next after the event virtual folder "Gardening festival" is the event virtual folder "Drive".

The control unit 120 reads out the image data from the first image file in time-series order of the identified image file, and obtains the event name information from the identified event virtual folder. The read out image data is supplied supplies to the decompression processing unit 110, and the obtained event name information is supplied to the display image forming unit 111.

The decompression processing unit 110 restores the image data to the state before data compression by decompressing the supplied image data that has been data-compressed, and supplies this to the display image forming unit 111. With the display image forming unit 111, a display image to be newly displayed is formed, using the supplied image data that is newly obtained and subjected to decompression processing, and the event name information of the event virtual folder to which the image data belongs, and this is supplied to the display unit 106 by way of the display processing unit 105.

Thus, as shown in FIG. 17C, a new image and the event name information EV2 of the event virtual folder to which the new image belongs are displayed on the display screen 6G of the display unit 106.

Note that when in the state shown in FIG. 17C, in the case of performing a tracing operation toward the right (tracing operation toward the opposite direction from the case in FIG. 17B) as to the event area 73, the display shown in FIG. 17B is returned to.

That is to say, the event virtual folder that is positioned one before the event virtual folder "Drive" to which belongs the current display image is the event virtual folder "Gardening festival", so the image first positioned in the event virtual folder "Gardening festival" is displayed together with the corresponding event name information.

Note that in the case that a tracing operation is performed as to the event area 73, the image positioned first in the event virtual folder that is positioned one before or one after (next) the event virtual folder to which the current display image belongs is to be displayed according to the direction of the tracing operation, but embodiments of the present invention are not restricted to this arrangement.

An image in an optional position that is stored in a targeted event virtual folder can also be displayed, such as the image positioned last in the event virtual folder that is positioned one before or one after the event virtual folder to which the current display image belongs is to be displayed, according to the direction of the tracing operation.

Page Change of Display Image

Figure 18A:
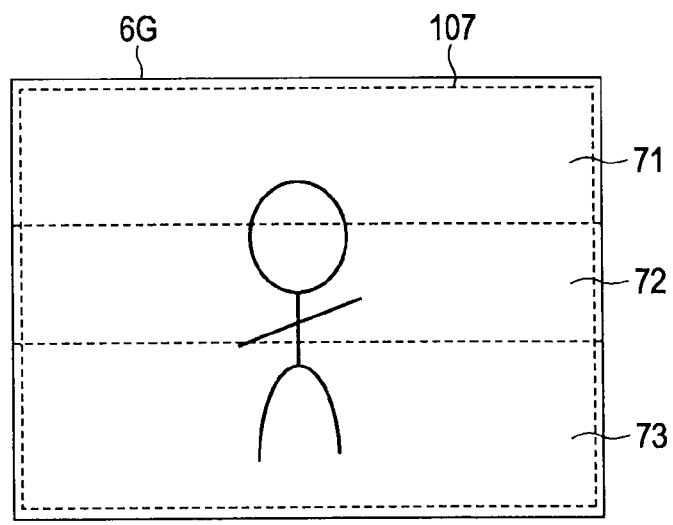
FIGS. 18A through 18C are diagrams to describe a case of performing a page change of the displayed image.
Figure 18B:
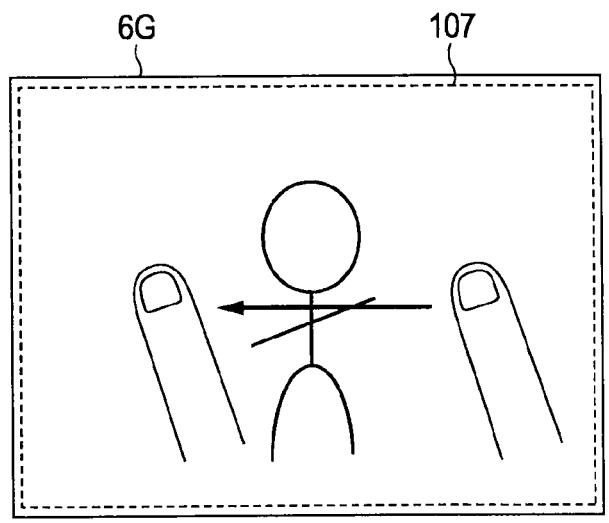
Figure 18C:
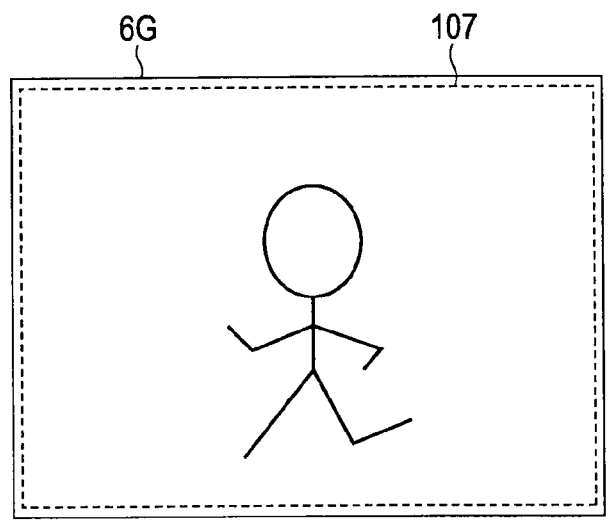

Next, a case of performing a page change of the display image will be described. FIGS. 18A through 18C are diagrams describing the case of performing a new page of the display image.

As shown in FIGS. 18A through 18C, the touch panel 107 is adhered to the display screen 6G, and the point wherein the operating face of the touch panel 107 is divided into three operating areas of the date area 72, image area 72, and event area 73 is the same as the case described using FIGS. 16 through 17C.

As shown in FIG. 18A, let us say that one image that is to be selected by the user is displayed on the entire face of the display screen 6G of the display unit 106. When in this state, as shown in FIG. 18B, let us say that the user performs a tracing operation by touching the image area 72 on the middle order of the operating face of the touch panel 107 with a finger or the like, and moves in the left direction while remaining in a touching state as indicated by the arrow. In this case, the coordinates data according to the tracing operation is supplied from the touch panel 107 to the control unit 120.

The control unit 120 determines that the tracing operation is performed as to the image area 72, based on the coordinates data from the touch panel 107. In this case, the control unit 120 determines that the tracing operation is an operation to change pages of the image in the direction of advancing the time.

The control unit 120 then controls the writing/reading unit 134, references the image files recorded in time-series order in the recording medium 135, and identifies an image file positioned one after (next) after the image file of the currently displayed image.

The control unit 120 then reads out the image data from the identified image file, and supplies this to the decompression processing unit 110. The decompression processing unit 110 restores the image data to the state before the data compression by decompressing the image data supplied that has been data-compressed, and supplies this to the display image forming unit 111.

With the display image forming unit 111, a display image to be newly displayed is formed from the supplied image data that is newly obtained and subjected to decompression processing, and supplies this to the display unit 106 by way of the display processing unit 105. Thus, a new image is displayed on the display screen 6G of the display unit 106 as shown in FIG. 18C.

When in the state shown in FIG. 18C, in the case of performing tracing operations towards the right direction as to the image area 72 (tracing operation in the opposite direction from the case in FIG. 18B), the display is returned to that shown in FIG. 18B. That is to say, the image of the image file positioned one before the image file of the current displayed image is displayed.

Movement at Time of Image Search Process in Case of First Modification

Figure 19:
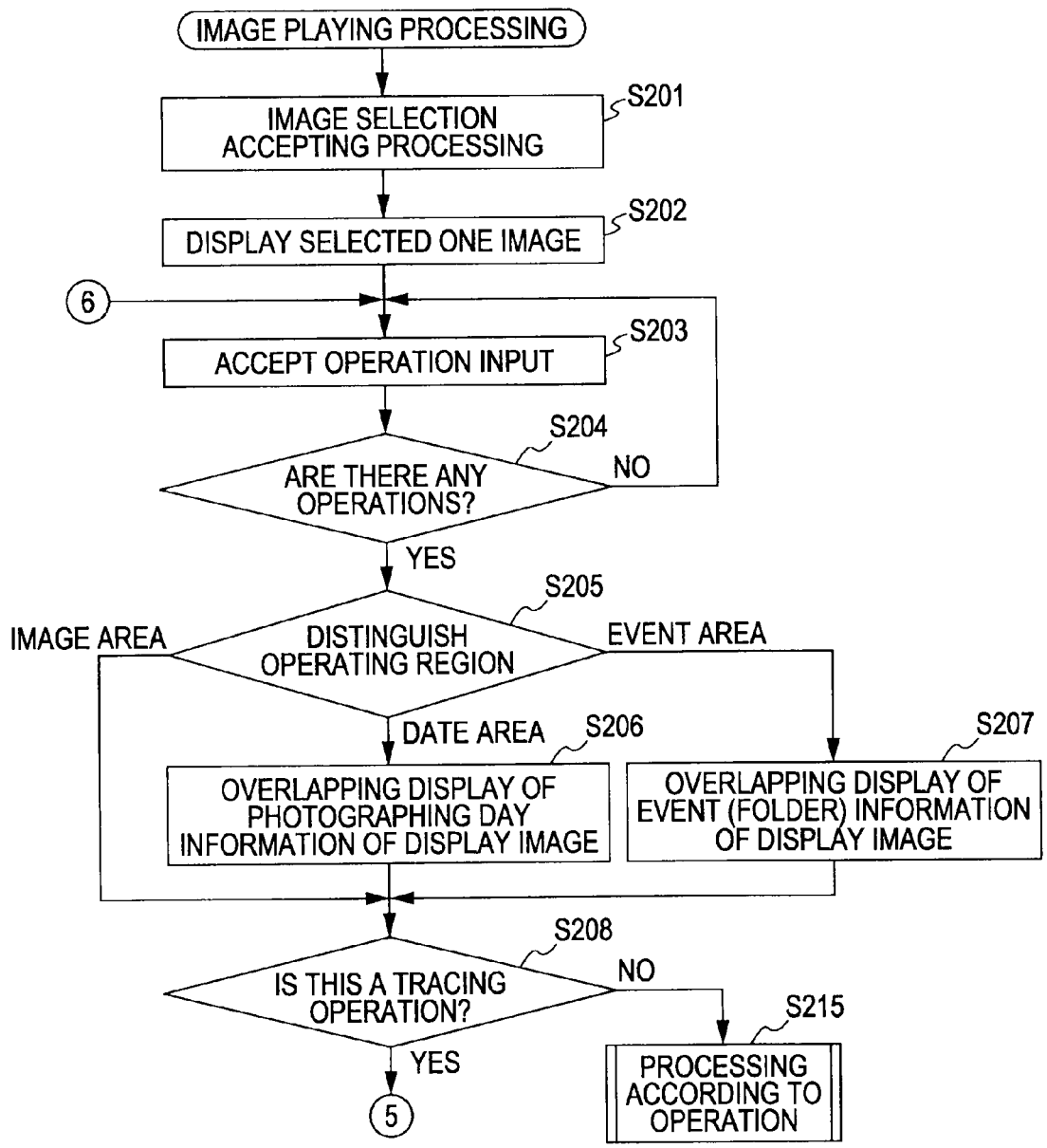
FIG. 19 is a flowchart to describe image searching processing performed with the imaging apparatus of a first modification.
Figure 20:
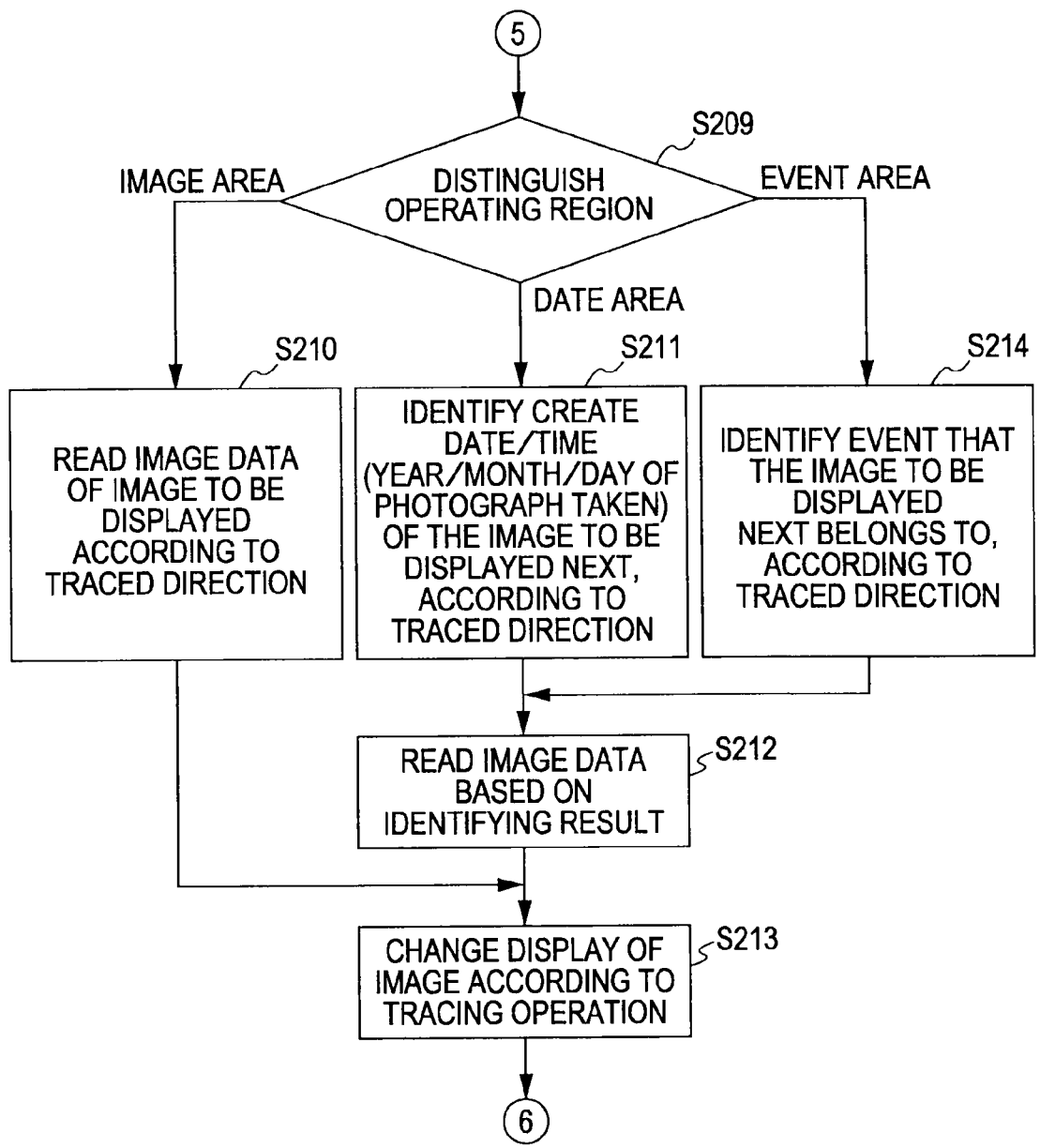
FIG. 20 is a flowchart that follows FIG. 19.

Next, the image search processing in the case of the first modification described using FIGS. 16A through 18C will be described in detail. FIGS. 19 and 20 are flowcharts to describe the image search processing performed with the imaging apparatus 100 of the first modification.

The processing shown in FIGS. 19 and 20 is processing executed primarily by the control unit 120 in the case that a menu item referred to as "image reproducing processing (playing processing of a recorded image)" is selected from within the menu displayed on the display screen of the display unit 106.

Note that in the case that predetermined processing is performed such as the menu key provided to the operating unit 131 of the imaging apparatus 100 is pressed and operated, the control unit 120 controls the display image forming unit 111 and the display processing unit 105 and displays the menu on the display screen of the display unit 106.

Upon the image reproducing processing being selected, the control unit 120 executes the processing shown in FIGS. 19 and 20, and first performs processing to accept selection input of the first image to be displayed (step S201). The processing in the step S201 is the same processing as the processing in step S101 shown in FIG. 13.

After this, the control unit 120 displays the image selected in step S201 on the display screen of the display unit 106 (step S202). The processing in step S202 is the same processing as the processing in step S202 shown in FIG. 13.

After this, the control unit 120 accepts operating input from the user by way of the touch panel 107 and operating unit 131 (step S203), and determines whether or not operating input has been accepted from the user (step S204). In the determining processing in step S204, when determination is made that operating input has not been accepted from the user, the control unit 120 repeats the processing from step S203.

In the determining processing in step S204, when determination is made that operating input has been accepted from the user, the control unit 120 determines to which operating area the accepted operating input is performed (step S205). The determining processing in step S205 herein can be determined based on the coordinates data from the touch panel 107.

In the determining processing in step S204, when determination is made that the operating input is performed as to the image area 72, the control unit 120 advances the processing to step S208.

In the determining processing in step S204, when determination is made that the operating input is performed as to the date area 71, the control unit 120 displays the created date (photographing year/month/date) of the image currently displayed, as an overlapping display on the date area 71, as also described above (step S206). The processing is then advanced to step S208.

In the determining processing in step S204, when determination is made that the operating input is performed as to the event area 73, the control unit 120 displays the event name information of the event virtual folder to which the image currently displayed belongs, as an overlapping display on the event area 73, as also described above (step S207). The processing is then advanced to step S208.

Note that in the processing in step S206 and step S207, the term "overlapping display" means that information indicating a created date or event name is displayed so as to layer over the image already displayed.

After this, the control unit 120 determines whether or not the tracing operation has been performed, based on the coordinates data from the touch panel 107 (step S208). In the determining processing in step S208, when determination is made that the tracing operation has been performed, the control unit 120 advances to the processing in FIG. 20.

The control unit 120 determines which operating area is the operating area on the operating face of the touch panel 107 trace-operated by the user, based on the coordinates data according to the tracing operation from the touch panel 107 (step S209).

In the determining processing in step S209, when determination is made that the operating area that the tracing operating has been performed is the image area 72, the control unit 120 obtains the image data of the image to be displayed next, according to the traced direction (step S210).

That is to say, the image files are managed in time-series order as described using FIG. 2, and the control unit 120 recognizes which image file is currently being used to display the image from the image data thereof.

Therefore, the control unit 120 reading out the image data from the image file of one behind or one before the image file of the image currently displayed, according to the direction of the tracing operation, is the processing in step S210.

The control unit 120 processes the image data read out in step S210 by way of the decompression processing unit 110, display image forming unit 111, and display processing unit 105, and displays the image according to the image data read out on the display screen 6G (step S213). After this, the processing from step S203 shown in FIG. 19 is to be performed.

Thus, the processing in step S210 and step S213 is the processing to realize a new page display of the image described using FIGS. 18A through 18C.

Also, in the determination processing in step S209, when determination is made that the region that tracing operation is performed is the date area 71, the control unit 120 identifies the created date (photographing year/month/date) of the image to be displayed next, according to the traced direction (step S211).

Specifically, the processing in step S211 is processing that has the created date of the current display image as a reference date, and identify an image file with a different created date of one before the reference date, or an image files with a different creating data of one after the reference date, according to the direction of the tracing operation.

After this, the control unit 120 reads out the image data and creating data from the image file determined based on the identifying results in step S211, and the image data is supplied to the decompression processing unit 110, the information indicating the creating data to the display image forming unit 111 (step S212).

The control unit 120 processes the image data and the like by way of the decompression processing unit 110, display image forming unit 111, and display processing unit 105, and displays the image according to the newly read out image data on the display screen 6G, as described using FIGS. 17A through 17C (step S213). After this, the processing from step S203 shown in FIG. 19 is performed.

The processing in step S209, step S211, step S212, and step S213 realize the change processing of the display image according to the photographing date which is described using FIGS. 16A through 16C.

Also, in the determining processing in step S209, when determination is made that the region that tracing operation has been performed is the event area 73, the control unit 120 identifies an event (event virtual folder) after changing, according to the traced direction (step S214).

Specifically, the processing in step S214 is processing that has the event virtual folder of the current display image as a reference, and identifies an event virtual folder that is one before the reference, or an event virtual folder of one after the reference, according to the direction of the tracing operation.

After this, the control unit 120 reads out pertinent information from the event virtual folder and image files that are determined based on the identifying results in step S214, and supply these to the decompression processing unit 110 and display image forming unit 111 (step S212).

Specifically with the processing in step S212, the control unit 120 reads out the event name information from the event virtual folder that is determined based on the identifying results in step S214, and also reads out the image data from the first image file in the time-series order of the event virtual folder. The control unit 120 supplies the image data to the decompression processing unit 110 and the information indicating the created date to the display image forming unit 111.

The control unit 120 processes the image data and so forth by way of the decompression processing unit 110, display image forming unit 111, and display processing unit 105, and as described using FIGS. 17A through 17C, displays the image according to the newly read out image data on the display screen 6G (step S213). After this, the processing from step S203 shown in FIG. 19 will be performed.

The processing in step S209, step S214, step S212, and step S213 realizes the change processing of the display image according to the events as described using FIGS. 17A through 17C.

Also, in the determining processing in step S208 shown in FIG. 19, when determination is made that a tracing operation has not been performed, processing according to the accepted operating input is to be performed (step S215).

In the case that for example a tapping operation is performed as to the date area 71 or event area 73, in step S215 a year/month menu display or event menu display can be performed, as described using FIGS. 10A through 11C. After this, the target year/month and event can be selected, and the images belonging to the selected year/month and event can be displayed.

Also, in the case that for example a tapping operation is performed as to the image area 72, in step S215 the image search screen (three-part divided screen) described using FIG. 6 is displayed and the image search can be made to be performed.

Further, in the case that a pinching operation is performed, the reduction or enlargement of the display image is performed, and the image reproducing process can be ended according to the other operation input thereof.

Note that in the case of the first embodiment herein, in the case that the finger or the like of the user is made to touch the touch panel 107, a highlighted display or a reverse display of the display information is made so as to stand out. Also, in the case that the display information is not displayed, information that is used is displayed in the case of the finger or the like of the user touching the touch panel 107.

However, embodiments of the present invention are not restricted to this arrangement. By bringing the finger or the like to a position a certain amount closer to the touch panel 107, the touch panel 107 detects change to the electrical potential, and in the case that the position to which the finger or the like coming closer can be detected, the highlighted display or information display may be executed at the stage of detecting the nearing of the finger or the like.

Also, by enabling detection of changes in illuminance by the finger or the like coming closer at each operating area at least, the highlighted display or information display may be executed at the stage of detecting the nearing of the finger or the like.

Second Modification of First Embodiment

With the imaging apparatus 100 of the first embodiment, as described using FIGS. 7A through 12B, the display image is made to be changed according to the operation input performed as to one of each of the operating areas of the image search screen (three-part divided screen).

With the second modification herein, by performing operations as to multiple operating areas at the same time, searching processing with search conditions extracted can be performed, and the targeted image can be displayed as quickly as possible.

Note that although described in detail below also, performing operations as to multiple operating areas at the same time does not mean only in the case of operating exactly simultaneously. For example, an operation such as performing an operation as to another operating area while the finger or the like is still touching as to one operating area is included.

Note that in the case of the second modification also, the imaging apparatus 100 has the configuration shown in FIG. 1, and the image data is recorded in the recording medium in the state described using FIGS. 2 through 5. Also, in the case of the second modification herein, image searching is performed using the image search screen described using FIG. 6.

A case of performing searching processing with search conditions extracted, by performing operations at the same time as to multiple operating areas, will be described in detail below using FIGS. 21A through 22B.

Specific Example 1 of Searching Processing

Case of Using Search Key as Event

FIGS. 21A and 21B are diagrams to describe a case of performing searching processing of an image, with an event as a search key. As shown in FIGS. 21A and 21B, in the case of the second modification herein also, the touch panel 107 is adhered to the entire face of the display screen 6G of the display unit 106 to form the operating face, as shown with dotted lines along the outer edges of the display screen 6G.

Also, similar to the case described using FIG. 6, the operating face of the touch panel 107 has the display screen 6G divided into three in the vertical direction, and three operating areas of the date area 71, image area 72, and event area 73 are formed. Also, the display screen 6G of the display unit 106 is divided into three display areas corresponding to the three operating areas of the touch panel 107.

As shown in FIG. 21A, the year/month display of "March 2007" is in the year/month area 71, and the even name information of "3/30 Birthday" is displayed in the event area 73. Multiple (five) thumbnail images are displayed in the image area 72.

The state shown in FIG. 21A shows that the thumbnails image of the image files stored in the event virtual folder "Birthday" that belongs to the year/month virtual folder "March 2007" are displayed in the image area 72. Also, the display of "3/30" before the event name information indicates that the image data stored in the event virtual folder is photographed on Mar. 30, 2007.

When in the state shown in FIG. 21A, for example there is a case of confirming also the images photographed on the birthday of March 2008. That is to say, this is the case of when images of the same (or same sort of) event performed at different times are desired to be confirmed.

In this case, as shown in FIG. 21A, the user first touches the event area 73 with a finger or the like, and maintains the state thereof. The operation to maintain the touching operation to the event area 73 is the operation to fix the event name information "Birthday" as the search key.

In the case of detecting that the touching to the event area 73 is continued, based on the coordinates data from the touch panel 107, the control unit 120 recognizes that this is the operation to fix the current event name information as the search key.

In order to indicate the search direction, as shown in FIG. 21A, the user performs a tracing operation towards the left direction (dragging operation or flicking operation) on the screen as to the date area 71, as indicated by the arrow.

In the case of detecting that the touching to the event area 73 is continued, based on the coordinates data from the touch panel 107, in the case that the tracing operation towards the left direction is performed as to the date area 71, the control unit 120 determines that searching for the image data in the direction of advancing the time has been instructed.

In this case, the control unit 120 matches the search key (in the case of this example, "Birthday" which is event information) and searches for an imaging file having a different creating year/month/date from the creating year/month/date of the event virtual folder at time of starting the search.

More specifically, the control unit 120 searches for an event virtual folder that is positioned later in the time-series order than the event virtual folder "Birthday" of the year/month virtual folder "March 2007", and that the event name (folder name) is "Birthday".

If the event virtual folder "Birthday" exists in the year/month virtual folder "March 2008", the control unit 120 obtains the year/month information "2008.3" from the year/month virtual folder "March 2008". At the same time, event name information and creating month/date information (photographing month/date) is obtained from the event virtual folder "Birthday" which belongs to the year/month folder "March 2008".

Further, the control unit 120 obtains the pertinent portion of thumbnail data from the image file belonging to the event virtual folder "Birthday" which belongs to the year/month folder "March 2008". The control unit 120 processes the obtained information by way of the display image forming unit 111 and display processing unit 105, and displays the image search screen (three-part divided screen) shown in FIG. 21B on the display screen of the display unit 106.

The state shown in FIG. 212 herein shows that the thumbnail images of the image files stored in the event virtual folder "Birthday" belonging to the year/month virtual folder "March 2008" are displayed in the image area 72. Accordingly, from the display of the thumbnail images of the "Birthday" in the "March 2007" shown in FIG. 21A, display can be changed (jump) at once to the thumbnail images of the "Birthday" in "March 2008".

Thus, by performing a search using an event as a search key, quickly changing to the images in another event virtual folder having the same event name can be performed.

Note that in the case of the example herein, in the case that event virtual folders with the same event name having different photograph days exist in the same year/month virtual folder, the images of the event virtual folder thereof can be displayed.

However, embodiments of the present invention are not restricted to this arrangement, and the year/month virtual folder of a year/month after the year/month virtual folder shown with the current year/month information can also be made to be the search target. That is to say, in the case of the example shown in FIGS. 21A and 21B, a search target can be made from the near/month virtual folder on/after April 2007.

Also, a year/month virtual folder of a year after the year/month virtual folder indicated by current year/month information can be made to be a search target. That is to say, in the case of the example shown in FIGS. 21A and 21B, a search target can be made from the near/month virtual folder on/after 2008.

Also, in the example shown in FIGS. 21A and 21B, only the event name information "Birthday" is used as the search key, but the photographing month/date also may be included wherein the event name information "Birthday" and the photographing month/date "3/30" are search keys.

In this case, the search key is an AND (logical operator) of the event name information and photographing month/date. Accordingly, in the case of the example shown in FIGS. 21A and 21B, even if the event virtual folder "Birthday" exists in May 2007 for example, this event virtual folder is skipped. Accordingly, in this case, as shown in FIGS. 21A and 21B, the search can jump from the event virtual folder "Birthday" of Mar. 30, 2007 to the event virtual folder "Birthday" of Mar. 30, 2008.

Note that conversely to the case in FIG. 21A, by performing the tracing operation towards the right direction, a search of images in the direction of going back in time can of course be performed.

Specific Example 2 of Search Processing

Case of Using Image as Search Key

Figure 22A:
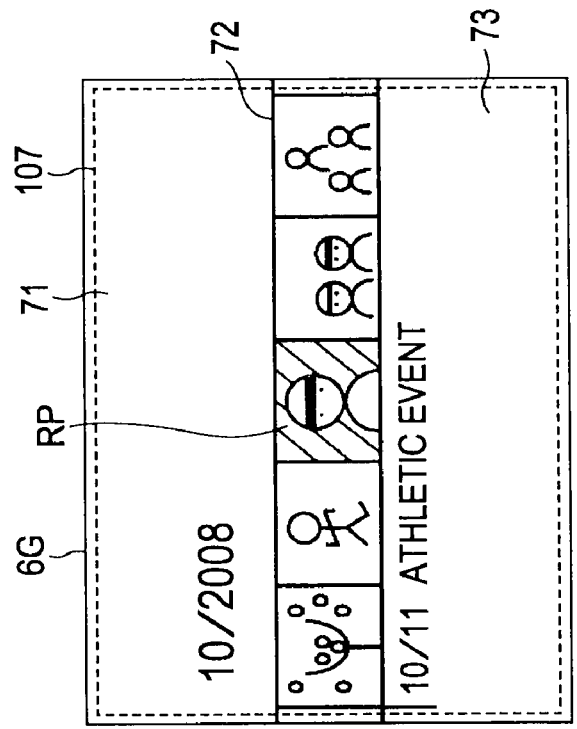
FIGS. 22A and 22B are diagrams is a diagram to describe a case of performing image search processing, with an image as a search key.
Figure 22B:
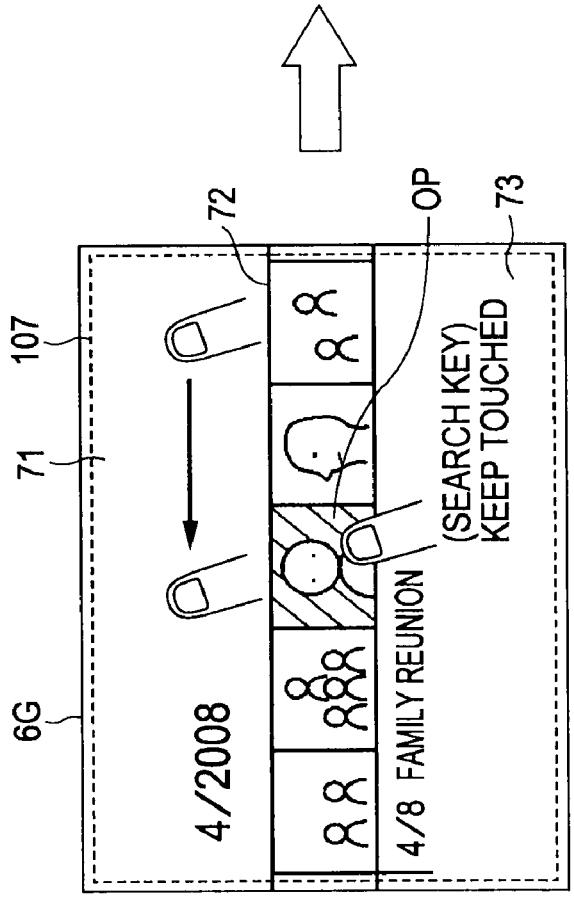

FIGS. 22A and 22B are diagrams to describe a case of performing image search processing with the image as the search key. In the case in FIGS. 22A and 22B also, the touch panel 107 is adhered to the entire face of the display screen 6G of the display unit 106 and an operating face is formed. Also, similar to the case described using FIG. 6, the operating face of the touch panel 107 has three operating areas formed, of a date area 71, image area 72, and event area 73. Also, the display screen 6G of the display unit 106 is divided into three display areas corresponding to the three operating areas in the touch panel 107.

As shown in FIG. 22A, the year/month display of "April 2008" is in the year/month area 71, and the event name information of "4/8 Family reunion" is displayed in the event area 73. Multiple (five) thumbnail images are displayed in the image area 72.

The state shown in FIG. 22A herein shows that the thumbnail images of the image files stored in the event virtual folder "Family reunion" belonging to the year/month virtual folder "April 2008" is displayed in the image area 72. Also, the display of "4/8" before the event name information in the event area 73 shows that the image data stored in the event virtual folder is that which is photographed on Apr. 8, 2008.

When in the state shown in FIG. 22A, there are cases wherein for example viewing another image similar to the image displayed in the image area 72 becomes desirable. For example, this is a case of desiring to see an image of another event of the person in the thumbnail image currently displayed.

In this case, as shown in FIG. 22A, the user first touches a finger or the like to the thumbnail image OP that is the reference displayed in the image area 72, and maintains the state thereof. The operation to maintain the touching operation to the image area 72 is the operation to fix the image analysis result of the image corresponding to the instructed thumbnail image OP as the search key.

The control unit 120 confirms that this is the operation to fix the image analysis result of the image corresponding to the instructed thumbnail image (in touching position) as the search key, in the case that continuously touching to the image area 72 is detected based on the coordinates data from the touch panel 107.

In order to indicate the search direction, the user performs a tracing operation (dragging operation or flicking operation) in the left direction as to the display screen, as indicated by the arrow, as to the date area 71, as shown in FIG. 22A.

In the state of continuously touching to the image area 72, based on the coordinates data from the touch panel 107, in the case that a tracing operation to the left direction is performed as to the date area 71, the control unit 120 determines that searching for image data in the direction of advancing the time is instructed.

In this case, the control unit 120 searches for image data that is similar to the search key (image analysis results of the images corresponding to the instructed thumbnail images in the case of this example) and that the creating year/month date is different from the creating year/month/date of the event virtual folder at the time of starting the search, in the direction of advancing the time.

More specifically, the control unit 120 searches for an image of the event virtual folder positioned later in the time-series order than the event virtual folder "Family reunion" of the year/month virtual folder "April 2008", and which is an image having the image analysis results similar to the image analysis results of the image corresponding to the thumbnail image that is made to be the search key.

By performing the image analysis with a predetermined method as to the image data of each image file, image analysis results are obtained, and by storing this in each image file, the results can be used. Of course, in the case that the processing capability of the control unit 120 is high, the image analysis for the image data of each image folder can be performed at the time of searching and this can be used.

Here, the image analysis can be shown by quantifying the image features from each image data, by using various types of methods such as edge detection or color analysis for example, and the similarity of the composition and subjects can be compared between each image.

Further, based on the results of the image analysis, the image analysis can search for another image similar to the person (face) that is a subject or another image similar to the place that is a subject, and can detect another image with similar color features.

Let us say that an image exists in the event virtual folder "Athletic event" belonging to the year/month virtual folder "October 2008" having the image analysis result similar to the image analysis result of an image corresponding to the thumbnail image specified as a search key.

In this case, the control unit 120 obtains the year/month information "2008.10" from the year/month virtual folder "October 2008". At the same time, the control unit 120 obtains event name information and month/date information (photographing month/date) from the event virtual folder "Athletic event".

Further, the control unit 120 obtains the pertinent portion of thumbnail data from multiple image files including the image file of the image that is similar, belonging to the event virtual folder "Athletic event".

The control unit 120 processes the obtained information by way of the display image forming unit 111 and display processing unit 105, and displays the image search screen (three-part divided screen) shown in FIG. 22B on the display screen of the display unit 106.

The state shown in FIG. 22B herein shows that the thumbnail image of the image file stored in the event virtual folder "Athletic event" belonging to the year/month virtual folder "October 2008" is displayed in the image area 72. Accordingly, another image similar to the instructed image can be quickly searched.

Note that conversely from the case in FIG. 22A, by performing a tracing operation towards the right direction as to the date area 71, an image search also in the direction of going back in time can of course be performed.

Also, in the case of the specific example 2, the tracing operation is performed as to the date area 71, but even in the case of performing the tracing operation as to the event area 73, similar processing can be performed as in the case of performing the tracing operation as to the date area 73.

Movement at Time of Image Search Processing in Case of Second Modification

Figure 23:
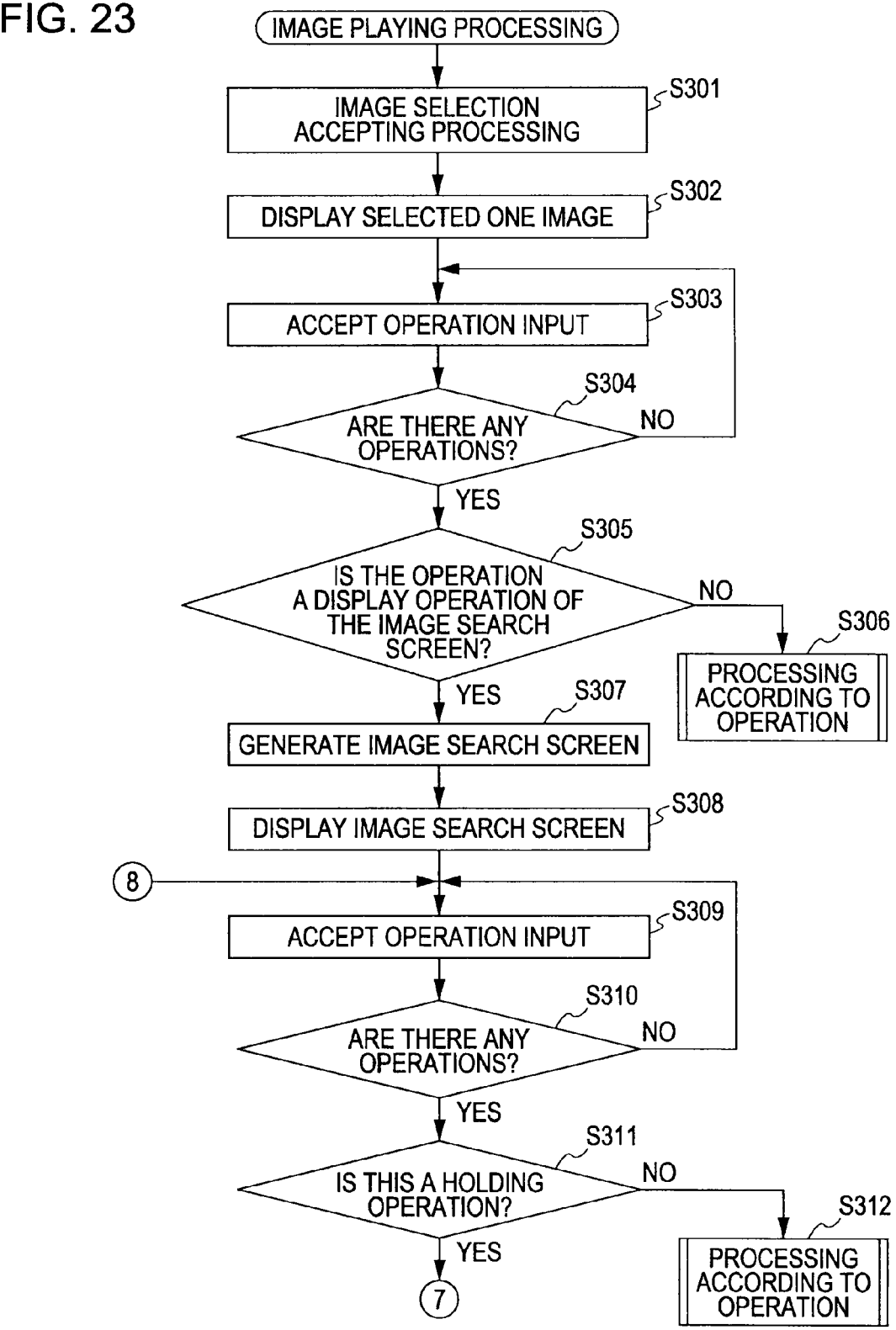
FIG. 23 is a flowchart to describe image searching processing performed with the imaging apparatus of a second modification.
Figure 24:
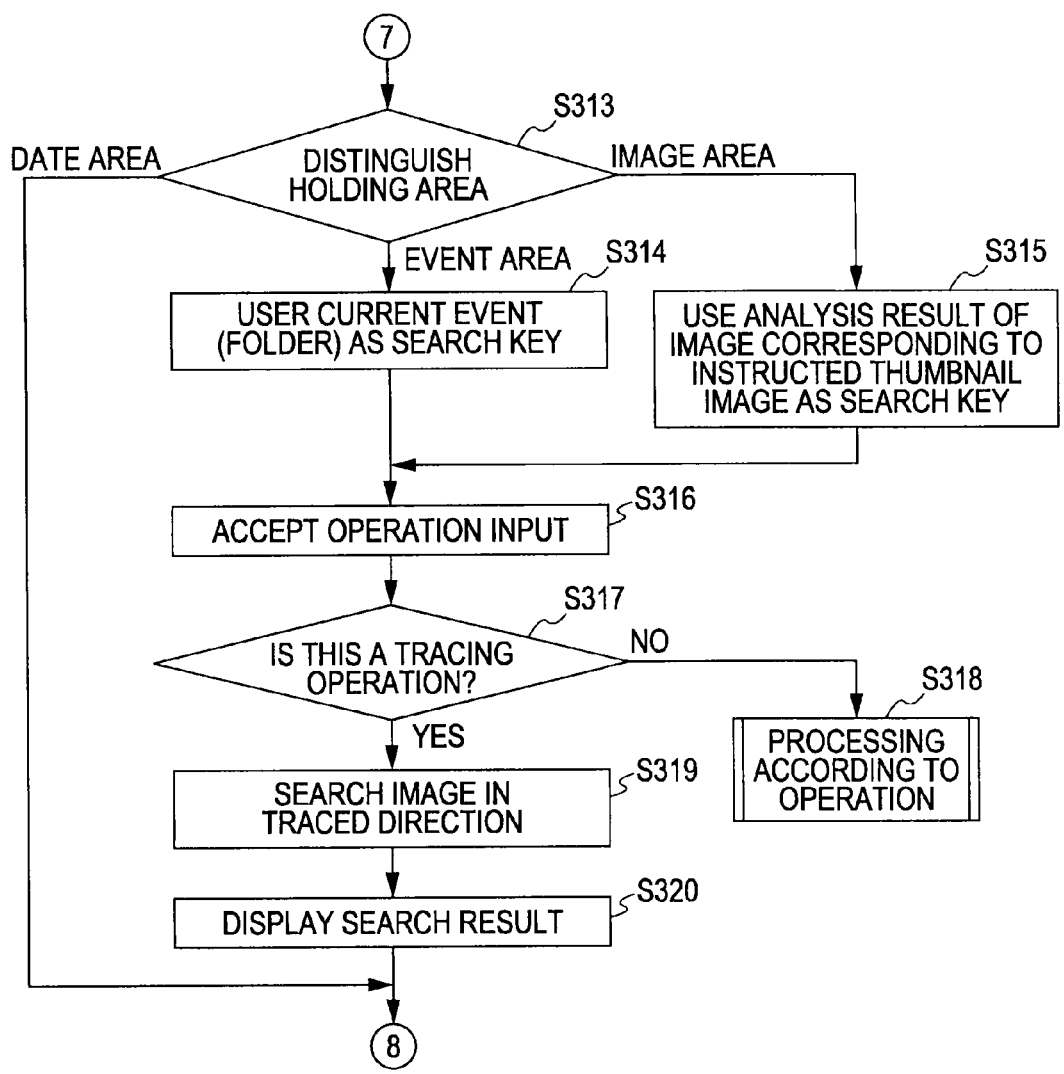
FIG. 24 is a flowchart that follows FIG. 23.

The image searching processing in the case of the second modification described using FIGS. 21A through 22B will next be described in detail. FIGS. 23 and 24 are flowcharts to describe the image searching processing performed with the imaging apparatus 100 of the second modification. The processing shown in FIGS. 23 and 24 is processing executed primarily by the control unit 120 in the case that a menu item referred to as "image reproducing processing (playing processing of a recorded image)" is selected from within a menu displayed on the display screen of the display unit 106.

Note that in the case that predetermined processing is performed such as the menu key provided to the operating unit 131 of the imaging apparatus 100 is pressed and operated, the control unit 120 controls the display image forming unit 111 and the display processing unit 105 and displays the menu on the display screen of the display unit 106.

Upon the image reproducing processing being selected, the control unit 120 executes the processing shown in FIGS. 23 and 24, and first performs processing to accept selection input of the first image to be displayed (step S301). The processing in the step S301 is the same processing as the processing in step S101 shown in FIG. 13.

After this, the control unit 120 displays the image selected in step S301 on the display screen of the display unit 106 (step S302). The processing in step S302 is the same processing as the processing in step S102 shown in FIG. 13.

After this, the control unit 120 accepts operating input from the user by way of the touch panel 107 and operating unit 131 (step S303), and determines whether or not operating input has been accepted from the user (step S304). In the determining processing in step S304, when determination is made that operating input has not been accepted from the user, the control unit 120 repeats the processing from step S303.

In the determining processing in step S304, when determination is made that operating input has been accepted from the user, the control unit 120 determines whether or not the accepted operating input is operating input to display the image search screen (three-part divided screen) configured as described using FIG. 6 (Step S305).

With the imaging apparatus 100 of the first embodiment, the operating input to display the image search screen is for example a tapping operation performed in the case that one screen of the image is displayed with the processing in step S302.

In the determining processing in step S305, when determination is made that the accepted operating input is not the display operation of the image search screen, the control unit 120 executes processing according to the accepted operating input from the user (step S306).

In step S306, various types of processing is performed, such as change page processing of the display image such as changing the image to be displayed to the next image in the time-series order or changing to the image immediately prior, or enlarging/reducing processing of the display image, or ending the image reproducing processing.

In the determining processing in step S305, when determination is made that the accepted operating input is the display operation of the image search screen, the control unit 120 generates the image search screen (step S307) using the image file of the image currently being displayed as a reference. The processing in this step S307 is similar processing as the processing in step S107 shown in FIG. 13.

The control unit 120 controls the display image forming unit 111 and display processing unit 105, and displays the image search screen of the configuration described using FIG. 6, which is formed with the display image forming unit 111, on the display screen 6G of the display unit 106 (step S308).

Thus, the image search screen that has display areas divided corresponding to the date area 71, image area 72, and event area 73 of the operating face of the touch panel 107 is displayed on the display screen 6G of the display unit 106 as shown in FIG. 6 and so forth.

After this, the control unit 120 accepts operating input as to the image search screen having the configuration shown in FIG. 6 (step S309). That is to say, when touching operations are performed by the user as to the operating screen of the touch panel 107, the coordinates data on the operating screen according to the touching operation is supplied from the touch panel 107, whereby the control unit 120 accepts this.

The control unit 120 determines whether or not operating input has been accepted in step S309 (step S310). With the determining processing in step S310, when determination is made that operating input is not accepted, the control unit 120 repeats the processing from the step S309.

With the determining processing in step S310, when determination is made that operating input is accepted, the control unit 120 determines whether or not a holding operation is performed as to a predetermined operating area, based on the coordinates data supplied from the touch panel 107 (step S311).

The holding operating is an operation to maintain (hold) the state of a user touching (pressing) with a finger or the like and continuing to touch. That is to say, this is an operation to maintain a state of touching as to the operating area (press-and-hold operation).

With the determining processing in step S311, when determination is made that a holding operation is not performed, the control unit 120 executes processing according to the accepted operating input (step S312). In step S312, various types of processing according to operating input can be performed, such as menu display processing of year/month information, menu display processing of event information, or ending processing and so forth, for example.

In the determining processing in step S311, when determination is made that a holding operation is performed, the control unit 120 distinguishes the operating area that is hold-operated, based on the coordinates data from the touch panel 107 (step S313).

In the determining processing in step S313, when the operating area of the holding operation is distinguished to be the date area 71, the year/month information is positioned on the upper order as shown in FIG. 2, and this does not becomes the search key, so the processing from step S309 in FIG. 23 is repeated.

Also, in the determining processing in step S313, when the operating area of the holding operation is distinguished to be the event area 73, the event name currently displayed (event name of the current event virtual folder) is identified as the search key (step S314).

Also, in the determining processing in step S313, when the operating area of the holding operation is distinguished to be the image area 72, the image analysis result of the image corresponding to the thumbnail image in the touching position is identified as the search key (step s315).

After the processing in step S314 or step S315, the control unit 120 accepts the operating input from the user (step S316), and the determines whether or not the accepted operating input is a tracing operation as to the date area 71 or event area 73 (step S317).

In the determining processing in step S317, when determination is made that the accepted operating input is not a tracing operation, the control unit 120 executes the processing according to the operating input (step S318). In the step S318 herein, there are cases wherein various types of processing such as ending processing for example is performed.

In the determining processing in step S317, when determination is made that the tracing operation is performed to a predetermined operating area, the control unit 120 uses the search key identified in step S314 or step S315, and performs an image search according to the direction of tracing operation (step S319).

Based on the results of the searching processing in step S319, the control unit 120 displays the image search screen including the thumbnail images of the searched image (step S320). After this, the control unit 120 repeats the processing from the step s309 shown in FIG. 23.

Thus, in the case of the second modification of the first embodiment herein, image searches can be performed using one of the image analysis results of the specified image and the event name information as a search key.

Expanded Form of Second Modification

As an expanded form of the second modification of the first embodiment herein, holding operations performed as to multiple different operating areas at the same time and tracing operations as to the other operation areas can be performed.

In this case, searching processing according to the direction of the tracing operation can be performed, while matching each of the information correlated to the operating areas that holding operations have been performed as search conditions.

Alternatively, searching processing according to the direction of the tracing operation can be performed, while matching any one of the information correlated to the operating areas that a holding operation has been performed as a search condition.

For example, a finger or the like touched and held to both the display position on the thumbnail image targeted for the image area 72 and to the event area 73, and a tracing operation as to the date area 71, can be performed. In this case, images can be searched for that are similar to the instructed image, and belong to the same event name as the instructed event name, and have different photographing years/months.

Alternatively, images can be searched for that are similar to the instructed image, or belong to the same event name as the instructed event name, and have different photographing years/months.

Also, a finger or the like touched and held to both the display position on the thumbnail image targeted for the image area 72 and to the date area 71, and a tracing operation as to the event area 73, can be performed. In this case, images can be searched for that are similar to the instructed image, and belong to the instructed year/month virtual folder, and belong to an event virtual folder of an event name that is different from the start of searching.

Alternatively, images can be searched for that are similar to the instructed image, or belong to the instructed year/month virtual folder, and belong to an event virtual folder of an event name that is different from the start of searching.

Note that logically, holding a finger or the like to both the date area 71 and event area 73, and performing a tracing operation as to the image area 72 can be done. However in this case, this does nothing more than simply search for the next image in the time-series order in the instructed direction, so is not particularly effective to realize.

Thus, as an expanded form of the second modification of the first embodiment herein, holding operations performed as a finger or the like is touched to both on the display position of the thumbnail image targeted for the image area 72 and to the event area 73, and a tracing operation as to the date area 71 can be performed.

In this case, for example by the user instruction, matching the image analysis results of the instructed image and the event name information for a search condition, or matching one of the image analysis results of the instructed image and the event name information for a search condition can be made. That is to say, an AND operation (logical product) for two of instructed information can be made the search condition, or an OR operation (logical sum) can be made the search condition.

Note that whether to use the AND operation (logical product) for two of instructed information for the search condition, or use the OR operation (logical sum) for the search condition, can be selected by the user. This selection also can be easily performed by way of the touch panel 107.

Example of Operation Changing to Holding Operation

Note that with the specific example 1 and specific example 2 of the second modification described using FIGS. 21A through 22B, specifying the search key is performed with a holding operation wherein a finger or the like is touched to a targeted operation areas and held there. However, embodiments of the present invention are not restricted to this arrangement.

Figure 25A:
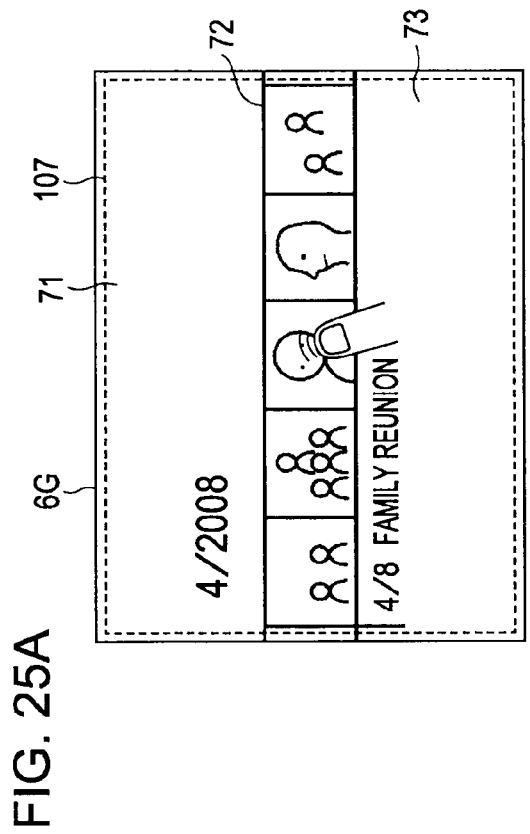
FIGS. 25A through 25C are diagrams to describe an example of a case wherein a double-click operation is used to specify the search key.
Figure 25B:
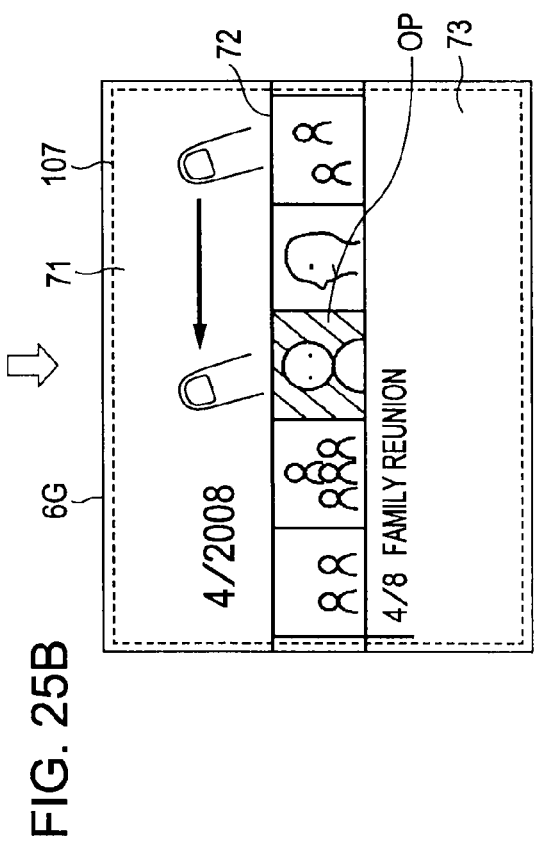
Figure 25C:
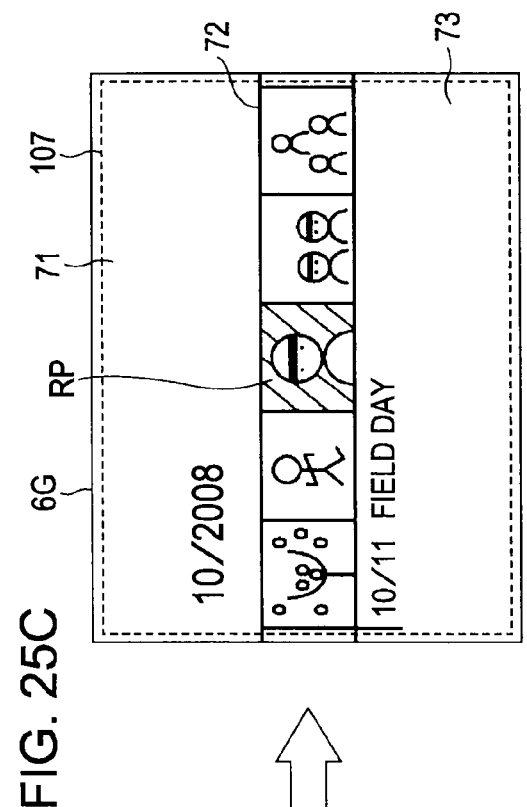

For example, another operating input such as double-tapping operation can be assigned to the specifying of the search key. FIGS. 25A through 25C are diagrams to describe an example in the case of using a double-tapping operation to specify the search key.

As shown in FIG. 25A, in the case that the image search screen is displayed, let us say that the image analysis results of the image corresponding to the thumbnail image OP displayed directly in the center of the image area 72 is desired to be the search key.

In this case, as shown in FIG. 25A, a double-tapping operation is performed with the finger or the like as to the operating face on the display position of the targeted thumbnail image. The double-tapping operation is an operation to touch a finger or the like twice on the operation screen as "tap, tap".

The touch panel 107 notifies the control unit 120 of the coordinates data according to the double-tapping operation, whereby the control unit 120 can recognize which position on the operation screen the double-tapping operation is performed.

The control unit 120 then determines that the double-tapping operation is a setting operation of the search key. Also, the control unit 120 recognizes how the display information is displayed on the display screen of the position that double-tapping operation is performed.

Therefore, the control unit 120 determines the image analysis results corresponding to the thumbnail image OP instructed by the double-tapping operation to be the search key. At the same time, as shown in FIG. 25B, the control unit 120 clarifies that the thumbnail image OP subjected to double-tapping is the selected thumbnail image by displaying as highlighted, or displaying a border on the thumbnail image, for example.

After this, as shown in FIG. 25B, in the case of accepting the tracing operation as to the date area 71 from the user, the control unit 120 determines the tracing operation as the starting instruction for the image search, based on the coordinates data from the touch panel 107.

The control unit 120 executes image search processing according to the tracing direction of the tracing operation. The search processing herein is the same processing as the processing described using FIGS. 22A and 22B. The control unit 120 obtains information to be used according to the results of the search processing, as described using FIGS. 22A and 22B.

The control unit 120 controls the display image forming unit 111 and display processing unit 105 and so forth, and displays the image search screen including a similar image RP that is similar to the instructed image OP on the display screen 6G of the display unit 106, as shown in FIG. 25C.

Thus, the selection operation for the search key can use not only a holding operation, but other operating input such as a double-tapping operation which does not cause confusion with other operating input.

Note that with the above-described first embodiment, as described using FIG. 2, the image files of the image data obtained by photographing are managed hierarchically as a year/month virtual folder (upper order), event virtual folder (middle order), and image file (lower order).

However, embodiments of the present invention are not restricted to this arrangement. By aligning the image files in photographing date/time order and in event order, the image data can be handled for each photographing year/month and for each event.

Accordingly, in this case, processing is not performed with the virtual folder as a reference, but the image files themselves can be processed for each photographing year/month and for each event.

Second Embodiment

Configuration Example of Music Player

Figure 26:
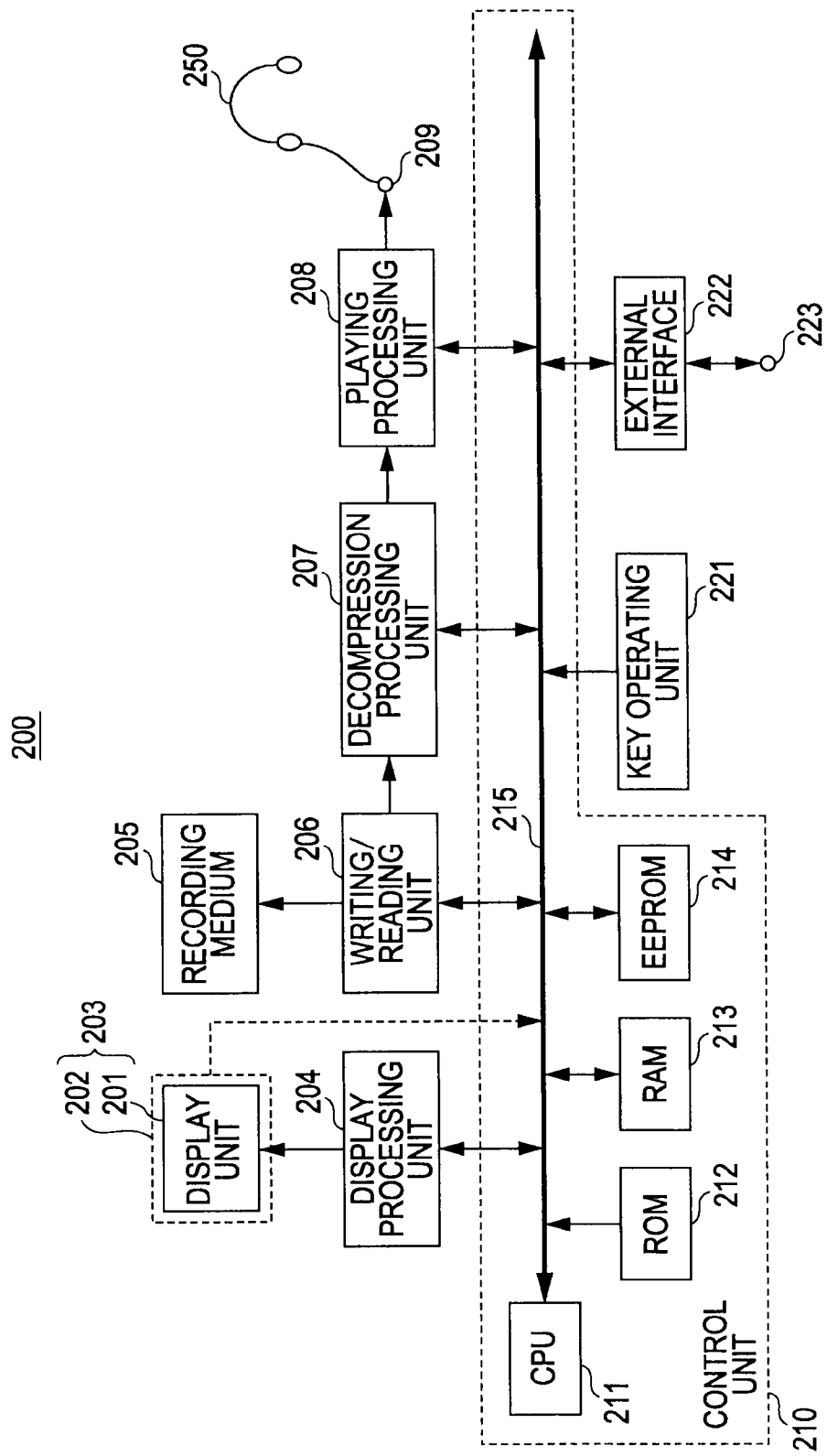
FIG. 26 is a block diagram to describe a configuration example of a music player according to a second embodiment.

FIG. 26 is a block diagram to describe the configuration example of a music player 200 according to a second embodiment to which an embodiment of the apparatus, method, and program of the present invention is applied.

As shown in FIG. 26, the music player 200 has a display unit 201, touch panel 202, recording medium 205, writing/reading unit 206, decompression processing unit 207, playing processing unit 208, and audio signal output terminal 209.

Also, the music player 200 has a control unit 210, key operating unit 221, external interface (hereafter abbreviated as external interface) 222, and input/output terminal 223.

The display unit 201 and touch panel 202 are configured similar to the display unit 106 and touch panel 107 of the imaging apparatus 100 of the above-described first embodiment. That is to say, the display unit 201 is made up of a so-called thin-type display device such as a LCD (Liquid Crystal Display), organic EL panel (Organic Electroluminescence Panel) or the like. The touch panel 202 is adhered as to the entire face of the display screen of the display unit 201 so as to form an operating face.

The touch panel 202 accepts an instruction operation (touching operation) as to the operating face from a user (person using), detects an instruction position (touching position) of the operating screen of the touch panel 202, and notifies the control unit 210 of the coordinates data indicating the instruction position.

As will be described later also, the control unit 210 is to control each unit of the music player 200, and recognizes what sort of display is performed as to the display screen of the display unit 201. The control unit 210 can accept instruction operations (input operations) from the user, based on coordinates data indicating the instruction position on the operating face from the touch panel 202 and the display information on the display screen of the display unit 201 corresponding to the instruction position.

Thus, with the music player 200, the touch screen 203 serving as an input device is formed by the display unit 201 and touch panel 202. Note that the touch panel 202 is realized as a pressure-sensitive type or an electrostatic type, for example.

Also, the touch panel 202 can detect each of the operations performed at the same time in multiple locations on the operating screen and output the coordinates data indicating each of the touching positions thereof. Also, the touch panel 202 can detect each of the instruction operations performed repeatedly as to the operating screen and output the coordinates data indicating each of the touching positions thereof.

Further, the touch panel 202 can detect the touching positions continuously for every predetermined timing while the finger or stylus is being made to touch by a user and output the coordinates data indicating each of the touching positions thereof.

Thus, the touch panel 202 can accept various types of instruction operations (operating input) from a user such as so-called tapping operation, double-tapping operation, dragging operation, flicking operation, pinching operation, and so forth, and detect these.

The control unit 210 is connected to each unit making up the music player 200 and controls each unit of the music player 200 as described above, and has a so-called microcomputer configuration.

That is to say, the control unit 210 is configured of a CPU 211, ROM 212, RAM 213, and EEPROM 214 connected through a CPU bus 215.

The CPU 211 reads out and executes a program stored in the later-described ROM 212 and forms a control signal to supply to each unit, supplies this to each unit, and also accepts data provided from each unit and processes this.

The ROM 212 stores and holds beforehand various types of programs executed with the CPU 211 and various types of data and so forth for processing, as described above. The RAM 213 is used primarily as a work area, such as temporarily storing mid-point results in various types of processing.

The EEPROM 214 is non-volatile memory, and stores and holds information that should be held even if the power of the music player 200 is turned off. For example, various types of parameters set by the user, final results of various types of processing, or processing programs and data and so forth newly provided for the purpose of adding functions, are held in the EEPROM 214.

Besides various types of circuit units to execute the later-described music playing functions, an operating unit 221 and external interface 222 are connected to the control unit 210 thus configured, as shown in FIG. 26. Other than this, a clock circuit is connected to the control unit 210, and the current year/month/date, current day of week, current time and so forth can be provided to the control unit 210, although not shown in the drawings.

The operating unit 221 has various types of operating keys and function keys and so forth such as a playing key, stopping key, pausing key, fast-forwarding key, and rewinding key, accepts the operating input from the user, and notifies this to the control unit 210. Thus the control unit 210 can control each unit according to the operating input from the user that has been accepted by way of the operating unit 221, and execute the processing according to the operating input.

The external interface 222 is a digital interface compliant with predetermined standards, such as USB (Universal Serial Bus) and IEEE (Institute of Electrical and Electronics Engineers Inc) 1394, for example. That is to say, the external interface 222 converts and accepts data from external devices connected to the input/output terminal 223 into data of a format that can be processed with the own device, and converts and outputs data transmitted from the own device into data in a predetermined format.

Song data that is data-compressed according to a predetermined data compression method for example that is provided from an external device such as a personal computer for example, connected to the input/output terminal 223, is supplied to the writing/reading unit 206 by way of the control unit 210.

The writing/reading unit 206 writes in song data or the like as to the recording medium 205 of the device itself according to control by the control unit 210. Also, the writing/reading unit 206 reads out the instructed song data according to the control of the control unit 206, and supplies this to the decompression processing unit 206.

In the music player 200 of the second embodiment, the recording medium 205 is a built-in flash memory of relatively large storage capacity of several gigabytes to several tens of gigabytes, for example. As a recording medium 205, a recording medium such as a small hard disk or optical disk may also be used. Also, not a built-in type but also a removable memory that can be attached/detached such as a memory card or optical disk can be used for the configuration.

The decompression processing unit 207 subjects to decompression processing the song data that is controlled by the control unit 210 and subjected to data compression from the writing/reading unit 206, thereby restoring to the original song data of before the data compression, and this is supplied to the playing processing unit 208.

The playing processing unit 208 forms an analog audio signal for playing from song data that is controlled by the control unit 210 and subjected to decompression processing from the decompression processing unit 207, and outputs this by way of the audio signal output terminal 209.

The audio signal output terminal 209 has headphones 250 connected thereto as shown in FIG. 26, and the user can listen to the playing audio according to the analog audio signal for playing that is formed with the playing processing unit 208, by way of the headphones 250.

With the music player 200 of the second embodiment, various types of display images can be displayed on the display screen 201G of the display unit 201, by way of the display processing unit 204 controlled by the control unit 210.

As described above also, the music player 200 has a touch screen 203 that is made up of the display unit 201 and touch panel 202, and can quickly search and play targeted song data by way of the touch screen 203.

Song Data Managing Method

With the music player 200 of the second embodiment, the song data is not to be simply stored and managed in folder increments. With the music player 200, the song data can be recorded on the recording medium 205 and managed by artist and by album.

Figure 27:
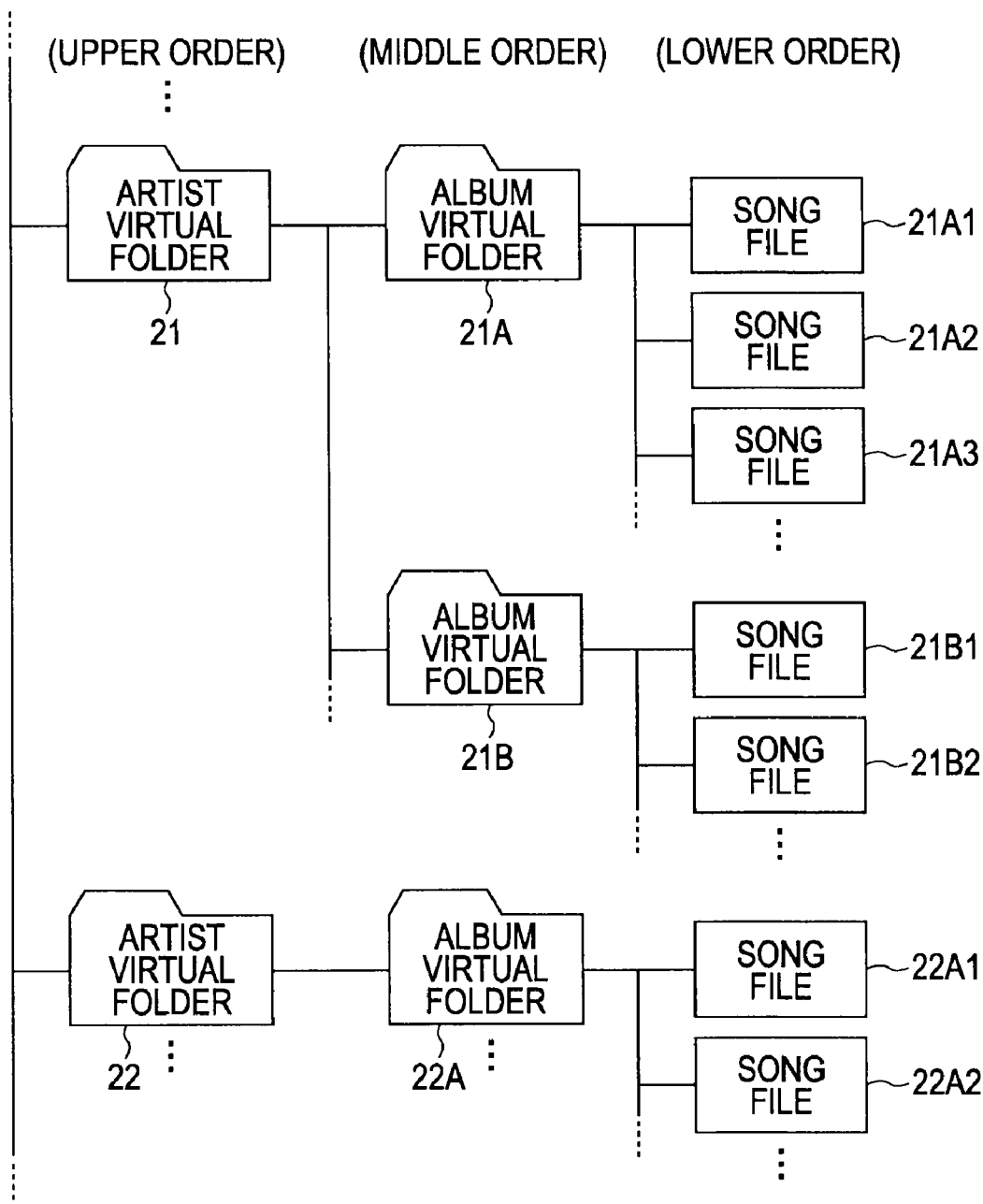
FIG. 27 is a diagram to describe a song data managing method with the music player.

FIG. 27 is a diagram to describe a managing method of song data with the music player 200. For example, under a root folder having a role of bundling all of the song data (not shown in FIG. 27), artist virtual folders 21, 22, and so on, are provided that bunch the song data in artist increments. FIG. 27 shows that the album virtual folders 21A, 21B, and so on, that bunch the song data by album of the artist exist within the artist virtual folder 21. Similarly, this shows that the album virtual folders 22A, 22B, and so on, that bunch the song data by album of the artist exist within the artist virtual folder 22.

In each album virtual folder, the song files of the songs recorded in the album thereof are stored in recording order for example. In the case of the example shown in FIG. 27, the song files 21A1, 21A2, 21A3, and so on, exist in the album virtual folder 21A. Similarly, the song files 21B1, 21B2, and so on, exist in the album virtual folder 21B, and the song files 22A1, 22A2, and so on, exist in the album virtual folder 22A.

Thus, with the music player 200 of the second embodiment, the song data is managed in three orders, as an artist virtual folder (upper order), album virtual folder (middle order), and each song file (lower order).

Thus, what sort of album each artist has out, and what sort of songs are recorded on these albums can be managed. That is to say, the song data is arranged and managed in artist order and in album order.

Note that the artist virtual folder is managed alphabetically by artist name, and also the album virtual folder is managed in order of release date.

Layout Example of Virtual Folder and Song File
Layout Example of Artist Virtual Folder FIG. 28 is a diagram to describe the layout example of the artist virtual folder positioned on the upper order, as shown in FIG. 27. As shown in FIG. 28, the artist virtual folder has an artist name serving as the identification information.

Further, the artist virtual folder has various types of metadata relating to the artist virtual folder, such as the created date/time of the artist virtual folder and the number of albums recorded. The metadata herein can append information that can be automatically obtained by the control unit 210 and clock circuit functions, as well as information such as keywords input by the user by way of the operating unit 221 and so forth.

As shown in FIG. 28, information is held that is made up of an album name for each album put out by the artist, metadata for the album thereof (for example information such as playing time and participating artists), and the release date of the album thereof.

Thus, with the information of the artist virtual folder, what sort of album each artist has put out can be managed.

Layout Example of Album Virtual Folder

FIG. 29 is a diagram to describe a layout example of the album virtual folder positioned on the middle order, as shown in FIG. 27. As shown in FIG. 29, the album virtual folder has an album name (folder name) serving as the identification information.

Further, the album virtual folder has information showing jacket image data and the release date of the album, and other various types of metadata. The information showing jacket image data and the release date and other various types of metadata is information provided along with the song data when the song data is downloaded by way of the Internet for example.

As shown in FIG. 29, for each of the songs recorded on the album, information made up of the song file name, song title, and an address on the recording medium indicating the recording position of the song file is held.

Thus, with the album virtual folder information, what sort of song files belong to each album virtual folder can be managed.

Layout Example of Song File

Figures 30, 31:
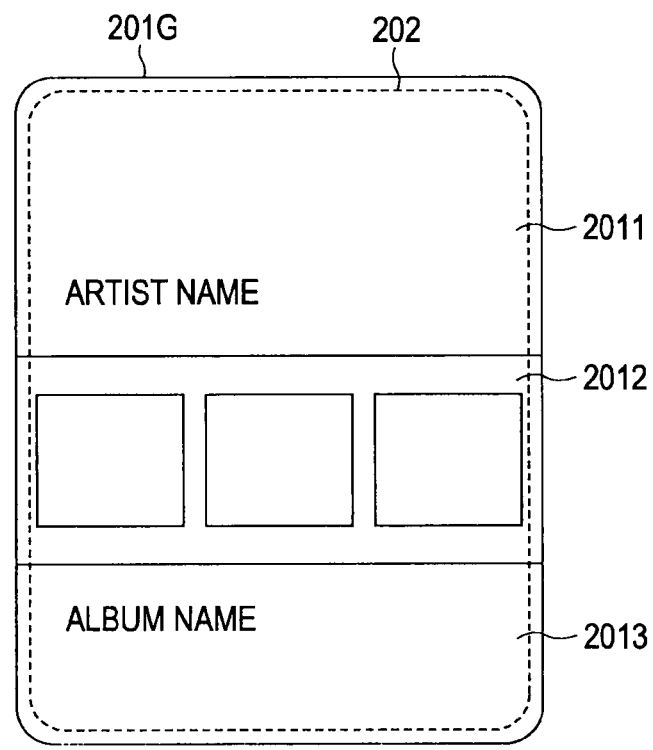
FIG. 30 is a diagram to describe a layout example of a song file.
FIG. 31 is a diagram to describe a search screen for song data (song search screen) used with the imaging apparatus.

FIG. 30 is a diagram to describe a layout example of the song file positioned on the lower order, as shown in FIG. 27. As shown in FIG. 30, the song file has a file name serving as the identification information.

Further, the song file has various types of metadata such as the song title, release date, and jacket image data. The media data herein is information provided along with the song data when the song data is downloaded via the Internet, for example.

Thus, song data that is downloaded by way of the Internet, for example, is stored in a state of data compression in the song file with the file name serving as identification information and various types of metadata appended thereto, as main data.

By playing/processing the song data of the song file, the audio according to the song data is played, and can be listened to by way of the headphones 250.

Overview of Song Searching Processing

With the music player 200 of the second embodiment herein, by using the touch screen 203 for the song data managed as described using the FIGS. 27 through 30, searching can be performed quickly and accurately without performing tedious operations.

FIG. 31 is a diagram to describe the search screen for the song data used with the music player 200 of the second embodiment. A touch panel 202 is adhered to the entire face of the display screen 201G of the display unit 201, whereby an operating face is formed, as shown with dotted lines along the outer edges of the display screen 201G.

The control unit 210 divides the operating face of the touch panel 202 formed on the entire face of the display screen 201G of the display unit 201 into three areas in the vertical direction of the display screen 201G, as shown in FIG. 31.

That is to say, as shown in FIG. 31, the control unit 210 recognizes the range of each area on the operating screen (position and size), with the upper order as the artist name area 2021, the middle order as the jacket image area 2022, and the lower order as the album name area 2023.

Further, the control unit 210 has the display screen 201G also divided into three display areas so as to match each of the artist name area 2021, jacket image area 2022, and album name area 2023 formed by dividing the operating face of the touch panel 202 into three parts. The control unit 210 also recognizes the range (position and size) of each display area divided on the display screen 201G.

Thus, in forming a song search screen, the control unit 210 divides the display screen 201G into three display areas in the vertical direction as shown in FIG. 31, and corresponding to each display area, the operating face of the touch panel 202 can be understood to have been divided into three operating areas.

Therefore, with the song search screen shown in FIG. 31, the operating screen of the touch panel 202 and the display screen 201G of the display unit 201 are divided into an artist name area 2021, jacket image area 2022, and album name area 2023, and each area will be described using the same reference numerals.

With the song search screen shown in FIG. 31, the upper order artist name area 2021 is an area to display the artist name information. The artist name which is the identification information of the artist virtual folder described using FIGS. 27 and 28 is displayed in the artist name area 2021 herein.

Also, the lower order album name area 2023 is an area displaying the album name information. Album name information (folder name information) which is identification information of the album virtual folder described using FIGS. 27 and 29 is displayed in the album name area 2023.

Also, the middle order jacket image area 72 is an area to display a jacket image or the like corresponding to each song. Images from the jacket image data of the song files belonging to the album virtual folder identified by the album name information displayed in the album name area 2023 are primarily displayed in the jacket image area 2022.

Note that there are cases wherein there is originally no jacket image for each song data. In such a case, the information for displaying the song title of the song thereof is appended as the jacket image to serve as the jacket image. Accordingly, information that can identify the song thereof is displayed for every song data in the jacket image area 2022.

When the user performs a search of song data with the music player 200, the control unit 210 controls the display processing unit 204, forms the song search screen shown in FIG. 31, and displays this on the display screen 201G of the display unit 201.

By performing a tracing operation as to the artist name area 2021, the artist (artist virtual folder) can be changed, and the jacket image corresponding to the song data recorded in the album of another artist displayed. In this case, the display of the artist name and the display of the album name are also changed.

Also, by performing a tracing operation as to the album name area 2023, the album (album virtual folder) can be changed, and the jacket image corresponding to the song data recorded in another album displayed. In this case, the display of the album name is also changed.

Also, in the case of changing the album (album virtual folder), there are cases that the artist virtual folder also is changed. In such a case, not only the display of the album name, but also the display of the artist name is changed.

Also, by performing a tracing operation as to the jacket image area 2022, the display of the jacket image can be scrolled. In this case, there are cases that the album virtual folder and the artist virtual folder change. In such a case, the display of the album name and the display of the artist name are changed.

By selecting the jacket image of the targeted song from within the jacket images displayed in the jacket image area 2022, the song corresponding to the jacket image thereof can be played.

Thus, the music player 200 also can be applied to embodiments of the present invention, and searches of song data by artist and by album can be quickly performed with simple operations.

Modification of Second Embodiment

Note that with the music player 200 of the second embodiment, the song data is managed in three orders as described using FIG. 27. However, embodiments of the present invention are not restricted to this arrangement. For example, managing can also be performed with four orders.

Figure 32:
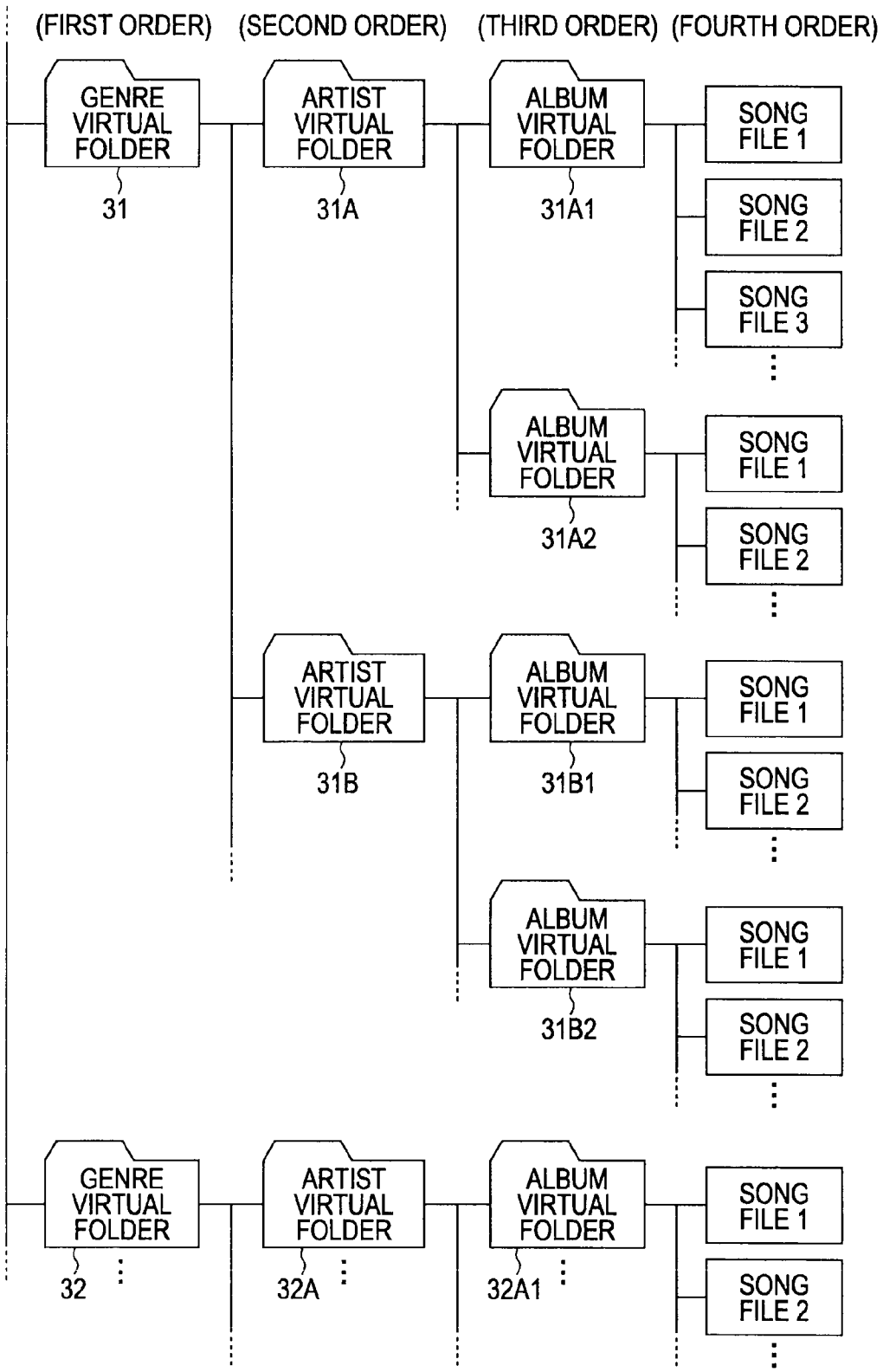
FIG. 32 is a diagram to describe an example of a case of managing song data in four orders, in the order of genre, artist, album, and song data.

FIG. 32 is a diagram to describe an example of the case of managing the song data in four orders, in the order of genre, artist, album, and song data. As shown in FIG. 32, the configuration of the second order and below is the same configuration as the configuration described using FIG. 27.

In the case of the example in FIG. 32, a genre (genre virtual folder) is provided in an order above the artist (artist virtual folder), and song data can also be managed for each genre.

Figures 33, 34:
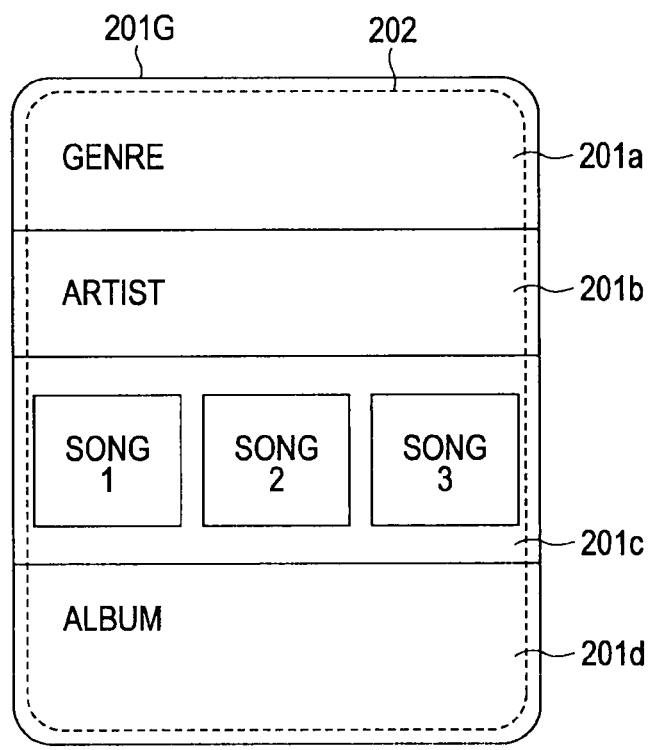
FIG. 33 is a diagram to describe a layout example of a genre virtual folder.
FIG. 34 is a diagram to describe a song search screen of a modification according to the second embodiment.

FIG. 33 is a diagram to describe a layout example of the genre virtual folder. As shown in FIG. 33, the genre virtual folder has a genre name which is identification information and metadata.

The genre name is information indicating the type of song that each song belongs to, such as rock, folk, classical, and so forth, for example. Also, the metadata includes a genre overview and so.

The genre virtual folder has the artist name identifying the artist belonging to the genre thereof, and metadata corresponding to each artist name appended thereto. Thus, which genre an artist belongs to can be recognized.

Also, with the modification herein also, each of the artist virtual folder, album virtual folder, and song file are configured as described using FIGS. 28 through 30.

Thus, in the case of the modification in the second embodiment herein, as shown in FIG. 34, the song search screen that has divided the operating face of the touch panel 202 into four operating areas is formed, and this can be used.

That is to say, FIG. 34 is a diagram to describe the song search screen of the modification of the second embodiment. As shown in FIG. 34, the song search screen of the modification has, in order from the top order, a genre name area 202*a*, artist name area 202*b*, jacket image area 202*c*, and album name area 202*d*. The control unit 210 recognizes the range (position and size) of each area on the operating screen.

Also, the control unit 210 divides the display screen 201G into four display areas so as to each match the genre name area 202*a*, artist name area 202*b*, jacket image area 202*c*, and album name area 202*d* of the operating face. The control unit 210 also recognizes the range (position and size) of each display area divided on the display screen 201G.

Thus, in forming the song search screen, the control unit 210 divides the display screen 201G into four display areas in the vertical direction as shown in FIG. 34, and the operating face of the touch panel 202 can be understood to have been divided into four operating areas corresponding to each display area.

Therefore, with the song search screen shown in FIG. 34, the operating screen of the touch panel 202 and the display screen 201G of the display unit 201 are divided into four so as to correspond, and each area will be described using the same reference numerals.

With the song search screen shown in FIG. 34, the genre name area 202*a* of the uppermost order is an area displaying the genre name information, and displays genre name information which is the identification information of the genre virtual folder shown in FIG. 33. The other areas are each areas that are the same as the areas corresponding to the song search screen shown in FIG. 31.

With the music player 200, upon the user performing a song data search, the control unit 210 controls the display processing unit 204, forms the song search screen shown in FIG. 34, and displays this on the display screen 201G of the display unit 201.

By performing a tracing operation as to the genre name area 202*a*, the genre (genre virtual folder) can be changed, and the jacket image corresponding to the song data recorded in the album of an artist of another genre displayed. In this case, displays of the genre name, artist name, and album name also are changed.

Also, by performing a tracing operation as to the artist name area 202*b*, the artist (artist virtual folder) can be changed, and the jacket image corresponding to song data recorded in the album of another artist displayed. In this case, the display of the artist name and the display of the album name are also changed. By repeatedly performing the tracing operation to the artist name area 202*b*, in the case that the genre virtual folder has changed, the display of the genre name also is changed.

By performing a tracing operation as to the album name area 202*d*, the album (album virtual folder) can be changed, and the jacket image corresponding to the song data recorded in another album displayed. In this case, the display of the album name is also changed.

Also, in the case of changing the album (album virtual folder), there are cases wherein the genre virtual folder and the artist virtual folder is also changed. In such a case, not only the display of the album, but also the displays of the genre name and artist name are changed.

Also, by performing a tracing operation as to the jacket image area 202*c*, the display of the jacket image can be scrolled. In this case, there are also cases wherein the album virtual folder, artist virtual folder, and genre virtual folder changes. In such a case, displays such as the album name, artist name, and genre name are also changed.

By selecting the jacket image of the targeted song from within the jacket images displayed in the jacket image area 202*c*, the song corresponding to the jacket image thereof can be played.

Thus, the music player 200 also can be applied to embodiments of the present invention, and searches of song data by genre, by artist, and by album can be quickly performed with simple operations.

Third Embodiment

Configuration Example of Disk Server

Figure 35:
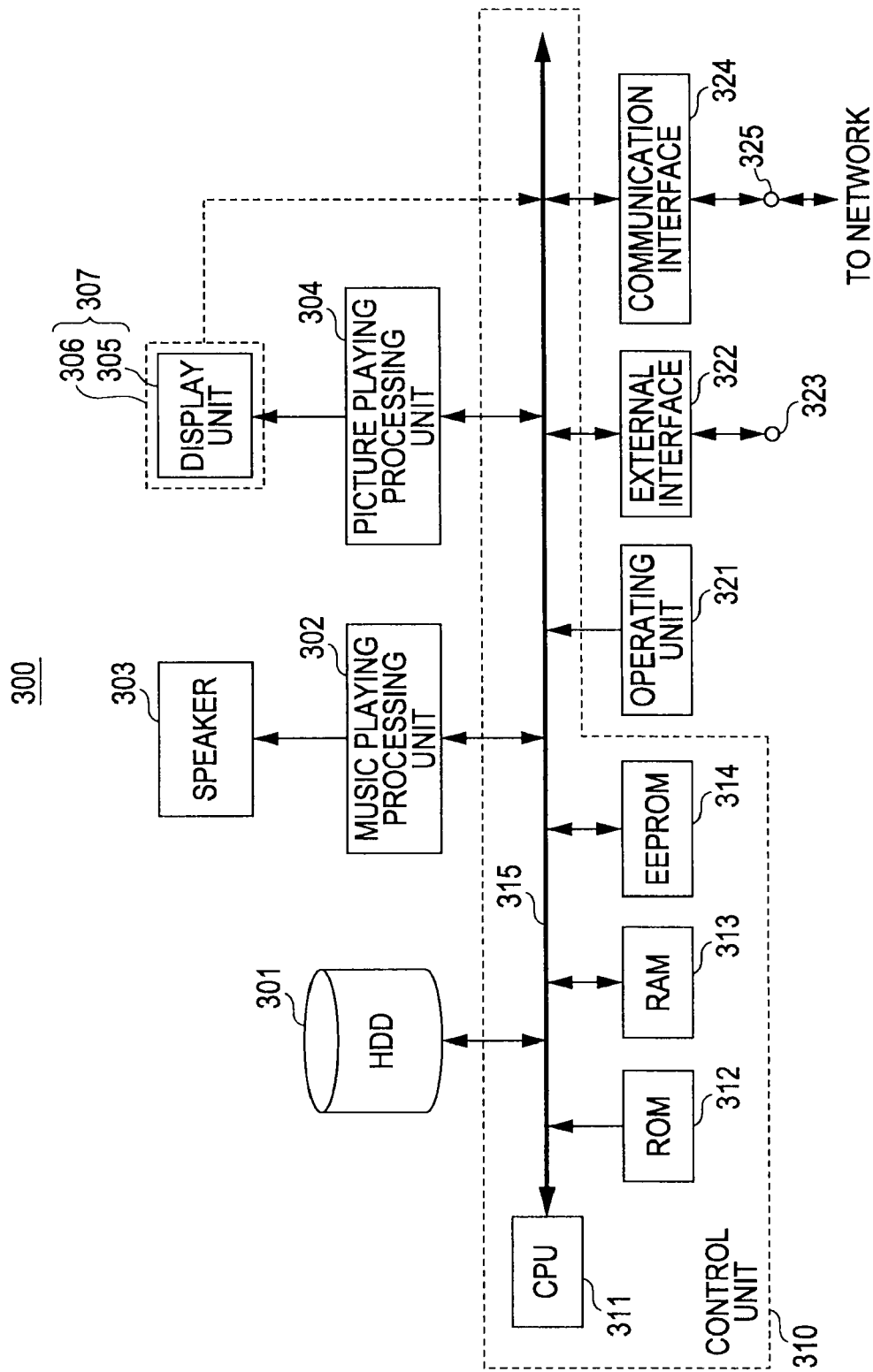
FIG. 35 is a block diagram to describe a configuration example of a disk server according to a third embodiment.

FIG. 35 is a block diagram to describe a configuration example of the disk server 300 according to a third embodiment to which an embodiment of the apparatus, method, and program of the present invention is applied. As shown in FIG. 35, the disk server 300 has a hard disk drive (hereafter abbreviated as HDD) 301, audio playing processing unit 302, speaker 303, picture reproducing processing unit 304, display unit 305 and touch panel 306.

Also, the disk server 300 has a control unit 310, operating unit 321, external interface (hereafter abbreviated as external interface) 322, input/output terminal 323, communication interface (hereafter abbreviated as communication interface) 324, and communication connection terminal 325.

The display unit 305 and touch panel 306 are configured similar to the display unit 106 and touch panel 107 of the imaging apparatus 100 of the first embodiment described above.

That is to say, the display unit 305 is made up of a so-called thin-type display device such as a LCD (Liquid Crystal Display), organic EL panel (Organic Electroluminescence Panel) or the like. The touch panel 306 is adhered as to the entire face of the display screen of the display unit 305 so as to form an operating face.

The touch panel 306 accepts an instruction operation (touching operation) as to the operating face from a user (person using), detects an instruction position (touching position) of the operating screen of the touch panel 306, and notifies the control unit 310 of the coordinates data indicating the instruction position.

As will be described later also, the control unit 310 is to control each unit of the disk server 300, and recognizes what sort of display is performed as to the display screen of the display unit 305. The control unit 310 can accept instruction operations (input operations) from the user, based on coordinates data indicating the instruction position on the operating face from the touch panel 306 and the display information on the display screen of the display unit 305 corresponding to the instruction position.

Thus, with the disk server 300, a touch screen 307 serving as an input device is formed by the display unit 305 and touch panel 306. Note that the touch panel 306 is realized as a pressure-sensitive type or an electrostatic type, for example.

Also, the touch panel 306 detects each of the operations to be performed at the same time at multiple locations on the operation screen, and the coordinates data indicating each of the touching positions thereof can be output. Also, the touch panel 306 can each of the instruction operations performed repeatedly as to the operating screen, and can output coordinates data indicating each touching position thereof.

Further, the touch panel 306 can detect the touching positions continuously for each predetermined timing during the finger or stylus being in contact by the user, and can output coordinates data indicating this.

Thus, the touch panel 306 can accept various instruction operations (operating input) from the user such as a so-called tapping operation, double-tap operation, dragging operation, flicking operation, pinching operation, and so forth, and can detect this.

The control unit 310 is connected to each unit making up the disk server 300 and controls each unit of the disk server 300 as described above, and has a so-called microcomputer configuration. That is to say, the control unit 310 is configured by a CPU 311, ROM 312, RAM 313, and EEPROM 314 connected through a CPU bus 315.

The CPU 311 reads out and executes a program stored in the later-described ROM 312 and forms a control signal to supply to each unit, supplies this to each unit, and also accepts data provided from each unit and processes this.

The ROM 312 stores and holds beforehand various types of programs executed with the CPU 311 and various types of data and so forth used for processing, as described above. The RAM 313 is used primarily as a work area, such as temporarily storing mid-point results in various types of processing.

The EEPROM 314 is non-volatile memory, and stores and holds information that should be held even if the power of the disk server 300 is turned off. For example, various types of parameters set by the user, final results of various types of processing, or processing programs and data and so forth newly provided for the purpose of adding functions, are held in the EEPROM 314.

Besides various types of circuit units to execute the later-described content playing functions, a operating unit 321, external interface 322, and communication interface 324 are connected to the control unit 310 thus configured, as shown in FIG. 35. Other than this, although not shown in the diagram, a clock circuit is connected to the control unit 210, and the current year/month/date, current day of week, current time and so forth can be provided to the control unit 310.

The operating unit 321 has various types of operating keys and function keys and so forth such as a playing key, stopping key, pausing key, fast-forwarding key, and rewinding key, accepts the operating input from the user, and notifies this to the control unit 310. Thus the control unit 310 can control each unit according to the operating input from the user that has been accepted by way of the operating unit 321, and execute the processing according to the operating input.

The external interface 322 is a digital interface compliant with predetermined standards, such as USB (Universal Serial Bus) and IEEE (Institute of Electrical and Electronics Engineers Inc) 1394, for example. That is to say, the external interface 322 converts and accepts data from external devices connected to the input/output terminal 323 into data of a format that can be processed with the own device, and converts and outputs data transmitted from the own device into data in a predetermined format.

The content data that is data-compressed according to a predetermined data compression method for example, that is provided from an external device such as a personal computer connected to the input/output terminal 323 for example, is supplied to the HDD 301 by way of the control unit 310.

The communication interface 324 realizes a connection to a wide area network such as the Internet, for example. Also, the communication connection terminal 325 is to enable a connection to the wide area network. Communication lines from a wide area telephone communication network for example are connected to the communication connection terminal 325. The communication interface 325 realizes data exchange between the wide area network such as the Internet connected by way of the connection terminal 325.

Thus, the control unit 310 transmits a request to the wide area network such as the Internet by way of the communication interface 324 and connection terminal 325, receives the content provided according to the request, and can supply this to the HDD.

The hard disk 301 has a large-capacity hard disk of several hundred gigabytes or more and a disk drive to write in data as to the hard disk and read out desired data from the hard disk.

The HDD 301 records the content data supplied by way of the control unit 310 to the hard disk, according to the control by the control unit 310, and reads the desired content data to be played and supplies this to the control unit 310, according to the control by the control unit 310.

The control unit 310 separates the content data read out from the HDD 301 into an audio data portion and a picture data portion. The control unit 310 supplies the separated audio data to the audio playing processing unit 302, and the separated picture data to the picture reproducing processing unit 304.

The audio playing processing unit 302, in the case that the audio data supplied is thereto is data compressed, subjects this to decompression processing and restores the original audio data of before the data compression. The audio playing processing unit 302 forms an analog audio signal for playing from the audio data subjected to decompression processing, and supplies this to the speaker. Thus, the playing audio according to the audio data of the content data to be played is released from the speaker 303.

The picture reproducing in the case that the picture data supplied is thereto is data compressed, subjects this to decompression processing and restores the original picture data of before the data compression. The picture reproducing processing unit 304 forms an analog picture signal for reproducing from the picture data subjected to decompression processing, and supplies this to the display unit 305. Thus, the reproduced picture according to the picture data of the content data to be reproduced, is displayed on the display screen 305G of the display unit 305.

Thus, the disk server 300 receives a provision of various types of content data from an external device or the server device on the Internet, stores this in the hard disk, and can read out and play according to instructions from the user.

With the disk server 300 of the third embodiment herein, various types of display images can be displayed on the display screen 305G of the display unit 305 by way of the picture reproducing processing unit 304 controlled by the control unit 310.

As described above also, the disk server 300 has a touch screen 307 made up of a display unit 305 and touch panel 306, and targeted content data can be quickly searched and played by way of the touch screen 307.

Content Data Managing Method

With the disk server 300 of the third embodiment, the content data is not to be stored and managed simply in folder increments. With the disk server 300, the content data is recorded and managed on the HDD 301 by media and by release date.

Figure 36:
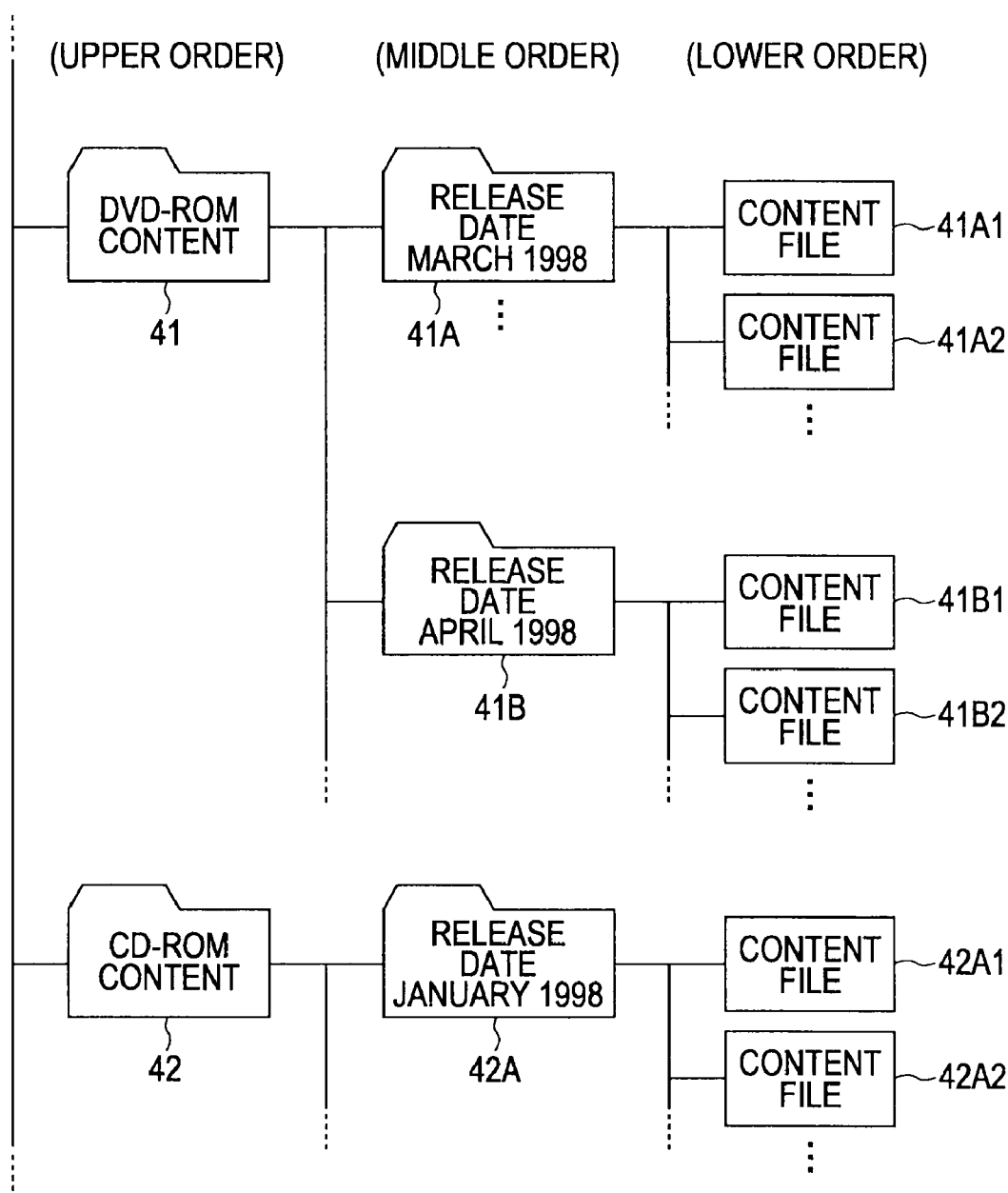
FIG. 36 is a diagram to describe a content data managing method with the disk server.

FIG. 36 is a diagram to describe a managing method of content data with the disk server 300. For example, below a root folder having the role of bundling all content data (not shown in FIG. 36), the media folders 41, 42, and so on, which bunch the content data by media increments.

The media folder herein indicates the original providing medium of the content data. For example, content data provided by DVD-ROM is managed via the media virtual folder 41 for DVD-ROM, and content data provided by CD-ROM is managed via the media virtual folder 42 for CD-ROM.

Other than this, media virtual folders are formed for each of various types of providing media, such as that which manages the content data provided by way of the Internet, and that which manages the content data from a hard disk of an external device.

FIG. 36 shows that release date virtual folders 41A, 41B, and so on, that bunch the content data provided by the media (DVD-ROM) exist within the media virtual folder 41. Similarly, this shows that release date virtual folders 42A, and so on, that bunch the content data provided by the media (CD-ROM) exist within the media virtual folder 42.

The content data released (provided to the market) on the release date thereof is stored in alphabetical title order, for example, in each release date virtual folder. In the case of an example shown in FIG. 35, the content files 41A-1, 41A-2, and so on, exist in the release date virtual folder 41A.

Similarly, the content files 41B-1, 41B-2, and so on, exist in the release date virtual folder 41B. Also, the content files 42A-1, 42A-2, and so on, exist in the release date virtual folder 42A. Thus, with the disk server 300 of the third embodiment, the content data is managed in three layers of the media virtual folder (upper order), release date virtual folder (middle order), and content data file (lower order).

Thus, the content data stored in the HDD 301 can be managed for each provided media and each release date. Note that information such as media name (media type) and release date is provided along with the content data when the provision of content data is received.

Layout Example of Virtual Folder and Content Data File
Layout Example of Media Virtual Folder FIG. 37 is a diagram to describe a layout example of the media virtual folder positioned on the upper order, as shown in FIG. 36. As shown in FIG. 37, the media virtual folder has a media type (media name) serving as the identification information.

Further, the media virtual folder also has various types of metadata relating to the media virtual folder, such as the created date/time of the media virtual folder and the registered release date. The metadata herein can append information that can be automatically obtained by the control unit 310 and clock circuit function, such as the created date/time and registered release date, as well as information such as keywords that the user inputs by way of the operating unit 321 or the like.

As shown in FIG. 37, information such as the release date of the content data provided by way of the media, and the number of content data released on the release date thereof is held. Thus, with the media virtual folder information, how much content data released when, for each media, can be managed.

Layout Example of Release Date Virtual Folder

FIG. 38 is a diagram to describe a layout example of the release date virtual folder positioned in the middle order, as shown in FIG. 36. As shown in FIG. 38, the release date virtual folder has a release date serving as the identification information.

Further, the release date virtual folder has the created date/time of the release date virtual folder, the number of content data registered in the release date virtual folder, and other metadata.

As shown in FIG. 29, information such as a file (content file name) of content data released on the release date, and an address on the recording medium indicating the recording position of the content file, are registered in the release date virtual folder. Thus, with the release date virtual folder information, what sort of content data belongs in each release date virtual folder can be managed.

Layout Example of Content File

Figures 39, 40:
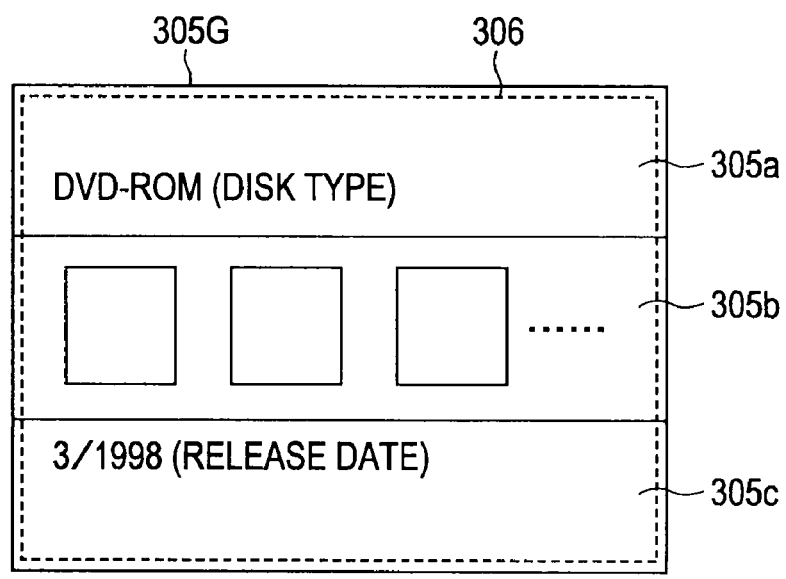
FIG. 39 is a diagram to describe a layout example of a content file.
FIG. 40 is a diagram to describe a search screen for content data (content search screen) used with the disk server.

FIG. 39 is a diagram to describe the layout example of the content file positioned on the lower order, as shown in FIG. 36. As shown in FIG. 39, the content file has a content file name serving as the identification information.

Further, the content file has various types of metadata such as the release date, title, jacket image data, and so forth. The media data herein is provided from the providing source at the time of obtaining the content data.

Thus, content data that is downloaded through an external device or the Internet, for example, is stored as main data in the content file to which a file name and various types of metadata are appended as identification information.

By playing processing the content data of the content file, the content according to the content data can be played and used. Note that the content data is audio data such as a still image, moving image, song, or the like, and AV data and so forth such as a movie wherein a picture and audio are taken in synchronization and played.

Overview of Content Data Search Processing

Also, with the disk server 300 of the third embodiment herein, a search of the content data managed as described using FIGS. 36 through 39 can be performed quickly and accurately by using the touch screen 307 without performing tedious operations.

FIG. 40 is a diagram to describe a content data search screen (content search screen) used with the disk server 300 of the third embodiment. The touch panel 306 is adhered onto the entire face of the display screen 305G of the display 305 and an operating screen is formed, as shown with the dotted lines along the outer edges of the display screen 305G.

With the content searching screen, as shown in FIG. 40, the control unit 310 divides the operating face of the touch panel 306 formed on the entire face of the display screen 305G of the display 305 into three areas in the vertical direction of the display screen 305G.

That is to say, as shown in FIG. 40, the control unit 310 recognizes the range (position and size) of each area on the operating face with the upper order as the media type area 305a, the middle order as the jacket image area 305b, and the lower order as the release date area 305c.

Further, the control unit 310 also divides the display screen 305G into three display areas so as to match each of the media type area 305a, jacket image area 305b, and release date area 305c that are formed by dividing the operating screen of the touch panel 306 into three. The control unit 310 also recognizes the range (position and size) of each display area divided on the display screen 301G.

Thus, in forming the content search screen, the control unit 310 divides the display screen 305G into three display areas in the vertical direction as shown in FIG. 40, and corresponding to each display area, and the operating face of the touch panel 306 can be understood to have been divided into three operating areas.

Therefore, with the content search screen shown in FIG. 40, the operating face of the touch panel 306 and the display screen 35G of the display unit 305 are both divided into the media type area 305a, jacket image area 305b, and release date area 305c, and each area will be described using the same reference numerals.

With the content search screen shown in FIG. 40, the media type area 305a on the upper order is an area displaying the media type information. Media type which is the identification information of the media virtual folder described using FIGS. 36 and 37, for example, is displayed in the media type area 305a herein.

Also, the release date area 305c on the lower order is an area displaying release date information. Release date information which is the identification information of the release date virtual folder described using FIGS. 27 and 38 is displayed in the release date area 305c, for example.

Also the jacket image area 305b in the middle order is an area displaying a jacket image or the like corresponding to each content data. Primarily images from the jacket image data of the content file belonging to the release date virtual folder identified by the release date information displayed in the release date area 305c are displayed in the jacket image area 305b.

With the disk server 300, when the user performs a search of the content data, the control unit 310 controls the picture reproducing processing unit 304, forms the content search screen shown in FIG. 40, and displays this on the display screen 305G of the display unit 305.

By performing a tracing operation as to the media type area 305a, the media (media virtual folder) can be changed, and the jacket image corresponding to the content data provided via the other media displayed. In this case, the display of the media type and the display of the release date are also changed.

Also, by performing a tracing operation as to the release date area 305c, the release date (release date virtual folder) can be changed, and the jacket image corresponding to the content data released on another release date displayed. In this case, the display of the release date is also changed.

Also, in the case of changing the release date (release date virtual folder), there are cases wherein the media virtual folder is also changed. In such a case, not only the display of the release date, but also the display of the media type is changed.

Also, by performing a tracing operation as to the jacket image area 305b, the display of the jacket images can be scrolled. In this case, there are cases wherein the media virtual folder and the release date virtual folder change. In such a case, the display of the media type and the display of the release date are also changed.

By selecting a jacket image of the targeted content data from within the jacket images displayed in the jacket image area 305b, the content corresponding to the jacket image thereof can be reproduced.

Thus, with the media server 300 also, embodiments of the invention herein can be applied, and a search of content data wherein various types of content data stored in the HDD 301 in large amounts can be performs quickly with simple operations for each provided media, and on the release date.

Advantages of the Embodiments

As can be understood from the descriptions of the embodiments described above, the operating screen of the touch panel is divided into multiple operating regions, and information for an image to be searched is assigned to each operating region. Thus, the increments of image sending can be changed according to the operating area that is operated, and a large amount of images can be efficiently seen.

Normally, in the case of sending images with a tracing operation, sending/returning one at a time is often the case, but reducing the number of times of the tracing operations and searching the targeted images efficiently can be performed.

Also, using the information displayed on the screen, image searching can be performed with intuitive operations without special search arrangements or modes, and a search of the desired image can be performed.

Also, by increasing the number of division of the operating face on the touch panel, and assigning different information of the image to each divided area, even more search conditions can be used, and searching processing with more modes can be performed with simple operations. For example, an image search can be performed using the logical product (AND) and logical sum (OR) of multiple search keys.

Embodiments of the present invention can be applied to a case wherein content such as image information has multiple information serving as search keys, or wherein content such as image information can be linked to information serving as search keys.

Realization of the Method and Program

Note that, as is clear from the above-described embodiments, the method and program according to embodiments of the present invention can be realized as the method and program described using the flowcharts shown in FIGS. 13 through 15, the flowcharts shown in FIGS. 19 and 20, and the flowcharts shown in FIGS. 23 and 24.

That is to say, the method described using the flowcharts shown in FIGS. 13 through 15, the flowcharts shown in FIGS. 19 and 20, and the flowcharts shown in FIGS. 23 and 24 are the methods according to embodiments of the present invention. Also, the program to execute the processing described using the flowcharts shown in FIGS. 13 through 15, the flowcharts shown in FIGS. 19 and 20, and the flowcharts shown in FIGS. 23 and 24 are the programs according to embodiments of the present invention.

Accordingly, the image processing apparatus can be realized, by realizing the program according to an embodiment of the present invention and by implementing this in a digital still camera or various types of image processing apparatuses.

Other

Also, with the above-described first embodiment, the display unit 106 realizes an image display device, the touch panel 107 realizes an instruction position detecting unit, the recording medium 135 realizes a storage unit, and primarily the control unit 120 realizes a display control unit.

Also, with the above-described second embodiment, the display unit 210 realizes an image display device, the touch panel 202 realizes an instruction position detecting unit, the recording medium 205 realizes a storage unit, and primarily the control unit 210 realizes a display control unit.

Also, with the above-described third embodiment, the display unit 305 realizes an image display device, the touch panel 306 realizes an instruction position detecting unit, the HDD 301 realizes a storage unit, and primarily the control unit 310 realizes a display control unit.

Also, with the above-described embodiments, the month/date and events according to the tracing operation, or the change (sliding) of the display images such as the thumbnail images or jacket images are performed in predetermined increments.

For example, in the case of the imaging apparatus 100 of the first embodiment, in the case of a tracing operation to the date area 71, the display is changed in increments of one month. Also, in the case of a tracing operation to the event area 73, the display is changed in increments of one event. Also, in the case of a tracing operation to the image area 72, the thumbnail images are scrolled in increments of 2 images. Thus, the display images are changed in predetermined increments.

The increments of change herein can be various types of increments. Change can be made with various types of increments, such as in the case of month/date, increments of three months, in the case of events, increments of two events, and in the case of thumbnail images, increments of five images, for example.

Further, based on the coordinates data from the touch panel, the movement amount and movement speed for each time increment of the touching position according to the touching operation of the user to the touch panel is found, and according to the movement amount and movement speed of the touching position for each time increment, the change amount of the display image can also be determined. This processing can be performed with the control unit 120 receiving the provision of coordinates data from the touch panel.

In this case, controlling based on only the movement amount for each time increment, or controlling based on only the movement speed for each time increment, can be made. Also, controls can be made based on both the movement amount and movement speed for each time increment.

That is to say, the relation between the movement amount and movement speed for each time increment can be determined, and even if the movement amount is great, in the case that the movement speed is slower than a predetermined threshold, the image can be made to not be changed greatly. Similarly, even if the movement speed is fast, if the movement amount is shorter than a threshold, the image can be made to not be changed greatly. That is to say, in the case that both the movement amount and movement speed are above a predetermined threshold, the image changes can be made to be great.

Also, with the above-described embodiments, a virtual folder is provided corresponding to information to serve as search increments, and a file having image data to be searched is positioned on the lowest order. However, the configuration does not necessarily have to provide the virtual folder.

For each information for a search, a search using information to be each search key can be performed by arranging (sorting) the files having image data to be searched.

Also, with the above-described first embodiment, the tracing operation from the right to the left as to the display screen is operating in the direction of advancing the time, and the tracing operation from the left to the right as to the display screen is operating in the direction of going back in time. However, embodiments of the present invention are not restricted to this arrangement.

Conversely, the tracing operation from the left to the right as to the display screen can be the operation in the direction of advancing the time, and the tracing operation from the right to the left as to the display screen can be the operation in the direction of going back in time.

Also, with the second and third embodiments, the content data is not arranged based on time information, but is arranged and managed by each artist name, genre, or media.

Also in such cases, the tracing operation from the right to the left as to the display screen can be the operation in the direction of advancing as to the data array direction, and the tracing operation from the left to the right as to the display screen can be the operation in the direction of returning as to the data array direction.

Of course, conversely, the tracing operation from the left to the right as to the display screen can be the operation in the direction of advancing as to the data array direction, and the tracing operation from the right to the left as to the display screen can be the operation in the direction of returning as to the data array direction.

Also, with the above-described embodiments, an image search is performed with a tracing operation to the horizontal direction as to the display screen, but embodiments of the present invention are not restricted to this arrangement. A tracing operation in the vertical direction as to the display screen can also be operated for an image search. That is to say, image scrolling in the vertical direction of the display screen can also be performed.

Also, the image data to be displayed is not restricted to being image data of a still image. For example, embodiments of the present invention can be applied to an image processing apparatus that displays thumbnail images or a representative image of multiple moving contents accumulated in a recording medium.

The present application contains subject matter related to that disclosed in Japanese Priority Patent Application JP 2008-280707 filed in the Japan Patent Office on Oct. 31, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an image display device;
means for accepting via an operating screen having a plurality of operating areas provided as to a display screen of said image display device, an instruction operation from a user and for detecting and outputting an instruction position of said instruction operation as to an operating face;
means for storing, holding, and managing image data by date and by event; and
means for controlling so as to display an image according to said image data stored and held in at least said means for storing on said image display device; wherein
when a tracing operation to trace said operating face is performed by the user, said means for controlling controls the display of the image to be displayed on said display screen of said image display device so as to be changed, according to the operated operating area and direction of operation that is distinguished based on the detecting output from means for accepting,
a first of the plurality of operating areas displays a date of image data currently being displayed in a second of the plurality of operating areas, the first operating area being arranged directly above the second operating area in a vertical direction and the date being displayed upright, when the image processing apparatus is oriented in a position,
the second operating area displays a plurality of thumbnails of the image data in a horizontal row, the plurality of thumbnails being displayed upright, when the image processing apparatus is oriented in the same position, and a third of the plurality of operating areas displays an event corresponding to the image data currently displayed and aligned with an edge of one of the plurality of thumbnails, the third operating area being arranged directly beneath the second operating area in the vertical direction and the event being displayed upright, when the image processing apparatus is oriented in the same position.

2. The image processing apparatus according to claim 1, wherein, when a tracing operation is performed as to the first operating area of information relating to said dates, said means for controlling displays an image having information relating to a different date from the time of operation, according to the operating direction.

3. The image processing apparatus according to claim 2, wherein the tracing operation is a tracing in the horizontal direction.

4. The image processing apparatus according to claim 1, wherein, when a tracing operation is performed as to the third operating area of information relating to said events, said means for controlling displays an image having information relating to a different event from the time of operation, according to the operating direction.

5. The image processing apparatus according to claim 2 or claim 4, wherein, when a tracing operation is performed as to the second operating area of the image data, said means for controlling controls so as to display a different image, according to the operating direction.

6. The image processing apparatus according to claim 1, wherein, when an instruction operation is performed as to one within said plurality of operating areas while a tracing operation is performed as to another one within said plurality of operating areas, said means for controlling controls an image so as to display having information that matches the information correlated to the operating area in which the instruction operation is performed at the point-in-time of the instruction operation, while having information different from the information correlated to the operating area in which the tracing operating is performed at the point-in-time of the tracing operation, according to the direction of the tracing operation.

7. The image processing apparatus according to claim 1, wherein, when an instruction operation is performed as to said second operating area regarding the image data, while a tracing operation is performed as to one other within said plurality of operating areas, said means for controlling controls an image so as to display, having information that is similar to the relevant image, and that differs from the information that is correlated to the operating area in which a tracing operation is performed at the point-in-time of the tracing operation, according to the direction of the tracing operation, based on analysis results of the image displayed on a display screen of said image display device at the position wherein the instruction operation is performed in the point-in-time of the instruction operation.

8. The image processing apparatus according to claim 1, wherein, when an instruction operation is performed as to a plurality of the operating areas within said operating areas while a tracing operation is performed as to another one within said plurality of operating areas, said means for controlling controls an image so as to display having information that matches the information correlated to each of the plurality of operating areas in which the instruction operation is performed at the point-in-time of the instruction operation, while having information different from the information correlated to the operating area in which the tracing operating is performed at the point-in-time of the tracing operation, according to the direction of the tracing operation.

9. The image processing apparatus according to claim 1, wherein, when an instruction operation is performed as to a plurality of the operating areas within said operating areas while a tracing operation is performed as to another one within said plurality of operating areas, said means for controlling controls an image so as to display having information that matches one of the information correlated to each of the plurality of operating areas in which the instruction operation is performed at the point-in-time of the instruction operation, while having information different from the information correlated to the operating area in which the tracing operating is performed at the point-in-time of the tracing operation, according to the direction of the tracing operation.

10. The image processing apparatus according to claim 1, further comprising:
    means for controlling an information display wherein, when an instruction operation is performed as to one within said plurality of operating areas, or when an instruction operation is performed and that information corresponding to the operating area is displayed, the display is displayed so as to be conspicuous, and wherein when information corresponding to the operating area is not displayed, to display information corresponding to the operating area.

11. The image processing apparatus according to claim 1, wherein said means for controlling controls an image to be displayed on said display screen of said image display device so as to change, with consideration for one or both of the distance and speed of the tracing operation that is recognized based on detecting output from said means for accepting.

12. The image processing apparatus according to claim 1, wherein when a tracing operation is performed with respect to the date displayed in the first of the plurality of operating areas, the date is highlighted or inverted.

13. The image processing apparatus according to claim 1, wherein information corresponding to the date of the image data currently being displayed in the second of the plurality of operating areas is superimposed over the image data being displayed in the second of the plurality of operating areas.

14. The image processing apparatus according to claim 1, wherein the first of the plurality of operating areas and the third the plurality of operating areas each having a size greater than the second of the plurality of operating areas.

15. An image processing apparatus comprising:
    an image display device;
    an instruction position detecting unit configured to accept, by way of an operating screen having a plurality of operating areas provided as to a display screen of said image display device, art instruction operation from a user and detect and output the instruction position of said instruction operation as to said operating face;
    a storage unit configured to store, hold, and manage image data by date and by event; and
    a display control unit configured to control so as to display an image according to said image data stored and held in at least said storage unit on said image display device; wherein
    when a tracing operation to trace said operating face is performed by the user, said display control unit controls the display of the image to be displayed on said display screen of said image display device so as to be changed, according to the operated operating area and direction of operation that is distinguished based on the detecting output from said instruction position detecting unit,
    a first of the plurality of operating areas displays a date of image data currently being displayed in a second of the plurality of operating areas, the first operating area being arranged directly above the second operating area in a vertical direction and the date being displayed upright, when the image processing apparatus is oriented in a position, the second operating area displays a plurality of thumbnails of the image data in a horizontal row, the plurality of thumbnails being displayed upright, when the image processing apparatus is oriented in the same position, and a third of the plurality of operating areas displays an event corresponding to the image data currently displayed and aligned with an edge of one of the plurality of thumbnails, the third operating area being arranged directly beneath the second operating area in the vertical direction and the event being displayed upright, when the image processing apparatus is oriented in the same position.

16. An image processing method, implemented on an image processing apparatus, comprising:

accepting operating input from a user via an instruction position detecting unit that has an operating screen having a plurality of operating areas provided as to a display screen of an image display device, to accept an instruction operation from the user, and detect and output the instruction position of said instruction operation as to an operating face; and display controlling, wherein, in the case of having received a tracing operation of said operating screen by the user in said accepting, a display control unit that controls an image according to image data stored, held, and managed in a storage unit by date and by event so as to display on said image display device, distinguishes the operating area and operating direction of the operation based on the detecting results from said instruction position detection unit, and controls the image to be displayed on said display screen of said image display device according to said distinguishing results, so as to change, a first of the plurality of operating areas displays a date of image data currently being displayed in a second of the plurality of operating areas, the first operating area being arranged directly above the second operating area in a vertical direction and the date being displayed upright, when the image processing apparatus is oriented in a position, the second operating area displays a plurality of thumbnails of the image data in a horizontal row, the plurality of thumbnails being displayed upright, when the image processing apparatus is oriented in the same position, and a third of the plurality of operating areas displays an event corresponding to the image data currently displayed and aligned with an edge of one of the plurality of thumbnails, the third operating area being arranged directly beneath the second operating area in the vertical direction and the event being displayed upright, when the image processing apparatus is oriented in the same position.

17. A non-transitory computer readable storage medium having stored therein an image display program to cause a computer of an image processing device to execute a method comprising:

accepting operating input from a user via an instruction position detecting unit that has an operating screen having a plurality of operating areas provided as to a display screen of an image display device, to accept an instruction operation from the user, and detect and output the instruction position of said instruction operation as to an operating face; and display controlling, wherein, in the case of having received a tracing operation of said operating screen by the user in said accepting, a display control unit that controls the image according to image data stored, held, and managed in a storage unit by date and by event so as to display on said image display device, distinguishes the operating area and operating direction of the operation based on the detecting results from said instruction position detection unit, and controls the image to be displayed on said display screen of said image display device according to said distinguishing results, so as to change, a first of the plurality of operating areas displays a date of image data currently being displayed in a second of the plurality of operating areas, the first operating area being arranged directly above the second operating area in a vertical direction and the date being displayed upright, when the image processing device is oriented in a position, the second operating area displays a plurality of thumbnails of the image data in a horizontal row, the plurality of thumbnails being displayed upright, when the image processing device is oriented in the same position, and a third of the plurality of operating areas displays an event corresponding to the image data currently displayed and aligned with an edge of one of the plurality of thumbnails, the third operating area being arranged directly beneath the second operating area in the vertical direction and the event being displayed upright, when the image processing device is oriented in the same position.

* * * * *